US010719939B2

(12) United States Patent
Holzer et al.

(10) Patent No.: US 10,719,939 B2
(45) Date of Patent: *Jul. 21, 2020

(54) REAL-TIME MOBILE DEVICE CAPTURE AND GENERATION OF AR/VR CONTENT

(71) Applicant: Fyusion, Inc., San Francisco, CA (US)

(72) Inventors: Stefan Johannes Josef Holzer, San Mateo, CA (US); Yuheng Ren, San Bruno, CA (US); Abhishek Kar, Berkeley, CA (US); Alexander Jay Bruen Trevor, San Francisco, CA (US); Krunal Ketan Chande, San Francisco, CA (US); Martin Josef Nikolaus Saelzle, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,104

(22) Filed: Feb. 8, 2017

(65) Prior Publication Data
US 2017/0148223 A1 May 25, 2017

Related U.S. Application Data

(63) Continuation-in-part of application No. 14/530,669, filed on Oct. 31, 2014, now abandoned, and a
(Continued)

(51) Int. Cl.
*G06T 15/00* (2011.01)
*G06T 7/174* (2017.01)
(Continued)

(52) U.S. Cl.
CPC .............. *G06T 7/174* (2017.01); *G06F 3/011* (2013.01); *G06F 16/532* (2019.01);
(Continued)

(58) Field of Classification Search
None
See application file for complete search history.

(56) References Cited

U.S. PATENT DOCUMENTS 5,926,190 A 7/1999 Turkowski et al.
6,252,974 B1 6/2001 Martens et al.
(Continued)

OTHER PUBLICATIONS

Zheng et al., Conditional Random Fields as Recurrent Neural Networks, 2015, IEEE International Conference on Computer Vision, pp. 1529-1537 (Year: 2015).*
(Continued)

*Primary Examiner* — Anh-Tuan V Nguyen
(74) *Attorney, Agent, or Firm* — Kwan & Olynick LLP

(57) ABSTRACT

Various embodiments describe systems and processes for generating AR/VR content. In one aspect, a method for generating a three-dimensional (3D) projection of an object is provided. A sequence of images along a camera translation may be obtained using a single lens camera. Each image contains at least a portion of overlapping subject matter, which includes the object. The object is semantically segmented from the sequence of images using a trained neural network to form a sequence of segmented object images, which are then refined using fine-grained segmentation. On-the-fly interpolation parameters are computed and stereoscopic pairs are generated for points along the camera translation from the refined sequence of segmented object images for displaying the object as a 3D projection in a virtual reality or augmented reality environment. Segmented image indices are then mapped to a rotation range for display in the virtual reality or augmented reality environment.

18 Claims, 31 Drawing Sheets

Related U.S. Application Data continuation-in-part of application No. 14/800,638, filed on Jul. 15, 2015, now Pat. No. 9,940,541, and a continuation-in-part of application No. 14/860,983, filed on Sep. 22, 2015.

(51) Int. Cl.

| | |
|---|---|
| *H04N 13/282* | (2018.01) |
| *H04N 13/243* | (2018.01) |
| *H04N 5/265* | (2006.01) |
| *H04N 5/232* | (2006.01) |
| *G06F 16/532* | (2019.01) |
| *H04N 13/279* | (2018.01) |
| *G06F 3/01* | (2006.01) |
| *G06F 16/583* | (2019.01) |
| *G06F 16/738* | (2019.01) |
| *G06T 3/40* | (2006.01) |
| *G06F 16/783* | (2019.01) |
| *G06K 9/00* | (2006.01) |

(52) U.S. Cl.
CPC ........ *G06F 16/5838* (2019.01); *G06F 16/738* (2019.01); *G06F 16/783* (2019.01); *G06K 9/00664* (2013.01); *G06T 3/4038* (2013.01); *H04N 5/23238* (2013.01); *H04N 5/265* (2013.01); *H04N 13/243* (2018.05); *H04N 13/279* (2018.05); *H04N 13/282* (2018.05)

(56) References Cited

U.S. PATENT DOCUMENTS

| | | | |
|---|---|---|---|
| 6,327,381 B1 | 12/2001 | Rogina et al. | |
| 8,078,004 B2 | 12/2011 | Kang et al. | |
| 8,947,452 B1 | 2/2015 | Ballagh et al. | |
| 9,704,257 B1* | 7/2017 | Tuzel | G06N 3/04 |
| 9,940,541 B2 | 4/2018 | Holzer et al. | |
| 2002/0094125 A1 | 7/2002 | Guo | |
| 2004/0141014 A1* | 7/2004 | Kamiwada | G06F 3/04815 |
| | | | 715/848 |
| 2005/0151759 A1 | 7/2005 | Gonzalez-banos et al. | |
| 2005/0219264 A1 | 10/2005 | Shum et al. | |
| 2006/0188147 A1 | 8/2006 | Rai et al. | |
| 2007/0237420 A1 | 10/2007 | Steedly et al. | |
| 2007/0252804 A1 | 11/2007 | Engel et al. | |
| 2008/0106593 A1 | 5/2008 | Arfvidsson et al. | |
| 2008/0152258 A1 | 6/2008 | Tulkki | |
| 2008/0201734 A1 | 8/2008 | Lyon et al. | |
| 2008/0225132 A1 | 9/2008 | Inaguma | |
| 2008/0246759 A1 | 10/2008 | Summers | |
| 2008/0304740 A1* | 12/2008 | Sun | G06K 9/3233 |
| | | | 382/168 |
| 2009/0116732 A1 | 5/2009 | Zhou et al. | |
| 2009/0263045 A1 | 10/2009 | Szeliski et al. | |
| 2009/0303343 A1 | 12/2009 | Drimbarean et al. | |
| 2010/0033553 A1 | 2/2010 | Levy | |
| 2010/0171691 A1 | 7/2010 | Cook et al. | |
| 2010/0315412 A1* | 12/2010 | Sinha | G06T 7/0065 |
| | | | 345/419 |
| 2011/0007072 A1* | 1/2011 | Khan | G06T 17/00 |
| | | | 345/420 |
| 2011/0075920 A1* | 3/2011 | Wu | G06K 9/4638 |
| | | | 382/160 |
| 2011/0254835 A1 | 10/2011 | Segal | |
| 2011/0261050 A1 | 10/2011 | Smolic et al. | |
| 2012/0013711 A1 | 1/2012 | Tamir et al. | |
| 2012/0019557 A1 | 1/2012 | Aronsson et al. | |
| 2012/0028706 A1 | 2/2012 | Raitt et al. | |
| 2012/0041722 A1* | 2/2012 | Quan | G06T 17/05 |
| | | | 703/1 |
| 2012/0147224 A1 | 6/2012 | Takayama | |
| 2013/0002649 A1* | 1/2013 | Wu | G06T 19/006 |
| | | | 345/419 |
| 2013/0155180 A1 | 6/2013 | Wantland et al. | |
| 2013/0162634 A1 | 6/2013 | Baik | |
| 2013/0250045 A1 | 9/2013 | Ki et al. | |
| 2013/0271566 A1 | 10/2013 | Chen et al. | |
| 2014/0009462 A1 | 1/2014 | Mcnamer et al. | |
| 2014/0037198 A1* | 2/2014 | Larlus-Larrondo | G06K 9/00 |
| | | | 382/159 |
| 2014/0087877 A1 | 3/2014 | Krishnan | |
| 2014/0253436 A1 | 9/2014 | Petersen | |
| 2014/0293004 A1* | 10/2014 | Tsubaki | H04N 5/23287 |
| | | | 348/43 |
| 2014/0307045 A1 | 10/2014 | Richardt et al. | |
| 2014/0340404 A1* | 11/2014 | Wang | G06T 15/20 |
| | | | 345/427 |
| 2015/0010218 A1* | 1/2015 | Bayer | G06K 9/0014 |
| | | | 382/128 |
| 2015/0078449 A1 | 3/2015 | Diggins et al. | |
| 2015/0193963 A1 | 3/2015 | Diggins | |
| 2015/0294492 A1 | 3/2015 | Diggins | |
| 2015/0130799 A1 | 5/2015 | Holzer et al. | |
| 2015/0130800 A1 | 5/2015 | Holzer et al. | |
| 2015/0130894 A1 | 5/2015 | Holzer et al. | |
| 2015/0134651 A1 | 5/2015 | Holzer et al. | |
| 2015/0138190 A1 | 5/2015 | Holzer et al. | |
| 2015/0269772 A1 | 9/2015 | Ha et al. | |
| 2015/0339846 A1 | 11/2015 | Holzer et al. | |
| 2015/0371440 A1* | 12/2015 | Pirchheim | G06T 17/05 |
| | | | 345/419 |
| 2016/0078287 A1* | 3/2016 | Auge | G06K 9/00342 |
| | | | 382/103 |
| 2016/0191895 A1* | 6/2016 | Yun | H04N 13/0059 |
| | | | 348/43 |
| 2016/0350930 A1* | 12/2016 | Lin | G06K 9/66 |
| 2016/0353089 A1 | 12/2016 | Gallup et al. | |
| 2016/0358337 A1* | 12/2016 | Dai | G06T 5/10 |
| 2017/0018054 A1 | 1/2017 | Holzer et al. | |
| 2017/0018055 A1 | 1/2017 | Holzer et al. | |
| 2017/0018056 A1 | 1/2017 | Holzer et al. | |
| 2017/0084001 A1 | 3/2017 | Holzer et al. | |
| 2017/0140236 A1* | 5/2017 | Price | G06K 9/4628 |
| 2017/0236287 A1* | 8/2017 | Shen | G06K 9/6269 |
| | | | 382/206 |
| 2017/0287134 A1* | 10/2017 | Abedini | G06K 9/622 |
| 2017/0344808 A1* | 11/2017 | El-Khamy | G06T 7/70 |
| 2017/0353670 A1* | 12/2017 | Zimmer | H04N 5/247 |
| 2017/0364766 A1* | 12/2017 | Das | G06K 9/00664 |
| 2018/0108137 A1* | 4/2018 | Price | G06N 3/08 |
| 2018/0211131 A1 | 7/2018 | Holzer et al. | |
| 2018/0218235 A1 | 8/2018 | Holzer et al. | |
| 2018/0218236 A1 | 8/2018 | Holzer et al. | |
| 2019/0019056 A1 | 1/2019 | Pierce et al. | |

OTHER PUBLICATIONS

"U.S. Appl. No. 14/539,889, Non Final Office Action dated Oct. 6, 2016", 14 pages.

"U.S. Appl. No. 14/800,638, Final Office Action dated Jan. 20, 2017", 12 pages.

"U.S. Appl. No. 14/800,638, Non Final Office Action dated Jun. 15, 2017", 12 pgs.

"U.S. Appl. No. 14/800,638, Notice of Allowance dated Dec. 13, 2017", 9 pages.

"U.S. Appl. No. 14/860,983, Advisory Action dated Jan. 23, 2018", 3 pages.

"U.S. Appl. No. 14/860,983, Advisory Action dated Mar. 26, 2019", 2 pages.

"U.S. Appl. No. 14/860,983, Final Office Action dated Jan. 18, 2019", 19 pgs.

"U.S. Appl. No. 14/860,983, Final Office Action dated Oct. 18, 2017", 21 pages.

"U.S. Appl. No. 14/860,983, Non Final Office Action dated Jun. 8, 2017", 26 pgs.

"U.S. Appl. No. 14/860,983, Non Final Office Action dated Aug. 7, 2018", 22 pages.

(56) References Cited

OTHER PUBLICATIONS

"U.S. Appl. No. 14/800,638, Advisory Action dated May 9, 2017", 5 pgs.

* cited by examiner

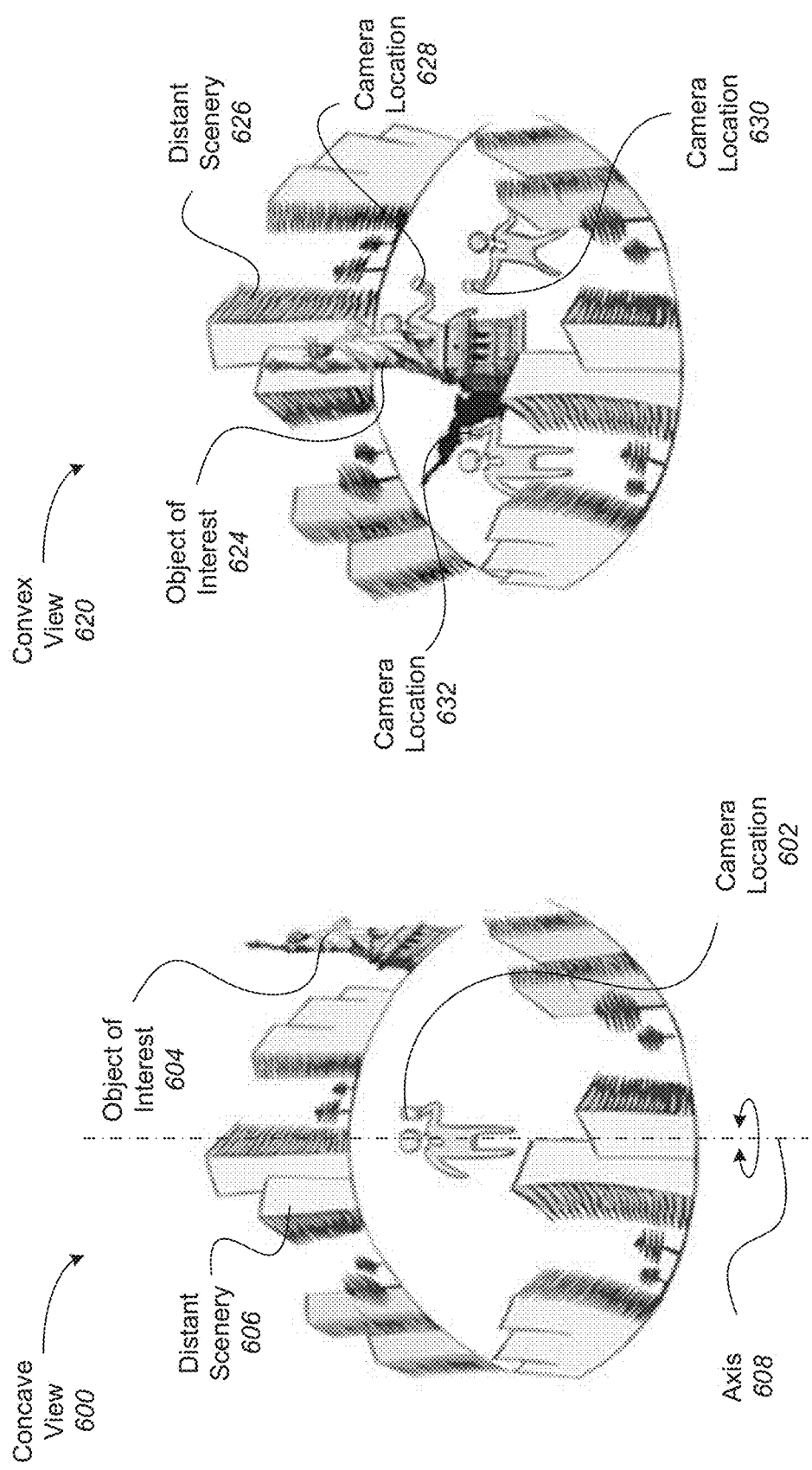

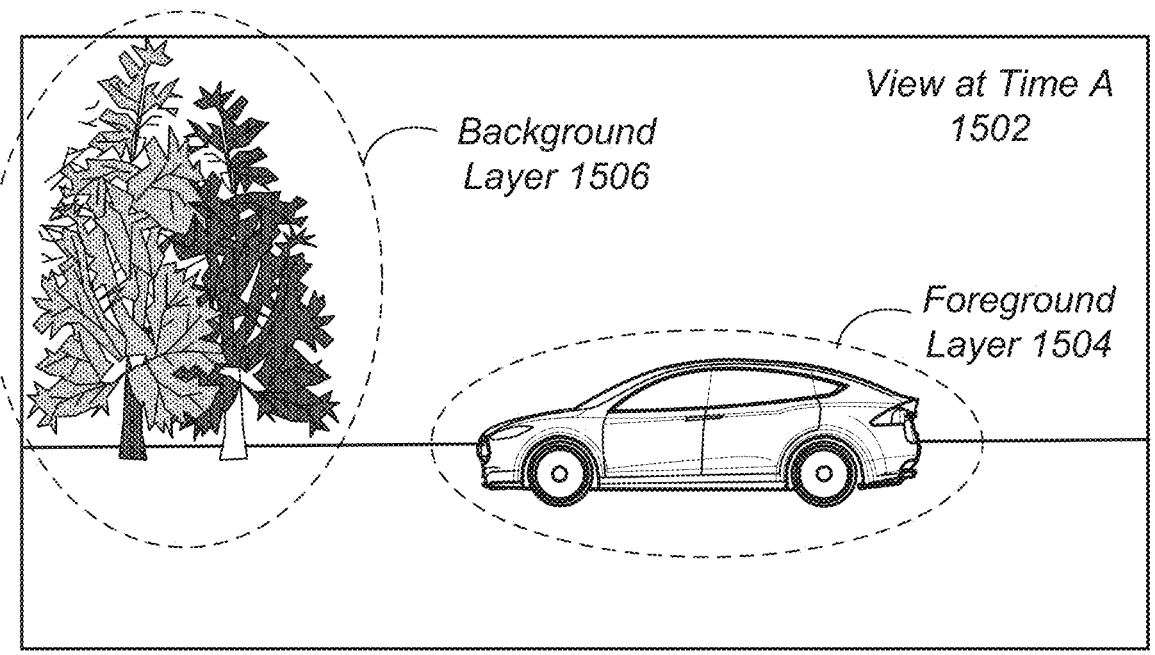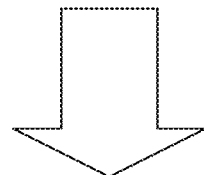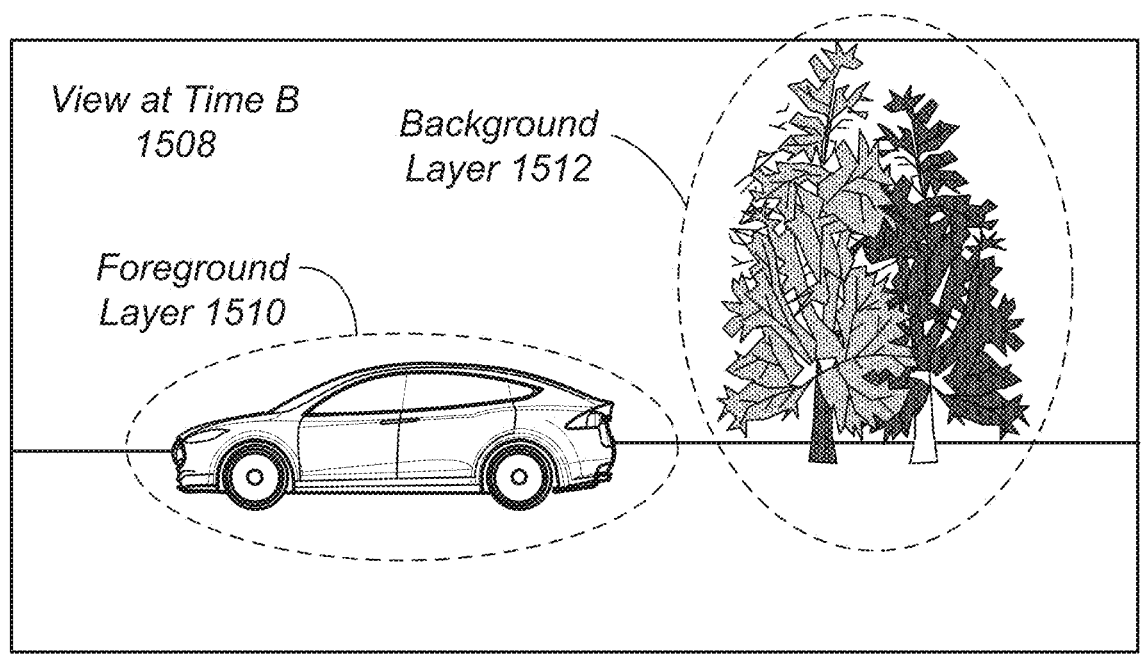
FIG. 15

REAL-TIME MOBILE DEVICE CAPTURE AND GENERATION OF AR/VR CONTENT

CROSS-REFERENCE TO RELATED APPLICATIONS

This application is a continuation-in-part of U.S. patent application Ser. No. 14,530,669 by Holzer et al., filed on Oct. 31, 2014, titled ANALYSIS AND MANIPULATION OF IMAGES AND VIDEO FOR GENERATION OF SURROUND VIEWS; and a continuation-in-part of U.S. patent application Ser. No. 14,800,638 by Holzer et al., filed on Jul. 15, 2015, titled ARTIFICIALLY RENDERING IMAGES USING INTERPOLATION OF TRACKED CONTROL POINTS; and a continuation-in-part of U.S. patent application Ser. No. 14,860,983 by Holzer et al., filed on Sep. 22, 2015, titled ARTIFICIALLY RENDERING IMAGES USING VIEWPOINT INTERPOLATION AND EXTRAPOLATION. The above referenced applications are incorporated by reference herein in their entirety and for all purposes.

TECHNICAL FIELD

The present disclosure relates generally to the capture and presentation of image sequences, and more specifically to capturing and generating content for augmented reality and virtual reality systems.

BACKGROUND

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Producing combined images, such as a panorama, or a three-dimensional (3D) image or model requires combining data from multiple images and can require interpolation or extrapolation of data. Most previously existing methods of interpolation or extrapolation require a significant amount of data in addition to the available image data. For those approaches, the additional data needs to describe the scene structure in a dense way, such as provided by a dense depth map (where for every pixel a depth value is stored) or an optical flow map (which stores for every pixel the motion vector between the available images). Other existing methods of producing 3D models may be done by computer generation of polygons or texture mapping over a three-dimensional mesh and/or polygon models, which also require high processing times and resources. This limits the efficiency of these methods in processing speed as well as transfer rates when sending it over a network. Accordingly, improved mechanisms for extrapolating and presenting 3D image data are desirable.

SUMMARY

Provided are various mechanisms and processes relating to capturing and generating AR/VR content in real-time. In one aspect, which may include at least a portion of the subject matter of any of the preceding and/or following examples and aspects, a method for generating a three-dimensional (3D) projection of an object in a virtual reality or augmented reality environment is provided. The method comprises obtaining a sequence of images using a single lens camera. Each image in the sequence of images contains at least a portion of overlapping subject matter, which includes the object.

The method further comprises semantically segmenting the object from the sequence of images using a trained neural network to form a sequence of segmented object images. The method may further comprise stabilizing the sequence of images using camera rotation and focal length values before semantically segmenting the object from the sequence of images.

The sequence of segmented object images is then refined using fine-grained segmentation. Refining the sequence of segmented object images may include using a temporal conditional random field. Using the temporal conditional random field includes utilizing a graph of neighboring images for each image to be refined. The method further comprises computing on-the-fly interpolation parameters. On-the-fly interpolation parameters are used to generate interpolated images along any point in the camera translation in real-time.

The method further comprises generating stereoscopic pairs form the refined sequence of segmented object images for displaying the object as a 3D projection in the virtual reality or augmented reality environment. The stereoscopic pairs may be generated for one or more points along the camera translation. A stereoscopic pair may include an interpolated virtual image comprising two selected frames. The selected frames may be modified by rotating an image of a selected frame such that the image corresponds to a view of the object angled directly toward the object. The sequences of segmented object images are fused to generate a projection of the object, which depicts a 3D view of the object without polygon generation. Segmented image indices are then mapped to a rotation range for display in the virtual reality or augmented reality environment. Mapping the segmented image indices may include mapping physical viewing locations to a frame index.

Other implementations of this disclosure include corresponding devices, systems, and computer programs, configured to perform the actions of the described method. For instance, a non-transitory computer readable medium is provided comprising one or more programs configured for execution by a computer system. In some embodiments, the one or more programs include instructions for performing the actions of described methods and systems. These other implementations may each optionally include one or more of the following features.

In another aspect, which may include at least a portion of the subject matter of any of the preceding and/or following examples and aspects, a system for generating a three-dimensional (3D) projection of an object in a virtual reality or augmented reality environment comprises a single lens camera for obtaining a sequence of images along a camera translation. Each image in the sequence of images contains at least a portion of overlapping subject matter, which includes the object. The system further comprises a display module, a processor, and memory storing one or more programs configured for execution by the processor. The one or more programs comprise instructions for performing the actions of described methods and systems.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

FIGS. 6A-6B illustrate examples of concave view and convex views, respectively, where both views use a back-camera capture style.

FIG. 15 illustrates an example of combining image information gathered from two frames to artificially render an image in another frame using multiple layers extracted from surround views.

DETAILED DESCRIPTION

Figure 1:
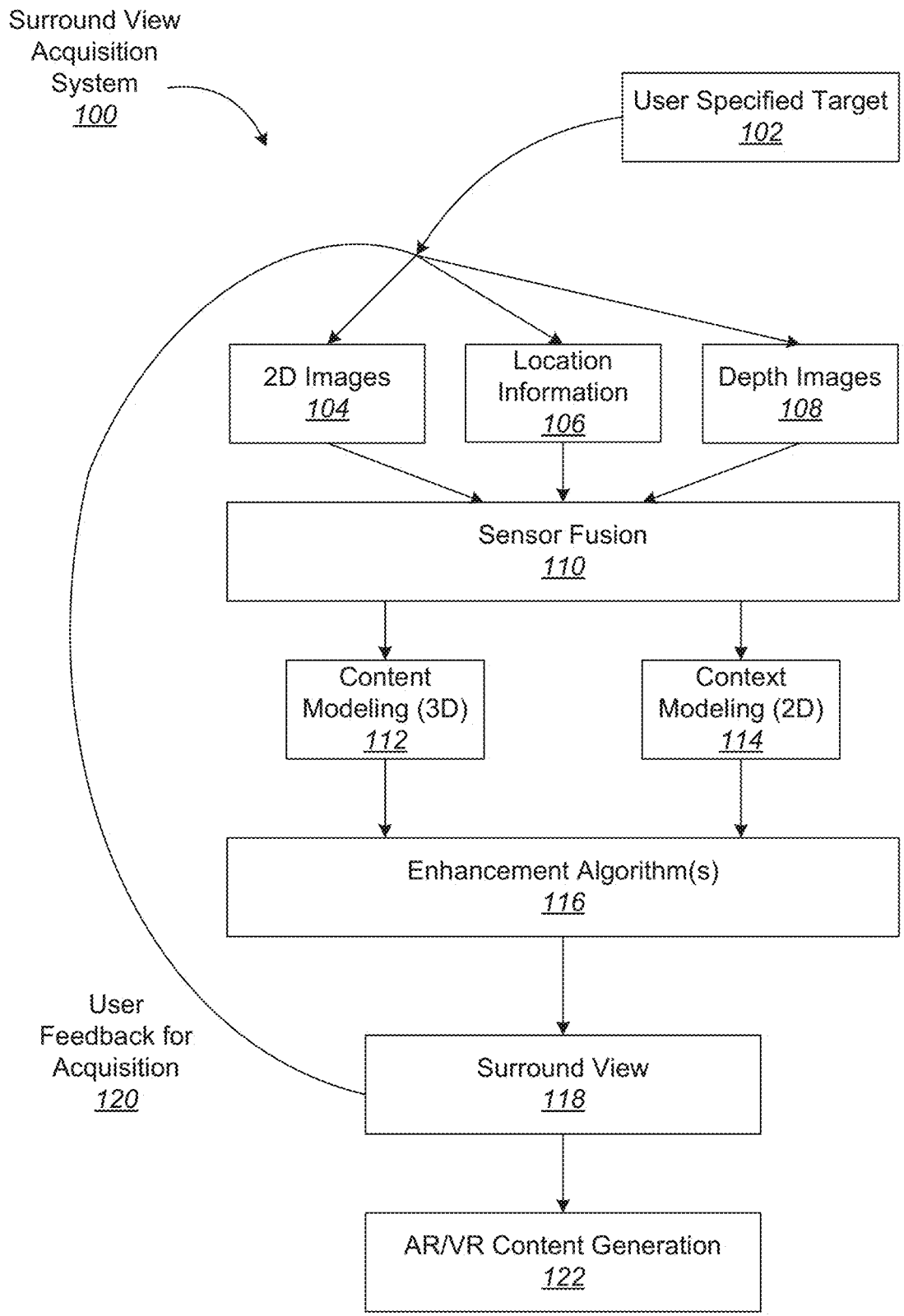
FIG. 1 illustrates an example of a surround view acquisition system.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

Various systems and methods for analyzing the spatial relationship between multiple images and video together with location information data, for the purpose of creating a single representation, a surround view, which eliminates redundancy in the data, and presents a user with an interactive and immersive active viewing experience, is described in U.S. patent application Ser. No. 14,530,669 by Holzer et al., filed on Oct. 31, 2014, titled ANALYSIS AND MANIPULATION OF IMAGES AND VIDEO FOR GENERATION OF SURROUND VIEWS, which is incorporated by reference herein in its entirety and for all purposes. According to various embodiments described therein, a surround view provides a user with the ability to control the viewpoint of the visual information displayed on a screen.

Various systems and methods for rendering artificial intermediate images through view interpolation of one or more existing images, for the purpose creating missing frames for improved viewing experience, is described in U.S. patent application Ser. No. 14,800,638 by Holzer et al., filed on Jul. 15, 2015, titled ARTIFICIALLY RENDERING IMAGES USING INTERPOLATION OF TRACKED CONTROL POINTS, and U.S. patent application Ser. No. 14,860,983 by Holzer et al., filed on Sep. 22, 2015, titled "ARTIFICIALLY RENDERING IMAGES USING VIEWPOINT INTERPOLATION AND EXTRAPOLATION, both of which applications are incorporated by reference herein in their entirety and for all purposes. According to various embodiments described therein, artificial images may be interpolated between captured image frames, selected keyframes and/or used as one or more frames in a stereo pair of image frames. Such interpolation may be implemented in an infinite smoothing technique to generate any number of intermediate frames to create a smooth and realistic transition between frames, as described in U.S. patent application Ser. No. 15/425,983, titled SYSTEM AND METHOD FOR INFINITE SMOOTHING OF IMAGE SEQUENCES by Holzer et al., filed on Feb. 6, 2017, which application is incorporated by reference herein in its entirety and for all purposes.

Various systems and methods for stabilizing image frames using focal length and rotation, for the purpose of creating optically sound surround views, are described in U.S. patent application Ser. No. 15/,408,270 titled STABILIZING IMAGE SEQUENCES BASED ON CAMERA ROTATION AND FOCAL LENGTH by Holzer et al., filed on Jan. 17, 2017, which application is incorporated by reference herein in its entirety and for all purposes. Such systems and methods for image stabilization may also be implemented to create stereoscopic pairs of image frames to be presented to the user to provide perception of depth, as described in U.S. patent application Ser. No. 15/408,211 titled GENERATING STEREOSCOPIC PAIRS OF IMAGES FROM A SINGLE LENS CAMERA by Holzer et al., filed on Jan. 17, 2017, which application is incorporated by reference herein in its entirety and for all purposes.

Overview

According to various embodiments, a surround view is a multi-view interactive digital media representation. Such surround view may comprise content for virtual reality (VR) and/or augmented reality (AR), and be presented to a user with a viewing device, such as a virtual reality headset. For example, a structured concave sequence of images may be live captured around an object of interest and presented as a surround view, which provides a hologram model when viewed through a viewing device. The term "AR/VR" shall be used herein when referring to both augmented reality and virtual reality.

The data used to generate a surround view can come from a variety of sources. In particular, data such as, but not limited to, two-dimensional (2D) images can be used to generate a surround view. Such 2D images may be captured by a camera moving along a camera translation, which may or may not be uniform. The 2D images may be captured a constant intervals of time and/or distance of camera translation. These 2D images can include color image data streams such as multiple image sequences, video data, etc., or multiple images in any of various formats for images, depending on the application. Another source of data that can be used to generate a surround view includes location information obtained from sources such as accelerometers, gyroscopes, magnetometers, GPS, WiFi, IMU-like systems (Inertial Measurement Unit systems), and the like. Yet another source of data that can be used to generate a surround view can include depth images.

In the present example embodiment, the data can then be fused together. In some embodiments, a surround view can be generated by a combination of data that includes both 2D images and location information, without any depth images provided. In other embodiments, depth images and location information can be used together. Various combinations of image data can be used with location information, depending on the application and available data. In the present example embodiment, the data that has been fused together is then used for content modeling and context modeling. The content can be delineated as the object of interest and the context can be delineated as the scenery surrounding the object of interest. According to various embodiments, the content can be presented as a three-dimensional model, depicting an object of interest, although the content can be a two-dimensional image in some embodiments. Furthermore, in some embodiments, the context can be presented as a two-dimensional model depicting the scenery surrounding the object of interest. Although in many examples the context can provide two-dimensional views of the scenery surrounding the object of interest, the context can also include three-dimensional aspects in some embodiments. In various embodiments, such surround view may be generated by systems and methods described in U.S. patent application Ser. No. 14/530,669 titled ANALYSIS AND MANIPULATION OF IMAGES AND VIDEO FOR GENERATION OF SURROUND VIEWS, previously referenced above.

In the present example embodiment, one or more enhancement algorithms can be applied. In particular example embodiments, various algorithms can be employed during capture of surround view data, regardless of the type of capture mode employed. These algorithms can be used to enhance the user experience. For instance, automatic frame selection, image stabilization, object segmentation, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data. For example, automatic frame selection may be implemented to reduce storage of images by identifying and saving one or more keyframes from all the capture images such that viewpoints of an object of interest are more uniformly distributed in space. Image stabilization may be implemented to stabilize keyframes in a surround view to produce improvements such as smoother transitions, improved/enhanced focus on the content, etc.

Additionally, view interpolation can be used to improve the viewing experience. In particular, to avoid sudden "jumps" between stabilized frames, synthetic, intermediate views can be rendered on the fly. View interpolation may only be applied to foreground regions, such as the object of interest. This can be informed by content-weighted keypoint tracking and IMU information, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation. These and other enhancement algorithms may be described with reference to systems and methods described in U.S. patent application Ser. No. 14/800,638 titled ARTIFICIALLY RENDERING IMAGES USING INTERPOLATION OF TRACKED CONTROL POINTS, and U.S. patent application Ser. No. 14/860,983 titled ARTIFICIALLY RENDERING IMAGES USING VIEWPOINT INTERPOLATION AND EXTRAPOLATION, previously referenced above.

Content for augmented reality (AR) and/or virtual reality (VR) viewing may be generated from the surround view data. According to various embodiments, additional image processing can generate a stereoscopic three-dimensional view of an object of interest to be presented to a user of a viewing device, such as a virtual reality headset. According to various examples, the subject matter featured in the images can be separated into content (foreground) and context (background) by semantic segmentation with neural networks and/or fine grained segmentation refinement using temporal conditional random fields. The resulting separation may be used to remove background imagery from the foreground such that only parts of the images corresponding to the object of interest can be displayed. In various embodiments, stereoscopic pairs of image frames may be generated by systems and methods described in the U.S. patent application Ser. No. 15/408,211 titled GENERATING STERIO PAIRS OF IMAGES FROM A SINGLE Lens CAMERA by Holzer et al., filed on Jan. 17, 2017 which application is incorporated by reference herein in its entirety and for all purposes. Stabilization my image by determining image rotation and focal length may be implemented to create stereoscopic image pairs, as described in the U.S. patent application Ser. No. 15/408,270 titled GENERATING STERIO PAIRS OF IMAGES FROM A SINGLE Lens CAMERA by Holzer et al., filedc on Jan. 17, 2017 which application is incorporated by reference herein in its entirety and for all purposes.

Additionally, view interpolation can be implemented to infinitely smooth the transition between image frames by generating any number of intermediate artificial image frames. Furthermore, capture keyframes and/or interpolated frames may be grouped into stereoscopic pairs (stereo pairs) of image frames. Stereoscopic pairs of the surround view may be presented to the user such that the user may perceive depth within the 3D surround view, and add to the user experience when viewing a 3D surround view. The image frames within each stereoscopic pair may correspond to a 2D image used to create the surround view. The image frames within each stereoscopic pair may be a set of 2D images that are separated by a predetermined spatial baseline. Such baseline may be determined based on a predetermined angle of vergence at a particular focal point and the distance from the focal point. Image rotation may also be used to correct one or more images within the stereo pair such that the line of site to an object of interest or other desired focal point is perpendicular to the image frame. As such, stereographic pairs of frames may be generated on the fly from existing images captured by a single image view. Thus, experience of depth can be provided without storage of additional images, as required by existing methods.

The image frames are then mapped to a rotation display such that movement of a user and/or corresponding viewing device can determine which image frames to display. For example, image indexes are matched with various physical locations corresponding to a camera translation around an object of interest. Thus, a user can perceive a stereoscopic three-dimensional surround view of an object of interest at various angles and focal lengths. Such surround view provides a three-dimensional view of the content without rendering and/or storing an actual three-dimensional model using polygon generation or texture mapping over a three-dimensional mesh and/or polygon model. The three-dimensional effect provided by the surround view is generated simply through stitching of actual two-dimensional images and/or portions thereof, and grouping of stereoscopic pairs of images.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view.

In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment. The surround view may also be displayed to a user as virtual reality (VR) and/or augmented reality (AR) at a viewing device, such as a virtual reality headset. In various embodiments, VR applications may simulate a user's physical presence in an environment and enable the user to interact with this space and any objects depicted therein. Images may also be presented to a user as augmented reality (AR), which is a live direct or indirect view of a physical, real-world environment whose elements are augmented (or supplemented) by computer-generated sensory input such as sound, video, graphics, or GPS data. When implemented in conjunction with systems and method described herein, such AR and/or VR content may be generated on the fly, thereby decreasing the number of images and other data to be stored by the system. Systems and methods described herein may also reduce processing time and power requirements, thereby allowing AR and/or VR content to be generated more quickly in real-time and/or near real-time.

Example Embodiments

According to various embodiments of the present disclosure, a surround view is a multi-view interactive digital media representation. With reference to FIG. 1, shown is one example a system 100 for real-time capture and generation of augmented reality (AR) and/or virtual reality (VR) content. In the present example embodiment, the system 100 is depicted in a flow sequence that can be used to generate a surround view for AR and/or VR. According to various embodiments, the data used to generate a surround view can come from a variety of sources. In particular, data such as, but not limited to two-dimensional (2D) images 104 can be used to generate a surround view. These 2D images can include color image data streams such as multiple image sequences, video data, etc., or multiple images in any of various formats for images, depending on the application. Another source of data that can be used to generate a surround view includes location information 106. This location information 106 can be obtained from sources such as accelerometers, gyroscopes, magnetometers, GPS, WiFi, IMU-like systems (Inertial Measurement Unit systems), and the like. Yet another source of data that can be used to generate a surround view can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a surround view can be generated a combination of data that includes both 2D images 104 and location information 106, without any depth images 108 provided. In other embodiments, depth images 108 and location information 106 can be used together at sensor fusion block 110. Various combinations of image data can be used with location information at 106, depending on the application and available data.

In the present example embodiment, the data that has been fused together at sensor fusion block 110 is then used for content modeling 112 and context modeling 114. As described in more detail with regard to FIG. 5, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional image depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 4.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a surround view can be generated without a user specified target in some applications.

In the present example embodiment, one or more enhancement algorithms can be applied at enhancement algorithm(s) block 116. In particular example embodiments, various algorithms can be employed during capture of surround view data, regardless of the type of capture mode employed. These algorithms can be used to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, image stabilization can be used for a surround view in a manner similar to that used for video. In particular, keyframes in a surround view can be stabilized for to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixelto-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, view interpolation may be implemented as infinite smoothing, which may also be used to improve the viewing experience by creating a smoother transition between displayed frames, which may be actual or interpolated, as described above. Infinite smoothing may include determining a predetermined amount of possible transformations between frames. A Harris corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. A RANSAC (random sample consensus) algorithm may then be implemented to determine a number of the most common occurring transformations possible based on all possible transformations of the keypoints between frames. For example, a smooth flow space of eight possible transformations and/or motions for various pixels between frames may be discretized. Different transformations may be assigned to different pixels in a frame. Such keypoint detection, keypoint tracking, and RANSAC algorithms may be run offline. In some embodiments, infinite smoothing algorithms may be run in real time on the fly. For example, as the user navigate to a particular translation position, and if that translation position does not already correspond to an existing and/or captured image frame, the system may generate an appropriate artificial image frame corresponding to the particular translation position using the optimal transformation chosen from the possible transformation candidates.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 116. In particular, compression can be used to enhance user-experience by reducing data upload and download costs. Because surround views use spatial information, far less data can be sent for a surround view than a typical video, while maintaining desired qualities of the surround view. Specifically, the IMU, keypoint tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 118 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used to enhance various fields such as e-commerce, visual search, 3D printing, file sharing, user interaction, and entertainment.

According to various example embodiments, once a surround view 118 is generated, user feedback for acquisition 120 of additional image data can be provided. In particular, if a surround view is determined to need additional views to provide a more accurate model of the content or context, a user may be prompted to provide additional views. Once these additional views are received by the surround view acquisition system 100, these additional views can be processed by the system 100 and incorporated into the surround view.

The surround view 118 may further be processed at AR/VR content generation block 122 to create content for various AR/VR systems. Such AR/VR content block 122 may comprise a processing module which can segment the images to extract an object of interest and/or background imagery through semantic segmentation and/or fine-grained segmentation further described with reference to FIGS. 11 and 12, respectively. Further enhancement algorithms may be implemented at AR/VR content generation block 122, such as those described with reference to block 116. For example, view interpolation may be applied to determine parameters for any number of artificial intermediate images to result in an infinitely smooth transition between image frames, as further described with reference to FIGS. 13-21. Furthermore, stereoscopic pairs of image frames may be determined, which can be presented to the user to provide a perception of depth, as further described with reference to FIGS. 22-24. The indexes for the image frames may further be mapped to the rotation range of the camera translation, allowing image frames to correspond to the position of a user and/or viewing device.

Figure 2:
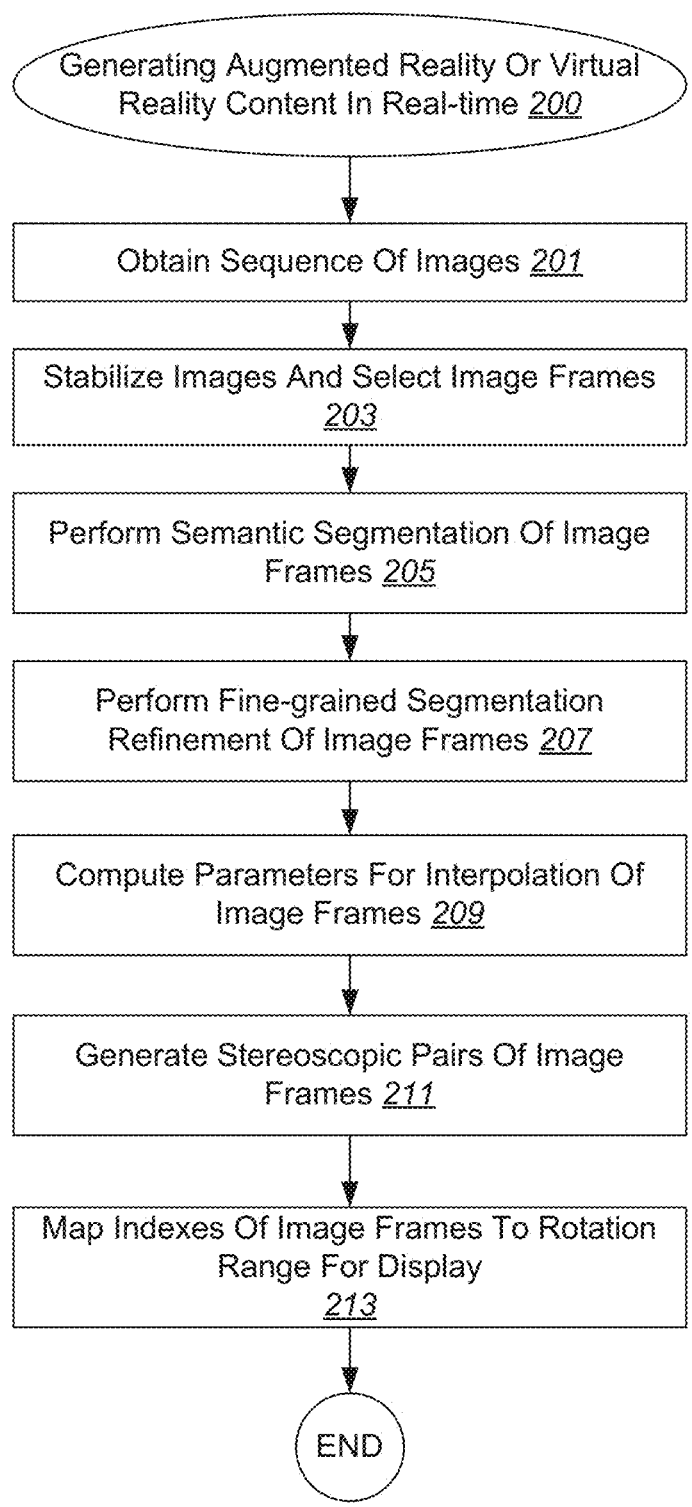
FIG. 2 illustrates an example of a process flow for real-time AR/VR content capture and generation.

With reference to FIG. 2, shown is an example of a method 200 for generating augmented reality and/or virtual reality content in real-time. In various embodiments, method 200 utilizes system 100 and/or various methods described with respect to process 300 described below. In some embodiments, method 200 may be a process performed at AR/VR content generation block 122. Method 200 may produce AR/VR content that provides a user with a three-dimensional surround view of an object of interest with depth.

At step 201, a sequence of images is obtained. In some embodiments, the sequence of images may include 2D images, such as 2D images 104. In some embodiments, other data may also be obtained from the camera and/or user, including location information, such as location information 106, as well as depth information. At step 203, the images are stabilized and a set of image frames are selected. The selected image frames may be referred to as keyframes. Such keyframes may be processed into a surround view through content modeling 112, context modeling 114, and/or enhancement algorithms 116, as described above with reference to FIG. 1.

According to various aspects of the present disclosure, AR/VR content is further generated by extracting an object of interest or other content, such as a person, within a sequence of images to separate it from the background and other context imagery. This may be achieved by applying various segmentation algorithms and processes to the images. In an example embodiment, semantic segmentation of the keyframes is performed to separate the foreground from the background of the image within each keyframe at step 205. Such semantic segmentation may be performed by a segmenting neural network trained to identify and label pixels within each image frame. Semantic segmentation is further described below with reference to FIG. 11. Furthermore, fine-grained segmentation refinement of the keyframes may be performed at step 207. Step 207 may enhance and/or improve the separation of foreground from the background such that the object of interest is clearly and cleanly isolated without artifacts corresponding to the background. Fine-grained segmentation is further described below with reference to FIG. 12.

At step 209, parameters for interpolation of keyframes are computed. In some embodiments, parameters for interpolation may be determined by determining a number of likely transformations and applying the optimal transformation to each pixel within an image frame. In some embodiments, such parameters may be determined offline and used to render images at runtime when the surround view is viewed by a user. Interpolation of keyframes and rendering of artificial frames are further described below with reference to FIGS. 13-21. According to various methods described herein, any number of image frames may be rendered between two keyframes of the surround view based on the location of the user and/or viewing device, which provides a viewpoint at any location around an object of interest, as well as a smooth transition between keyframes.

At step 211, stereoscopic pairs of image frames are generated. In some embodiments, stereoscopic pairs may be generated by determining the pair of frames that will a desired perception of depth based on the distance of the camera to the object of interest and an angle of vergence. In some embodiments, one or more image frames within a stereoscopic pair may include an artificially interpolated image. In some embodiments, one or more image frames within a stereoscopic pair may be corrected by applying a rotation transformation such that the line of site is perpendicular to the plane of the image frame. Generation of stereoscopic pairs is further described below with reference to FIGS. 22-24.

At step 213, indexes of the image frames are mapped to a rotation range for display. In some embodiments, the rotation range may be concave arc around an object of interest. In other embodiments, the rotation range may be a convex image rotation. Various rotation ranges may correspond to the various types of camera translations and positions described with reference to FIGS. 4, 6A-6B, 7A-7E, 8 and 9. For example, in an image sequence of 150 images, the leftmost frame in a captured image sequence may be keyframe 0, and the last frame corresponding to the end of the camera translation may be keyframe 150. In some embodiments, the captured frames or selected keyframes may be uniformly distributed along the rotation range. In other embodiments, they may be distributed based on location and/or other IMU data.

In various embodiments, the physical viewing location is matched to the frame index. Thus, if a user and/or viewing device is at the middle of the rotation range, then an image frame corresponding to the middle of the rotation range should be displayed. In some embodiments, such information is loaded into a viewing device, such as headset 2500, described with reference to FIG. 25. Thus, based on the position of the headset 2500, the appropriate image and/or stereoscopic pair of images may be displayed to the user.

In various embodiments, AR/VR content generated by process flow 200 can include an object of interest which may be viewed by a user as a three-dimensional model from various angles and/or viewpoints. In some embodiments, the surround view model is not an actual three-dimensional model that is rendered, but a three-dimensional view experienced as a three-dimensional model model by the user. For example, the surround view provides a three-dimensional view of the content without rendering and/or storing an actual three-dimensional model. In other words, there is no polygon generation or texture mapping over a three-dimensional mesh and/or polygon model. However, the user still perceives the content and/or context as an actual three-dimensional model. The three-dimensional effect provided by the surround view is generated simply through stitching of actual two-dimensional images and/or portions thereof. As used herein, the term "three-dimensional model" is used interchangeably with this type of three-dimensional view.

Surround View Generation

Figure 3:
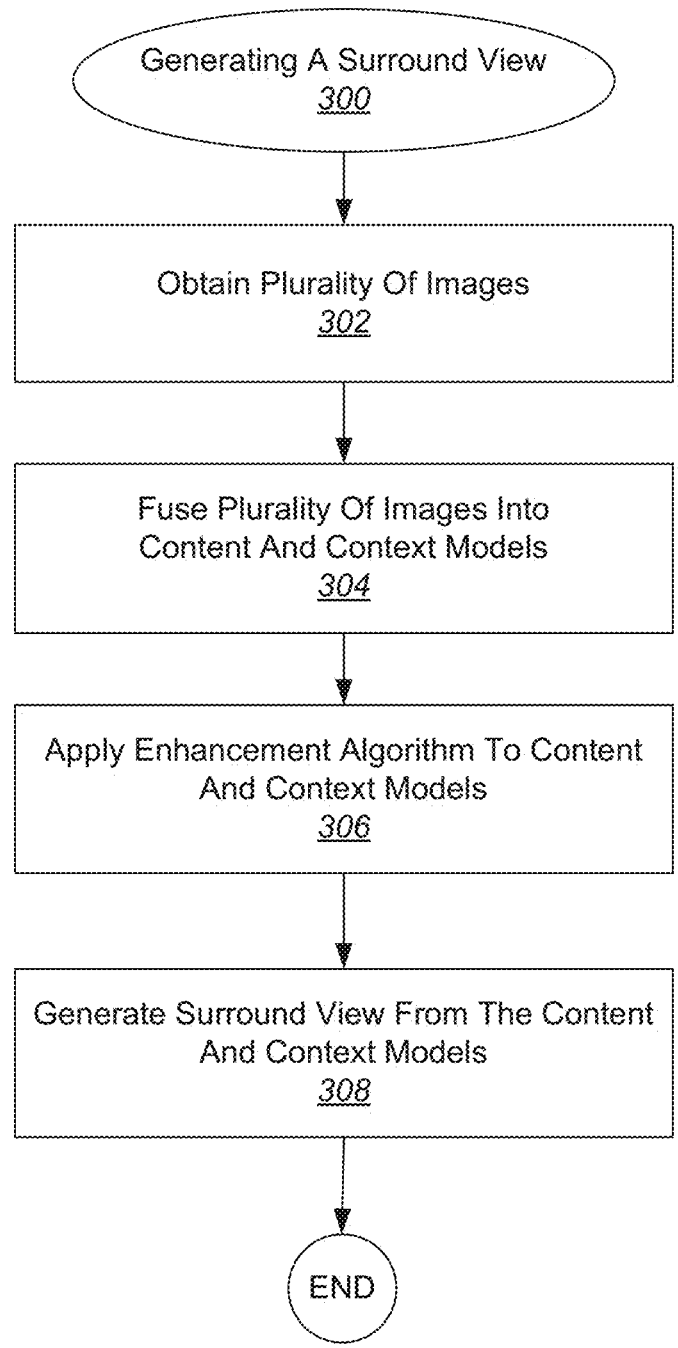
FIG. 3 illustrates an example of a process flow for generating a surround view.

With reference to FIG. 3, shown is illustrates an example of a process flow for generating a surround view. In the present example, a plurality of images is obtained at 302. According to various embodiments, the plurality of images may be various types of images obtained by various types of cameras. For example, a camera may be a digital camera in a continuous shooting mode (or burst mode) configured to capture a number of frames in a certain amount of time, such as five frames per second. In other embodiments, the camera may be a camera on a smartphone. In some embodiments, the camera may be configured to capture the plurality of images as a continuous video.

According to various embodiments, the plurality of images can include two-dimensional (2D) images or data streams. These 2D images can include location information that can be used to generate a surround view. In some embodiments, the plurality of images can include depth images 108, as also described above with regard to FIG. 1. The depth images can also include location information in various examples.

According to various embodiments, the plurality of images obtained at 302 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 304. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 306. These algorithms can be used to enhance the user experience. For instance, enhancement algorithms such as automatic frame selection, stabilization, view interpolation, image rotation, infinite smoothing, filters, and/or compression can be used. In some examples, these enhancement algorithms can be applied to image data during capture of the images. In other examples, these enhancement algorithms can be applied to image data after acquisition of the data.

In the present embodiment, a surround view is generated from the content and context models at 308. The surround view can provide a multi-view interactive digital media representation. In various examples, the surround view can include a three-dimensional model of the content and a two-dimensional model of the context. According to various embodiments, depending on the mode of capture and the viewpoints of the images, the surround view model can include certain characteristics. For instance, some examples of different styles of surround views include a locally concave surround view, a locally convex surround view, and a locally flat surround view. However, it should be noted that surround views can include combinations of views and characteristics, depending on the application. In some embodiments, the surround view model is not an actual three-dimensional model that is rendered, but a three-dimensional view experienced as a three-dimensional model model by the user. For example, the surround view provides a three-dimensional view of the content without rendering and/or storing an actual three-dimensional model.

Figure 4:
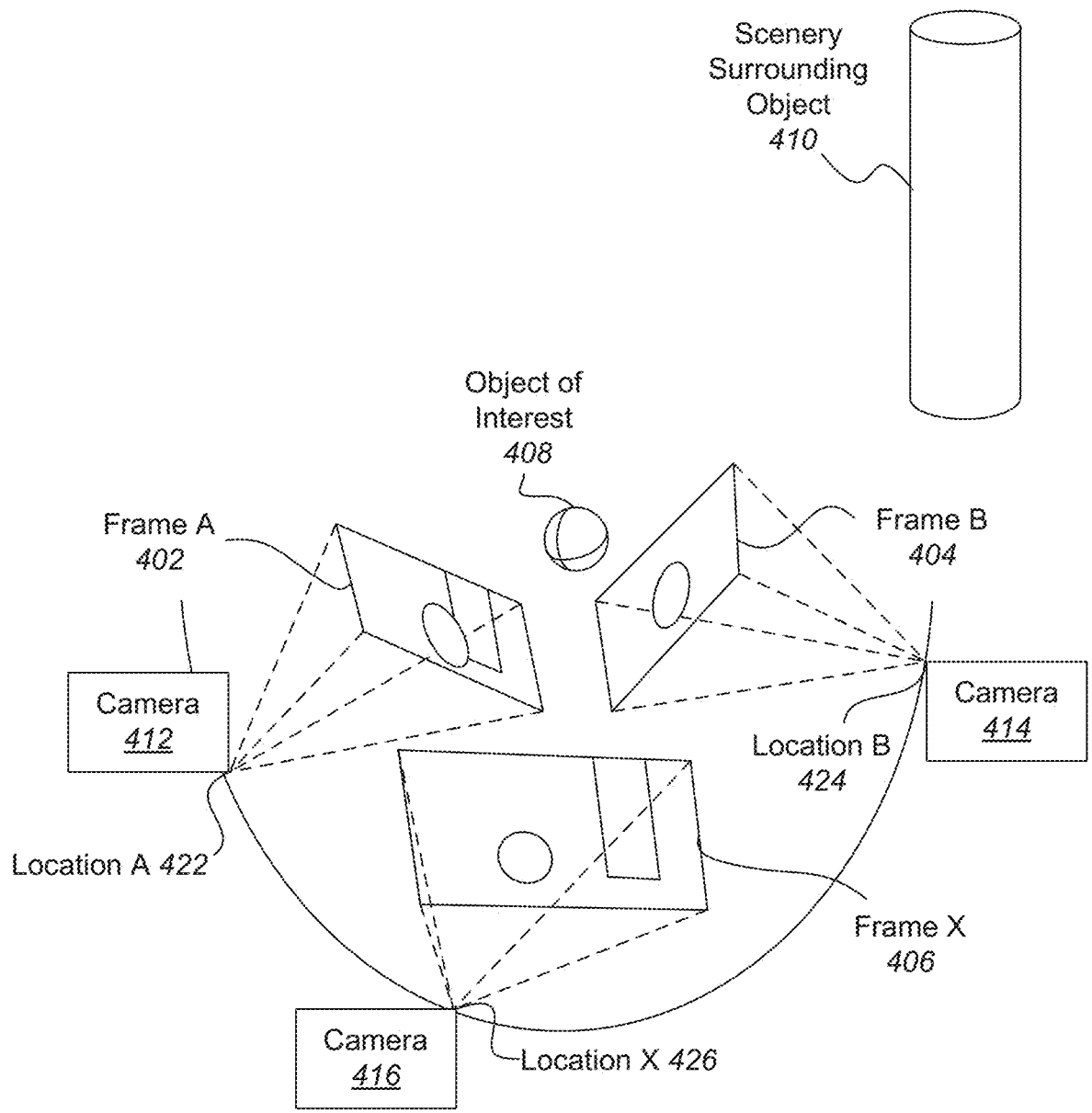
FIG. 4 illustrates one example of multiple camera views that can be fused into a three-dimensional (3D) model to create an immersive experience.

With reference to FIG. 4, shown is one example of multiple camera frames that can be fused together into a three-dimensional (3D) model to create an immersive experience. According to various embodiments, multiple images can be captured from various viewpoints and fused together to provide a surround view. In the present example embodiment, three cameras 412, 414, and 416 are positioned at location A 422, location B 424, and location X 426, respectively, in proximity to an object of interest 408. Scenery can surround the object of interest 408 such as object 410. Frame A 402, frame B 404, and frame X 406 from their respective cameras 412, 414, and 416 include overlapping subject matter. Specifically, each frame 402, 404, and 406 includes the object of interest 408 and varying degrees of visibility of the scenery surrounding the object 410. For instance, frame A 402 includes a view of the object of interest 408 in front of the cylinder that is part of the scenery surrounding the object 410. View 406 shows the object of interest 408 to one side of the cylinder, and view 404 shows the object of interest without any view of the cylinder.

In the present example embodiment, the various frames, frame A 402, frame B 404, and frame X 416, along with their associated locations, location A 422, location B 424, and location X 426, respectively, provide a rich source of information about object of interest 408 and the surrounding context that can be used to produce a surround view. For instance, when analyzed together, the various frames 402, 404, and 426 provide information about different sides of the object of interest and the relationship between the object of interest and the scenery. According to various embodiments, this information can be used to parse out the object of interest 408 into content and the scenery as the context. Furthermore, as also described above with regard to FIGS. 1 and 2, various algorithms can be applied to images produced by these viewpoints to create an immersive, interactive experience when viewing a surround view.

In some embodiments Frame X 406 may be an artificially rendered image that is generated for a viewpoint at Location X 426 on a trajectory between Location A 422 and Location B 424. In such example, a single transform for viewpoint interpolation is used along the trajectory between two frames, Frame A 402 and Frame B 404. As previously described, Frame A 402 represents an image captured of objects 408 and 410 by a camera 412 located at Location A 422. Frame B 404 represents an image captured of object 408 by a camera 414 located at Location B 424. In the present example, the transformation (T_AB) is estimated between the two frames, where T_AB maps a pixel from frame A to frame B. This transformation is performed using methods such as homography, affine, similarity, translation, rotation, or scale.

In the present example, an artificially rendered image at Location X 426, which can also be denoted as a viewpoint position at x \in [0, 1] on the trajectory between frame A and B, where frame A is located at 0 and frame B at 1, is then generated by interpolating the transformation, gathering image information from Frames A and B, and combining the image information. In the present example, the transformation is interpolated (T_AX and T_XB). One way to interpolate this transformation is to parameterize the transformation T_AB and linearly interpolate those parameters. However, this interpolation is not limited to linear interpolations and other methods can be used within the scope of this disclosure. Next, image information is gathered from both Frames A and B by transferring image information from Frame A 402 to Frame X 406 based on T_AX and by transferring image information from Frame B 404 to Frame X 406 based on T_XB. Finally, the image information gathered from both Frames A and B is combined to generate an artificially rendered image at Location X 426. Interpolation to render artificial frames is further described below with references to FIGS. 13-21.

Figure 5:
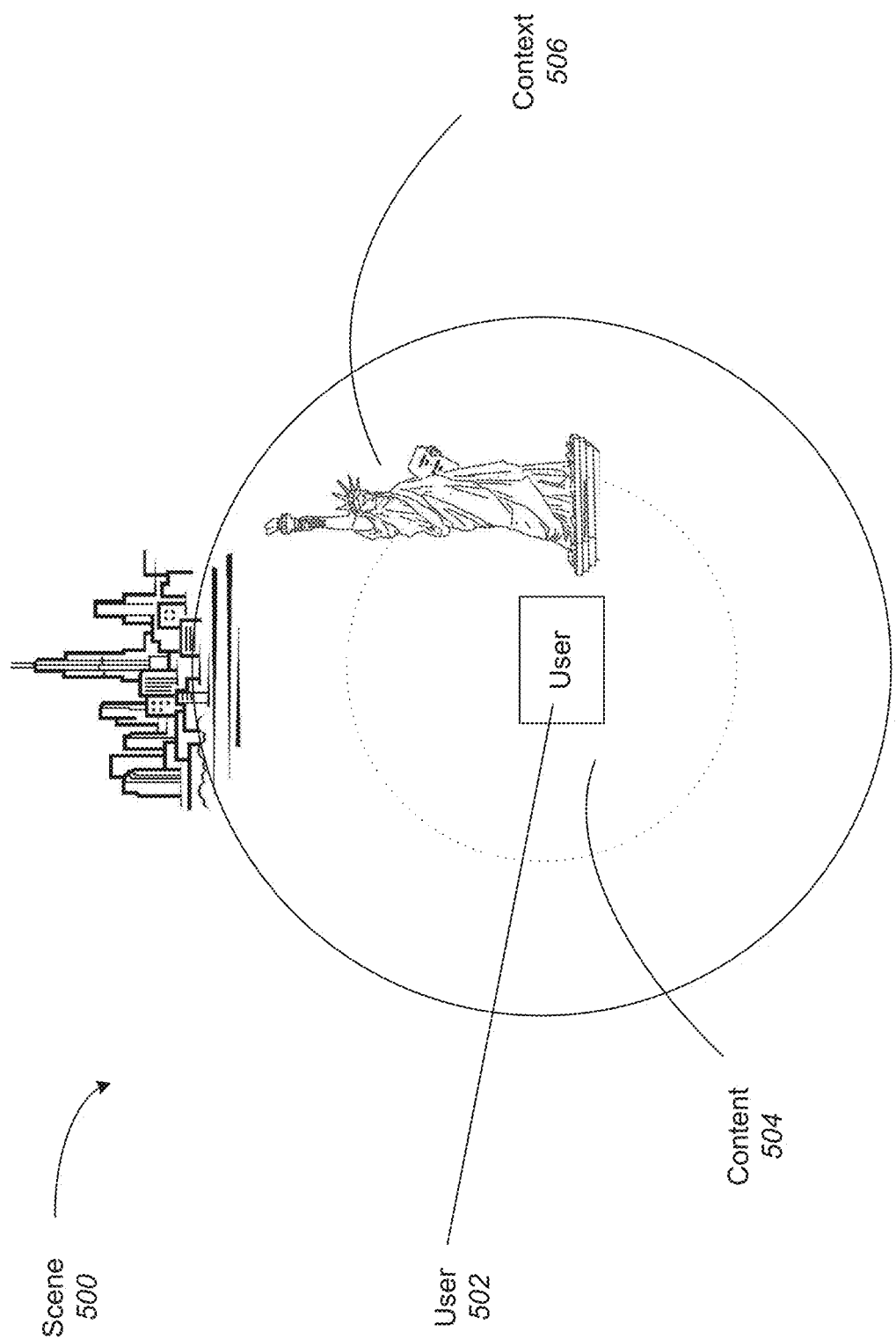
FIG. 5 illustrates one example of separation of content and context in a surround view.

FIG. 5 illustrates one example of separation of content and context in a surround view. According to various embodiments of the present disclosure, a surround view is a multi-view interactive digital media representation of a scene 500. With reference to FIG. 5, shown is a user 502 located in a scene 500. The user 502 is capturing images of an object of interest, such as a statue. The images captured by the user constitute digital visual data that can be used to generate a surround view.

According to various embodiments of the present disclosure, the digital visual data included in a surround view can be, semantically and/or practically, separated into content 504 and context 506. According to particular embodiments, content 504 can include the object(s), person(s), or scene(s) of interest while the context 506 represents the remaining elements of the scene surrounding the content 504. In some examples, a surround view may represent the content 504 as three-dimensional data, and the context 506 as a two-dimensional panoramic background. In other examples, a surround view may represent both the content 504 and context 506 as two-dimensional panoramic scenes. In yet other examples, content 504 and context 506 may include three-dimensional components or aspects. In particular embodiments, the way that the surround view depicts content 504 and context 506 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 504 and the context 506 may be the same. In these examples, the surround view produced may have some characteristics that are similar to other types of digital media such as panoramas. However, according to various embodiments, surround views include additional features that distinguish them from these existing types of digital media. For instance, a surround view can represent moving data. Additionally, a surround view is not limited to a specific cylindrical, spherical or translational movement. Various motions can be used to capture image data with a camera or other capture device. Furthermore, unlike a stitched panorama, a surround view can display different sides of the same object.

FIGS. 6A-6B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a surround view.

With reference to FIG. 6A, shown is one example of a concave view 600 in which a user is standing along a vertical axis 608. In this example, the user is holding a camera, such that camera location 602 does not leave axis 608 during image capture. However, as the user pivots about axis 608, the camera captures a panoramic view of the scene around the user, forming a concave view. In this embodiment, the object of interest 604 and the distant scenery 606 are all viewed similarly because of the way in which the images are captured. In this example, all objects in the concave view appear at infinity, so the content is equal to the context according to this view.

With reference to FIG. 6B, shown is one example of a convex view 620 in which a user changes position when capturing images of an object of interest 624. In this example, the user moves around the object of interest 624, taking pictures from different sides of the object of interest from camera locations 628, 630, and 632. Each of the images obtained includes a view of the object of interest, and a background of the distant scenery 626. In the present example, the object of interest 624 represents the content, and the distant scenery 626 represents the context in this convex view.

FIGS. 7A-7E illustrate examples of various capture modes for surround views. Although various motions can be used to capture a surround view and are not constrained to any particular type of motion, three general types of motion can be used to capture particular features or views described in conjunction surround views. These three types of motion, respectively, can yield a locally concave surround view, a locally convex surround view, and a locally flat surround view. In some examples, a surround view can include various types of motions within the same surround view. As described with reference to FIGS. 7A-7E, the type of surround view (for example, concave or convex) is described with reference to the direction of the camera view.

Figure 7A:
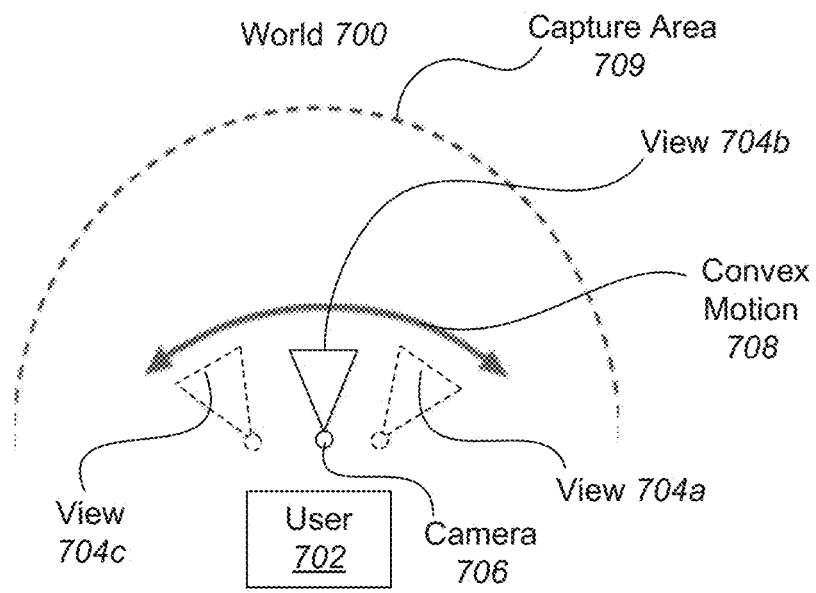
FIGS. 7A-7E illustrate examples of various capture modes for surround views.

With reference to FIG. 7A, shown is an example of a back-facing, convex surround view being captured. According to various embodiments, a locally convex surround view is one in which the viewing angles of the camera or other capture device diverge. In one dimension this can be likened to the motion required to capture a spherical 370 panorama (pure rotation), although the motion can be generalized to any curved sweeping motion in which the view faces outward. In the present example, the experience is that of a stationary viewer looking out at a (possibly dynamic) context.

In the present example embodiment, a user 702 is using a back-facing camera 706 to capture images towards world 700, and away from user 702. As described in various examples, a back-facing camera refers to a device with a camera that faces away from the user, such as the camera on the back of a smart phone. The camera is moved in a concave motion 708, such that views 704a, 704b, and 704c capture various parts of capture area 709.

Figure 7B:
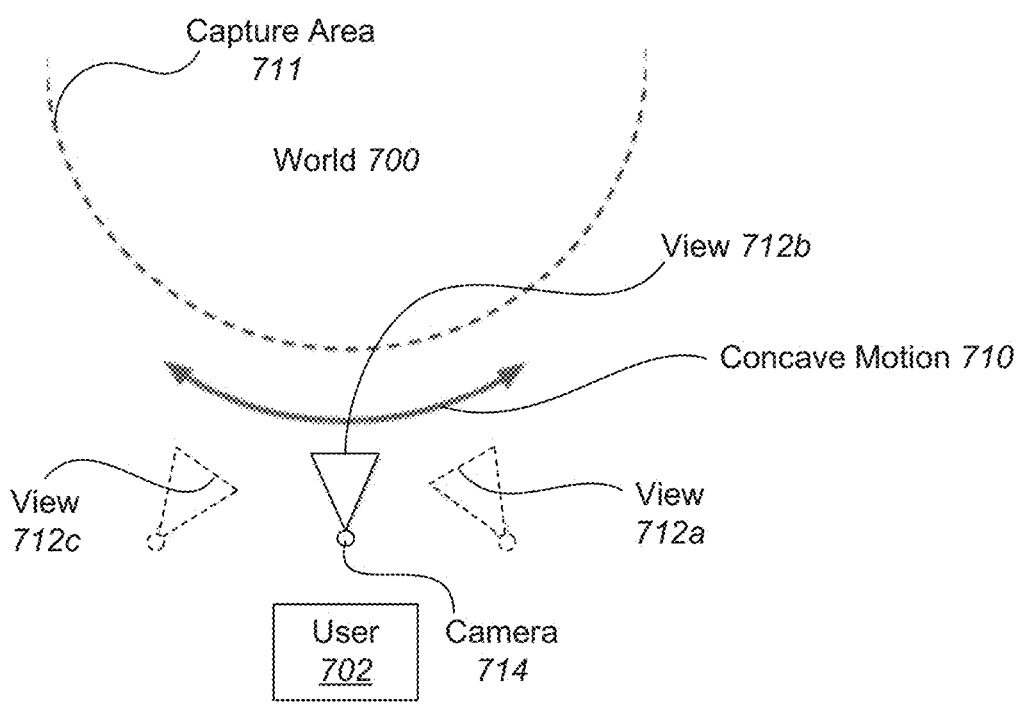

With reference to FIG. 7B, shown is an example of a back-facing, concave surround view being captured. According to various embodiments, a locally concave surround view is one in which viewing angles converge toward a single object of interest. In some examples, a locally concave surround view can provide the experience of orbiting about a point, such that a viewer can see multiple sides of the same object. This object, which may be an "object of interest," can be segmented from the surround view to become the content, and any surrounding data can be segmented to become the context. Previous technologies fail to recognize this type of viewing angle in the media-sharing landscape.

In the present example embodiment, a user 702 is using a back-facing camera 714 to capture images towards world 700, and away from user 702. The camera is moved in a concave motion 710, such that views 712a, 712b, and 712c capture various parts of capture area 711. As described above, world 700 can include an object of interest in some examples, and the convex motion 710 can orbit around this object. Views 712a, 712b, and 712c can include views of different sides of this object in these examples.

Figure 7C:
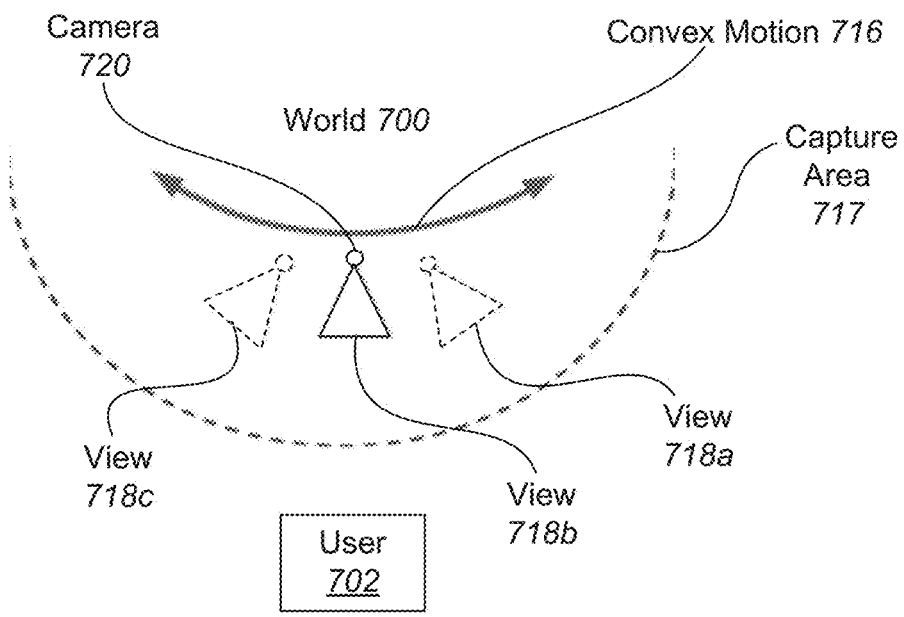

With reference to FIG. 7C, shown is an example of a front-facing, convex surround view being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 720 is facing user 702. The camera follows a convex motion 706 such that the views 718a, 718b, and 718c diverge from each other in an angular sense. The capture area 717 follows a convex shape that includes the user at a perimeter.

Figure 7D:
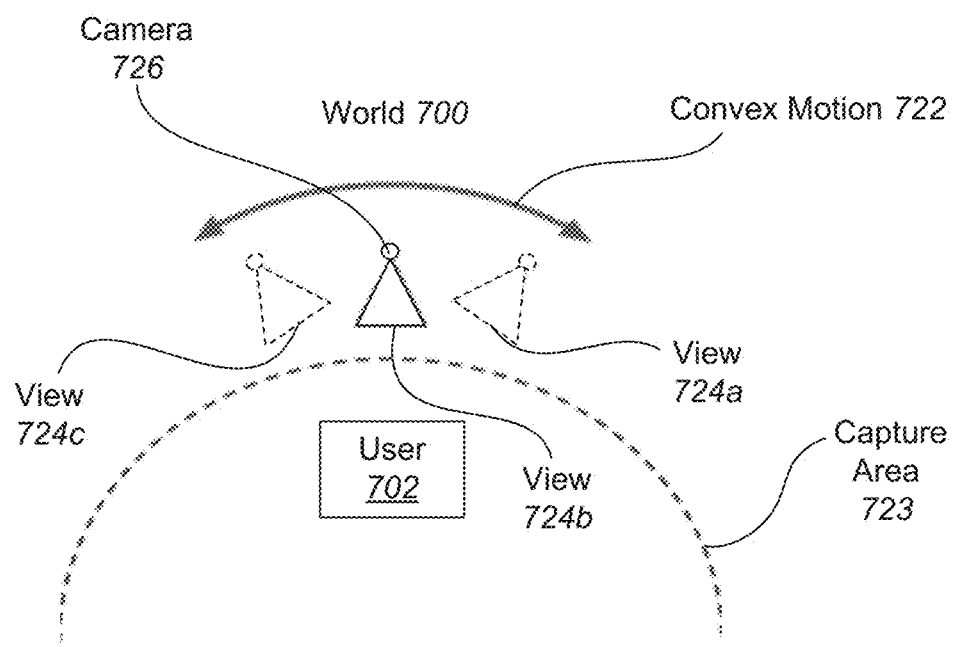

With reference to FIG. 7D, shown is an example of a front-facing, concave surround view being captured. In the present example embodiment, camera 726 is facing user 702. The camera follows a concave motion 722 such that the views 724a, 724b, and 724c converge towards the user 702. The capture area 717 follows a concave shape that surrounds the user 702.

Figure 7E:
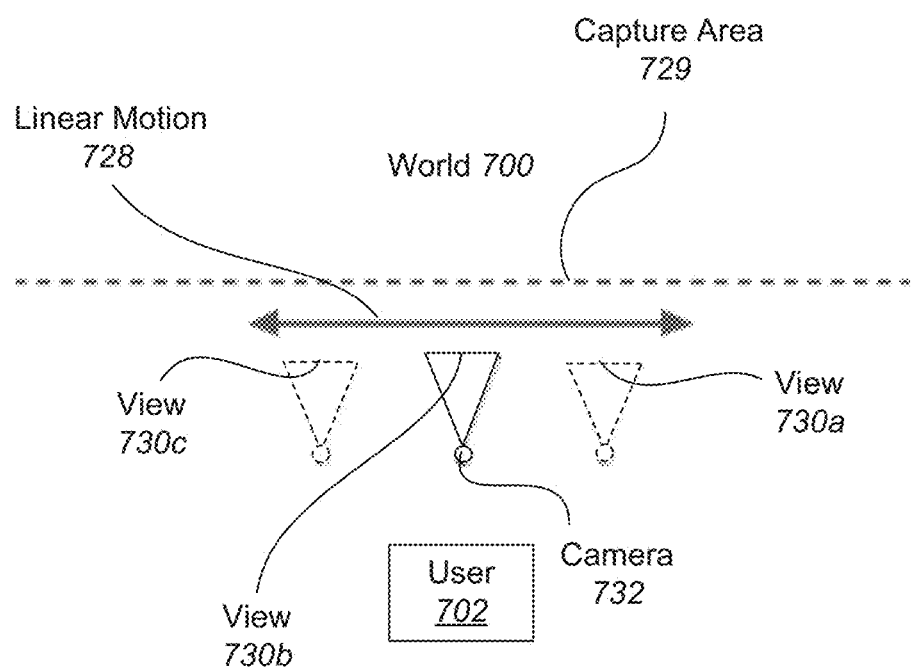

With reference to FIG. 7E, shown is an example of a back-facing, flat view being captured. In particular example embodiments, a locally flat surround view is one in which the rotation of the camera is small compared to its translation. In a locally flat surround view, the viewing angles remain roughly parallel, and the parallax effect dominates. In this type of surround view, there can also be an "object of interest", but its position does not remain fixed in the different views. Previous technologies also fail to recognize this type of viewing angle in the media-sharing landscape.

In the present example embodiment, camera 732 is facing away from user 702, and towards world 700. The camera follows a generally linear motion 728 such that the capture area 729 generally follows a line. The views 730a, 730b, and 730c have generally parallel lines of sight. An object viewed in multiple views can appear to have different or shifted background scenery in each view. In addition, a slightly different side of the object may be visible in different views. Using the parallax effect, information about the position and characteristics of the object can be generated in a surround view that provides more information than any one static image.

As described above, various modes can be used to capture images for a surround view. These modes, including locally concave, locally convex, and locally linear motions, can be used during capture of separate images or during continuous recording of a scene. Such recording can capture a series of images during a single session.

According to various embodiments of the present disclosure, a surround view can be generated from data acquired in numerous ways. For example, data may be acquired by moving a camera through space as described with reference to FIG. 7 of U.S. patent application Ser. No. 14,530,669. In particular, a user may tap a record button on a capture device to begin recording. As movement of the capture device follows a generally leftward direction, an object may move in a generally rightward motion across the screen. As the capture device moves leftward, the object appears to move rightward between subsequent views. In some examples, when the user is finished recording, the record button can be tapped again to end recording. In other examples, the user can tap and hold the record button during recording, and release to stop recording. In the present embodiment, the recording captures a series of images that can be used to generate a surround view.

Figure 8:
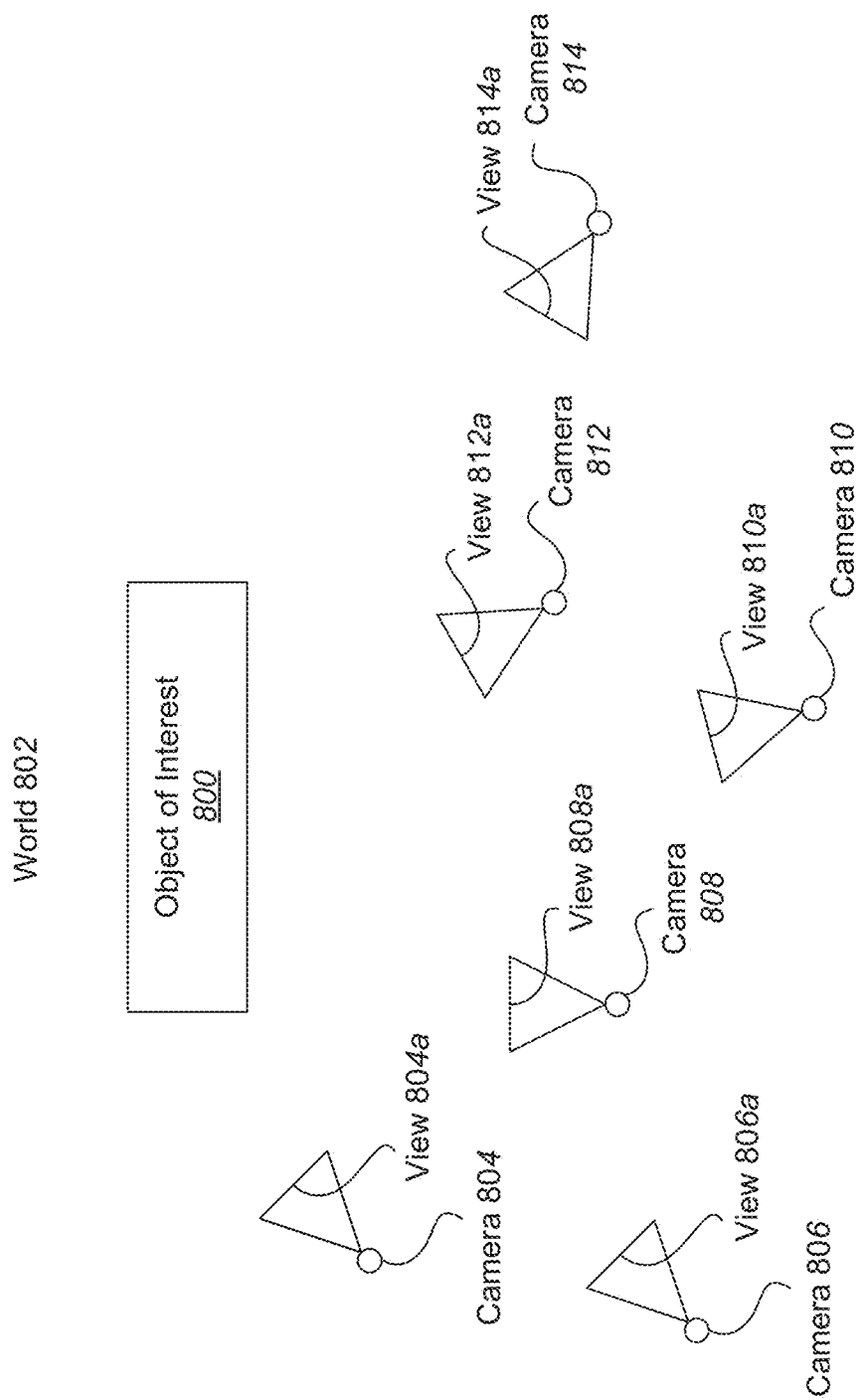
FIG. 8 illustrates one example of a space-time surround view being simultaneously recorded by independent observers.

According to various embodiments, a series of images used to generate a surround view can be captured by a user recording a scene, object of interest, etc. Additionally, in some examples, multiple users can contribute to acquiring a series of images used to generate a surround view. With reference to FIG. 8, shown is one example of a space-time surround view being simultaneously recorded by independent observers.

In the present example embodiment, cameras 804, 806, 808, 810, 812, and 814 are positioned at different locations. In some examples, these cameras 804, 806, 808, 810, 812, and 814 can be associated with independent observers. For instance, the independent observers could be audience members at a concert, show, event, etc. In other examples, cameras 804, 806, 808, 810, 812, and 814 could be placed on tripods, stands, etc. In the present embodiment, the cameras 804, 806, 808, 810, 812, and 814 are used to capture views 804a, 806a, 808a, 810a, 812a, and 814a, respectively, of an object of interest 800, with world 802 providing the background scenery. The images captured by cameras 804, 806, 808, 810, 812, and 814 can be aggregated and used together in a single surround view in some examples. Each of the cameras 804, 806, 808, 810, 812, and 814 provides a different vantage point relative to the object of interest 800, so aggregating the images from these different locations provides information about different viewing angles of the object of interest 800. In addition, cameras 804, 806, 808, 810, 812, and 814 can provide a series of images from their respective locations over a span of time, such that the surround view generated from these series of images can include temporal information and can also indicate movement over time.

As described above with regard to various embodiments, surround views can be associated with a variety of capture modes. In addition, a surround view can include different capture modes or different capture motions in the same surround view. Accordingly, surround views can be separated into smaller parts in some examples, such as described with reference to FIG. 10 of U.S. patent application Ser. No. 14,530,669. For example, a complex surround-view may be separated into smaller, linear parts. In some embodiments, a complex surround view may include a capture area that follows a sweeping L motion, which includes two separate linear motions of the camera. The surround views associated with these separate linear motions can be broken down into two separate surround views. It should be noted that although the linear motions of the complex surround view can be captured sequentially and continuously in some embodiments, such linear motions can also be captured in separate sessions in other embodiments.

In some embodiments, the two linear surround views can be processed independently, and joined with a transition to provide a continuous experience for the user. Breaking down motion into smaller linear components in this manner can provide various advantages. For instance, breaking down these smaller linear components into discrete, loadable parts can aid in compression of the data for bandwidth purposes. Similarly, non-linear surround views can also be separated into discrete components. In some examples, surround views can be broken down based on local capture motion. For example, a complex motion may be broken down into a locally convex portion and a linear portion. In another example, a complex motion can be broken down into separate locally convex portions. It should be recognized that any number of motions can be included in a complex surround view, and that such complex surround view can be broken down into any number of separate portions, depending on the application.

Figure 9:
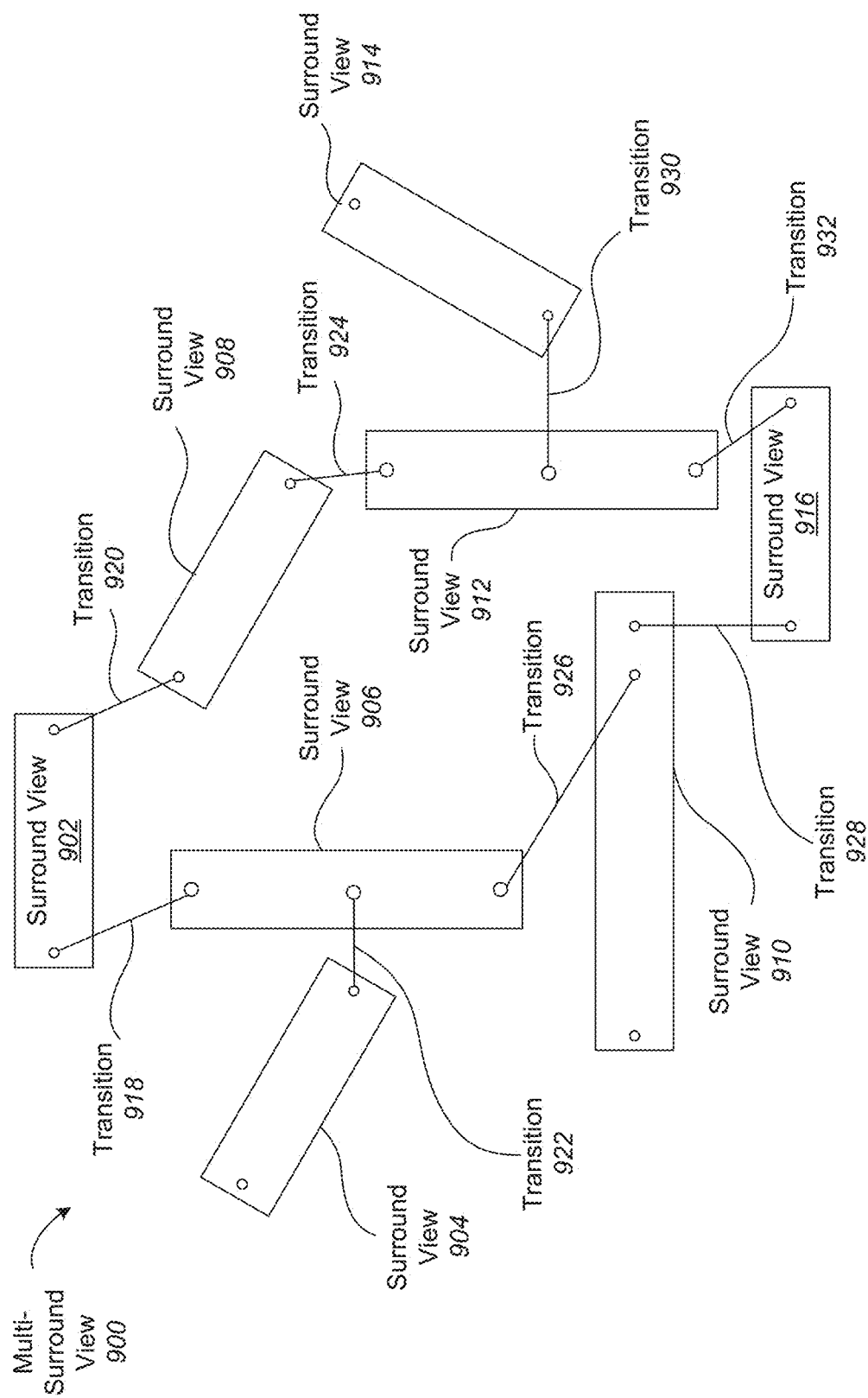
FIG. 9 illustrates one example of a combination of multiple surround views into a multi-surround view.

Although in some applications, it is desirable to separate complex surround views, in other applications it is desirable to combine multiple surround views. With reference to FIG. 9, shown is one example of a graph that includes multiple surround views combined into a multi-surround view 900. In this example, the rectangles represent various surround views 902, 904, 906, 908, 910, 912, 914, and 916, and the length of each rectangle indicates the dominant motion of each surround view. Lines between the surround views indicate possible transitions 918, 920, 922, 924, 926, 928, 930, and 932 between them.

In some examples, a surround view can provide a way to partition a scene both spatially and temporally in a very efficient manner. For very large scale scenes, multi-surround view 900 data can be used. In particular, a multi-surround view 900 can include a collection of surround views that are connected together in a spatial graph. The individual surround views can be collected by a single source, such as a single user, or by multiple sources, such as multiple users. In addition, the individual surround views can be captured in sequence, in parallel, or totally uncorrelated at different times. However, in order to connect the individual surround views, there must be some overlap of content, context, or location, or of a combination of these features. Accordingly, any two surround views would need to have some overlap in content, context, and/or location to provide a portion of a multi-surround view 900. Individual surround views can be linked to one another through this overlap and stitched together to form a multi-surround view 900. According to various examples, any combination of capture devices with either front, back, or front and back cameras can be used.

In some embodiments, multi-surround views 900 can be generalized to more fully capture entire environments. Much like "photo tours" collect photographs into a graph of discrete, spatially-neighboring components, multiple surround views can be combined into an entire scene graph. In some examples, this can be achieved using information obtained from but not limited to: image matching/tracking, depth matching/tracking, IMU, user input, and/or GPS. Within such a graph or multi-surround view, a user can switch between different surround views either at the end points of the recorded motion or wherever there is an overlap with other surround views in the graph. One advantage of multi-surround views over "photo tours" is that a user can navigate the surround views as desired and much more visual information can be stored in surround views. In contrast, traditional "photo tours" typically have limited views that can be shown to the viewer either automatically or by allowing the user to pan through a panorama with a computer mouse or keystrokes.

According to various embodiments, a surround view is generated from a set of images. These images can be captured by a user intending to produce a surround view or retrieved from storage, depending on the application. Because a surround view is not limited or restricted with respect to a certain amount of visibility, it can provide significantly more visual information about different views of an object or scene. More specifically, although a single viewpoint may be ambiguous to adequately describe a three-dimensional object, multiple views of the object can provide more specific and detailed information. These multiple views can provide enough information to allow a visual search query to yield more accurate search results. Because a surround view provides views from many sides of an object, distinctive views that are appropriate for search can be selected from the surround view or requested from a user if a distinctive view is not available. For instance, if the data captured or otherwise provided is not sufficient to allow recognition or generation of the object or scene of interest with a sufficiently high certainty, a capturing system can guide a user to continue moving the capturing device or provide additional image data. In particular embodiments, if a surround view is determined to need additional views to produce a more accurate model, a user may be prompted to provide additional images.

Once a surround view is generated, it can be used in various applications, in particular embodiments. One application for a surround view includes allowing a user to navigate a surround view or otherwise interact with it. According to various embodiments, a surround view is designed to simulate the feeling of being physically present in a scene as the user interacts with the surround view. This experience depends not only on the viewing angle of the camera, but on the type of surround view that is being viewed. Although a surround view does not need to have a specific fixed geometry overall, different types of geometries can be represented over a local segment of a surround view such as a concave, convex, and flat surround view, in particular embodiments.

In particular example embodiments, the mode of navigation is informed by the type of geometry represented in a surround view. For instance, with concave surround views, the act of rotating a device (such as a smartphone, etc.) can mimic that of rotating a stationary observer who is looking out at a surrounding scene. In some applications, swiping the screen in one direction can cause the view to rotate in the opposite direction. This effect is akin to having a user stand inside a hollow cylinder and pushing its walls to rotate around the user. In other examples with convex surround views, rotating the device can cause the view to orbit in the direction it is leaning into, such that the object of interest remains centered. In some applications, swiping the screen in one direction causes the viewing angle to rotate in the same direction: this creates the sensation of rotating the object of interest about its axis or having the user rotate around the object. In some examples with flat views, rotating or moving a device can cause the view to translate in the direction of the device's movement. In addition, swiping the screen in one direction can cause the view to translate in the opposite direction, as if pushing foreground objects to the side.

In some examples, a user may be able to navigate a multi-surround view or a graph of surround views in which individual surround views can be loaded piece by piece and further surround views may be loaded when necessary (e.g. when they are adjacent to/overlap the current surround view and/or the user navigates towards them). If the user reaches a point in a surround view where two or more surround views overlap, the user can select which of those overlapping surround views to follow. In some instances, the selection of which surround view to follow can be based on the direction the user swipes or moves the device.

Figure 10:
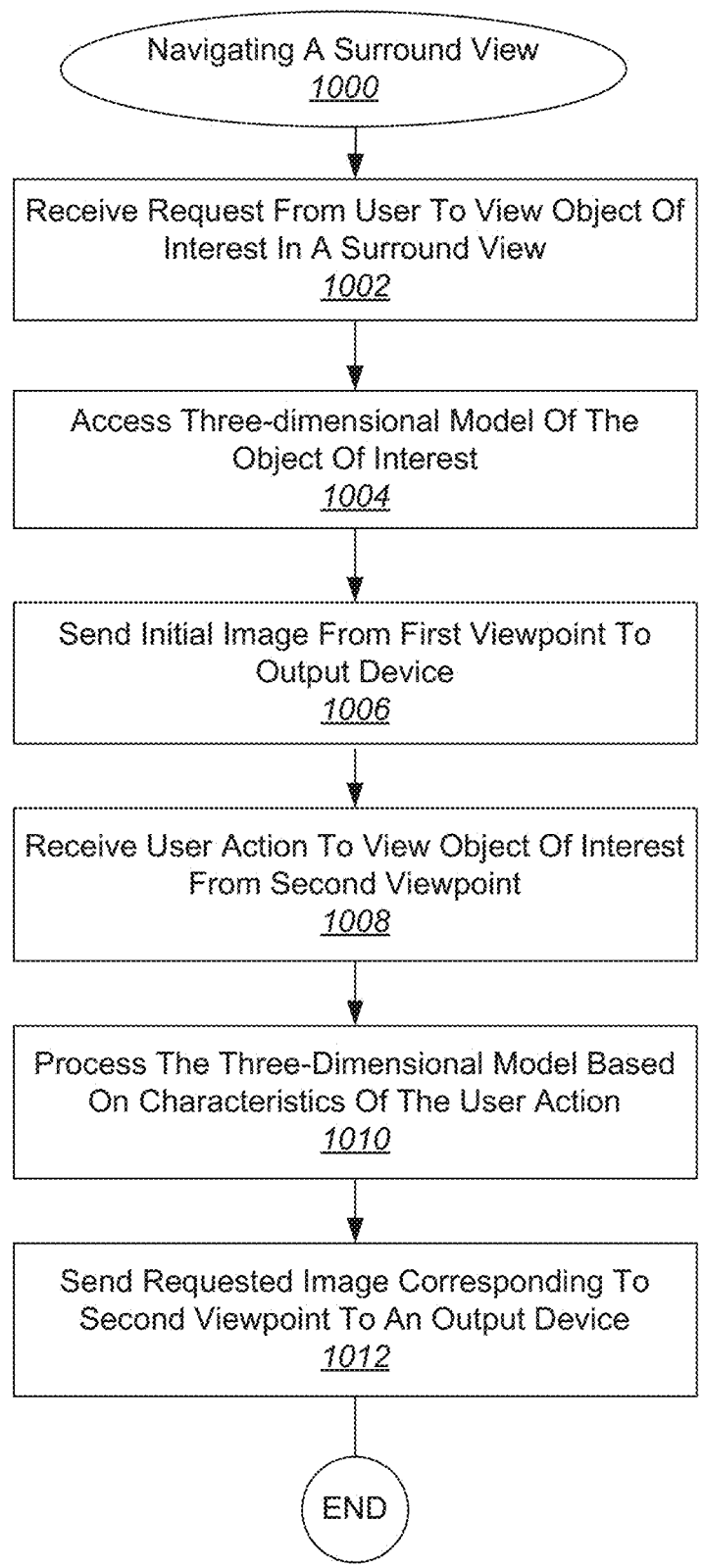
FIG. 10 illustrates one example of a process for navigating a surround view.

With reference to FIG. 10, shown is one example of a process for navigating a surround view 1000. In the present example, a request is received from a user to view an object of interest in a surround view at 1002. According to various embodiments, the request can also be a generic request to view a surround view without a particular object of interest, such as when viewing a landscape or panoramic view. Next, a three-dimensional model of the object is accessed at 1004. This three-dimensional model can include all or a portion of a stored surround view. For instance, the three-dimensional model can be a segmented content view in some applications. An initial image is then sent from a first viewpoint to an output device at 1006. This first viewpoint serves as a starting point for viewing the surround view on the output device.

In the present embodiment, a user action is then received to view the object of interest from a second viewpoint at 1008. This user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Based on the characteristics of the user action, the three-dimensional model is processed at 1010. For instance, movement of the input device can be detected and a corresponding viewpoint of the object of interest can be found. Depending on the application, the input device and output device can both be included in a mobile device, etc. In some examples, the requested image corresponds to an image captured prior to generation of the surround view. In other examples the requested image is generated based on the three-dimensional model (e.g. by interpolation, etc.). An image from this viewpoint can be sent to the output device at 1012. In some embodiments, the selected image can be provided to the output device along with a degree of certainty as to the accuracy of the selected image. For instance, when interpolation algorithms are used to generate an image from a particular viewpoint, the degree of certainty can vary and may be provided to a user in some applications. In other examples, a message can be provided to the output device indicating if there is insufficient information in the surround view to provide the requested images.

In some embodiments, intermediate images can be sent between the initial image at 1006 and the requested image at 1012. In particular, these intermediate images can correspond to viewpoints located between a first viewpoint associated with the initial image and a second viewpoint associated with the requested image. Furthermore, these intermediate images can be selected based on the characteristics of the user action. For instance, the intermediate images can follow the path of movement of the input device associated with the user action, such that the intermediate images provide a visual navigation of the object of interest.

Segmentation of the Object of Interest and Background

According to various aspects of the present disclosure, AR/VR content is further generated by extracting an object of interest or other content, such as a person, within a sequence of images to separate it from the background and other context imagery. This may be achieved by applying various segmentation algorithms and processes to the images, as previously described with reference to FIG. 2. In some embodiments, semantic segmentation using neural networks is performed. In further embodiments, fine-grained segmentation is further performed. In some embodiments fine-grained segmentation may utilize conditional random fields and/or temporal conditional random fields.

Figure 11:
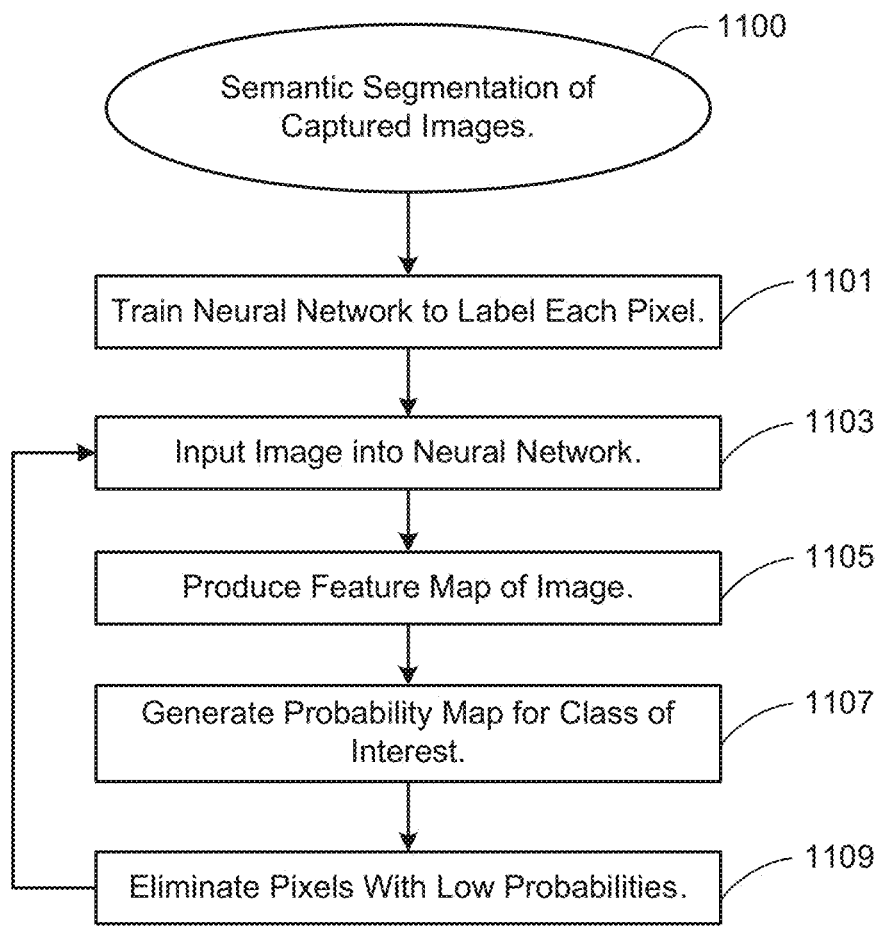
FIG. 11 illustrates an example method 1100 for semantic segmentation of image frames, in accordance with one or more embodiments.

With reference to FIG. 11, shown is an example method 1100 for semantic segmentation of image frames, in accordance with one or more embodiments. In various embodiments, semantic segmentation is performed by a neural network system that has been trained to identify and label pixels according to a corresponding category or class. In some embodiments, the neural network system described herein is a convolutional neural network. In some embodiments, the neural network may comprise multiple computational layers.

At step 1101, a neural network is trained to label each pixel in an image. The neural network may be trained to label every pixel in the image with a particular category label (e.g., person, car, sky, etc.). Such training may be done by inputting training pairs comprising a training image and a corresponding label map. The training image may be input into the neural network as a tensor, such as third-order tensor, to be processed through the various layers of neural network for labeling. In some embodiments, the neural network is trained with a softmax loss on pixels after aggregating outputs from layers pool3, pool4 and conv7 in a feature map that results in a 8× downsample from the original image size. The result may then be compared to the predetermined label map corresponding to that training image. The parameters of the neural network may then be updated. In some embodiments, the parameters are updated using a stochastic gradient descent.

Once the neural network is sufficiently trained, it may be used to label pixels in new image sequences. Such image sequences may be images frames corresponding to a surround view, such as that generated at surround view 118. In other embodiments, the images may be unprocessed images captured by a camera. At step 1103, an image is input into the neural network.

A feature map of the image is then produced by the neural network at step 1105. In some embodiments, the neural network may be trained for k object classes (e.g., person, car, sky, etc.) to produce a feature map that has k channels where channel 'j' represents the probability of each pixel being of object class 'j'. In various embodiments, object classes may include, but are not limited to, the following object classes: building, grass, tree, cow, sheep, sky, airplane, water, face, car, bicycle, flower, sign, bird, book, chair, road, cat, dog, body, and boat. As previously described with reference to the training of the neural network, the neural network may aggregate outputs from layers pool3, pool4 and conv7 in a feature map that results in a 8× downsample from the original image size. The benefit of aggregating feature maps from different layers of the neural network allows the use of both finer scale and coarser scale details to produce these probability maps. For example, using only lower layers or only higher layers would produce sub-optimal outputs.

A probably map for a class of interest may be generated at step 1107. In some embodiments, to get a probability map of an object class of interest (e.g. person), the feature map corresponding to the person object class is extracted. Then pixels with low probabilities are eliminated at step 1109. For example, the pixels where the person object class is not the most probable amongst all other classes are zeroed out. In some embodiments, a threshold probability may be predetermined or set by a user. In some embodiments, the pixels with low probabilities are not eliminated, but labeled instead. The pixels corresponding to the desired object class may also be labeled. In some embodiments, the probability values may then be re-normalized between 0-1.

Method 1100 may then return to step 1101 to segment another image in the sequence of images. This procedure may be applied to every frame individually to obtain probability maps corresponding to the person object class for every frame. In some embodiments, the probability maps may then be passed onto the temporal dense conditional random field (CRF) smoothing system, further described below with reference to FIG. 12, to obtain a binary mask for every frame that is sharply aligned to the boundaries and temporally consistent (non-fluctuating). These binary masks are then used to mask out pixels in every frame to extract the person or other object of interest out of the frames.

A segmenting neural network capable of performing method 1100 may include various computational layers. In some embodiments, the neural network may include a series of convolution layers followed by pooling layers. A convolution-pool layer pair may be used to refer to a convolution layer followed by a pooling layer. Each convolution layer may accumulate and aggregate information from a larger area of the image to form a high level representation of the image. In other words, the convolution layers condense pixel information into a more abstract version in order to make it easier and faster to process by the segmenting neural network. Thus, the output for each convolution-pool layer pair may be down-sampled by 2×. In other embodiments, the convolution-pool layer pair may down-sample the input by more or less than 2×. In some embodiments, the pooling layers may be programmed to perform max pooling. Thus, the pooling layers may take the output of a convolution layer, identify the pixel with the highest value within 2×2 pixel neighborhoods, and set that pixel as the pixel in the down-sampled output of the convolution-pool layer pair. In some embodiments, the values of the pixels are based on the RGB value after being processed by the convolution layer within a convolution-pool layer pair.

For example, an image comprising a pixel dimension of 512×512 pixels may be input into a first convolution-pool layer Pair 1, which may output a 2× down-sampled Output 1 comprising a pixel dimension of 256×256 pixels, where each pixel in Output 1 represents the highest valued pixel of a 2×2 pixel neighborhood in the original image. Output 1 may then be input into a second convolution-pool layer Pair 2, which may output a 4× down-sampled Output 2 comprising a pixel dimension of 128×128 pixels, where each pixel in Output 2 represents the highest valued pixel of a 2×2 pixel neighborhood in Output 1. Output 2 may then be input into a third convolution-pool layer Pair 3, which may output a 8× down-sampled Output 3 comprising a pixel dimension of 64×64 pixels, where each pixel in Output 3 represents the highest valued pixel of a 2×2 pixel neighborhood in Output 2. Output 3 may then be input into a fourth convolution-pool layer Pair 4, which may output a 16× down-sampled Output 4 comprising a pixel dimension of 32×32 pixels, where each pixel in Output 4 represents the highest valued pixel of a 2×2 pixel neighborhood in Output 3. Output 4 may then be input into a fifth convolution-pool layer Pair 5, which may output a 32× down-sampled Output 5 comprising a pixel dimension of 16×16 pixels, where each pixel in Output 5 represents the highest valued pixel of a 2×2 pixel neighborhood in Output 4. In some embodiments, output 5 may then be processed through one or more additional convolution layers.

After five convolution-pool layer pairs, Output 5 may include accurately labeled pixels. However, Output 5 has also been down-sampled by 32×. Thus, if resized back to 512×512 pixel dimension, Output 5 may yield a very coarse image with low resolution, which may not define fine structures within the original image input. Thus, in some embodiments, outputs from intermediate convolution-pool layer pairs, which include higher resolutions, may be added together to refine the output of the segmenting neural network. For example, Output 3, Output 4, and Output 5 may be combined. Outputs 4 and 5 may be resized and up-sampled to 8×. Since Output 3 is already 8×, it would not need to be up-sampled before adding. In some embodiments, more or less outputs from any other convolution-pool layer pairs may be used. In some embodiments, the Outputs 3, 4, and 5 are combined providing an 8× down-sampled Output A that may include accurate labeling, as well as a higher resolution. In some embodiments, additional sequential processing through one or more additional convolution layers may be performed on Output A, and/or on Outputs 3, 4, and 5 before their combination.

In some embodiments, the Output A may then be up-sampled and resized back to the format of the original image input (which, in this example, is 512×512 pixels). In some embodiments, interpolation may be performed to resize the Output A back to the original format. In some embodiments, pixel labeling via method 1100 occurs during one or more of the convolution-pool layer pairs. In other embodiments, pixel labeling may occur during the convolution layers and/or the pooling layers. In various embodiments, more or fewer convolution-pool layer pairs may be programmed in the segmenting neural network. As previously described, during the training procedure of such segmenting neural network, the system may perform a backwards pass to adjust the parameters of the described layers based on the training image and corresponding label map. In some embodiments, the parameters are updated using a stochastic gradient descent.

Figure 12:
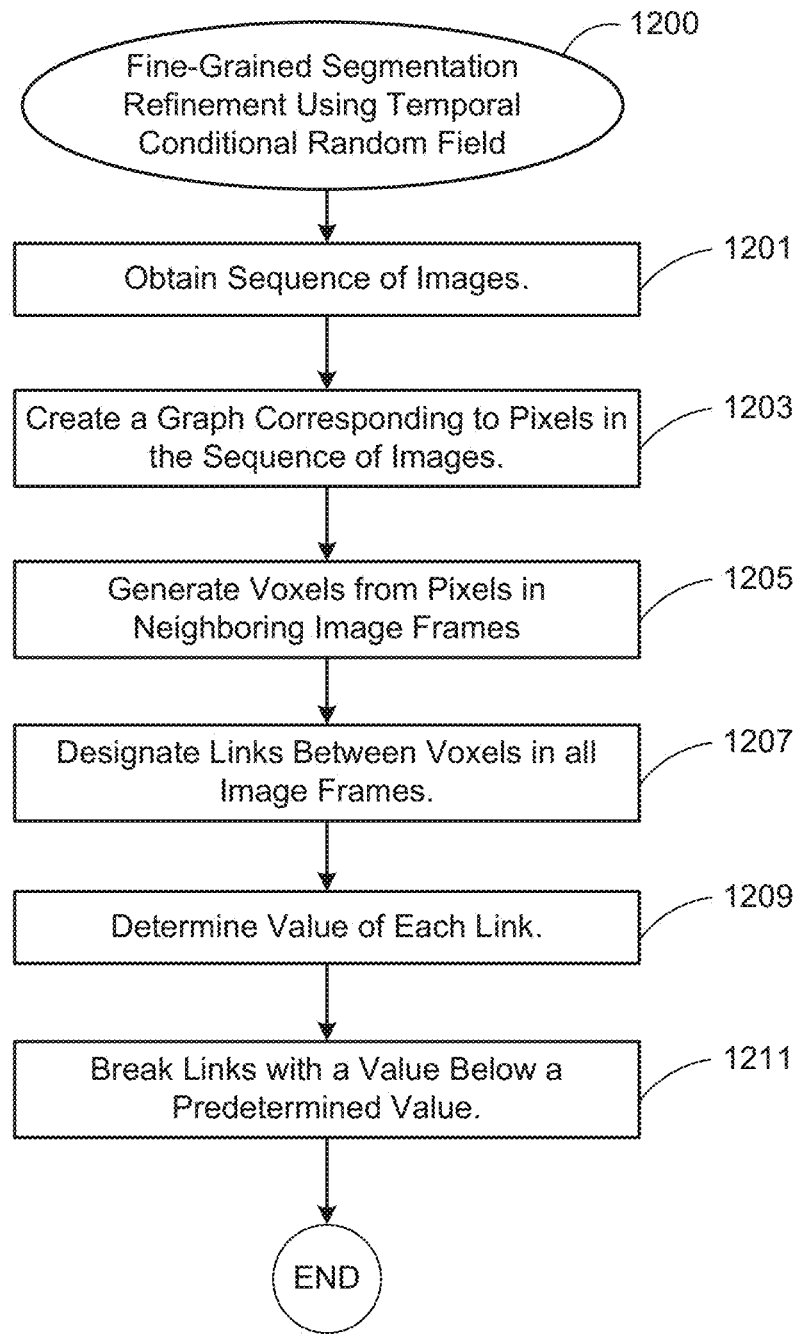
FIG. 12 illustrates an example method 1200 for fine-grained segmentation of image frames with temporal conditional random field, in accordance with one or more embodiments.

With reference to FIG. 12, shown is an example method 1200 for fine-grained segmentation of image frames with temporal conditional random field, in accordance with one or more embodiments. At step 1201, a sequence of images is obtained. The sequence of images obtained at step 1201 may be the image output from method 1100. In some embodiments, the output from method 1100 may comprise extracted pixels corresponding to an object of interest. In other embodiments, the output from method 1100 may comprise an image frame with labeled pixels that correspond to an object of interest or background. In some embodiments, the images may be obtained at step 1201 one at a time as they are segmented in method 1100, rather than the entire sequence of images.

At step 1203, a graph corresponding to the pixels in an image is created. In some embodiments, the graph is a graphical model of the pixels in the image, each of which represents a node in the graph. In various embodiments, this graphical model may be a conditional random field. Links between each node may be created and include a link strength value defined by parameters such as x,y distance between the linked pixels, and/or color distance based RGB value difference of the linked pixels. In some embodiments, every node includes one or more designated edges, which may be used to determine the distance of that pixel to other pixels. In other embodiments, brightness may be used to determine the strength value of a link. The links with a strength value under a predetermined threshold value may be broken. In this way, the graphical model may be divided into two sub-graphs of nodes, one corresponding to the foreground and/or object of interest of the object class, the other corresponding to the background or context. In some embodiments, the graphical model may be divided into any number of sub-graphs corresponding to different object classes and/or background. In some embodiments, the sub-graphs may be labeled, but the links between pixels corresponding to different sub-graphs may not be actually broken.

In certain embodiments, the images may be segmented based on x,y distance and RGB value difference of the pixels, as described above. However, in other embodiments, a time parameter may also be used to determine the strength of a link between pixels. For example, a temporal random conditional field may be implemented for fine-grained segmentation. According to some embodiments, voxels are generated from the pixels in neighboring image frames at step 1205. Links may be established between pixels in neighboring image frames in the image sequence. For example, pixels in an image may be connected to pixels in the nearest five image frames that are continuous in time. In other embodiments, pixels in any number of chronologically neighboring images may be connected. In some embodiments, pixels in all image frames in the image sequence are connected. In some embodiments, the pixels are connected to corresponding pixels in the neighboring image frames. Corresponding pixels may be identified by various keypoint detectors and tracking methods described herein. As such, voxels are generated from the connected pixels between neighboring image frames. For example, a voxel may include a volume defined by designated edges of the pixel node in an image frame and its span across neighboring frames.

At step 1207, links are designated between voxels in all image frames. Each voxel may be linked to every other voxel. Then the value of each link is determined at step 1209. As previously described the strength value between each voxel link may be based on parameters including x,y distance, RGB value difference, and closeness in time. In some embodiments, the strength value of a link between voxels is a weighted sum of the three parameters. At step 1211, links with a value below a predetermined value are broken.

In some embodiments, performing method 1100 for semantic segmentation on the images first shortens the processing time and resources necessary to perform method 1200 for fine-grained segmentation. Overall, the segmentation process may be performed faster by a neural network system or other computer system. In some embodiments, the steps of method 1100 and processes described with reference to step 1203 of method 1200 may be performed on a single initial image frame. The extracted object of interest may then be used to create a temporal conditional random field corresponding to all other images in the image sequence. This may allow the remaining images after the single initial image frame to be segmented without being semantically segmented by method 1100. This may further speed the processing time required for segmentation of all images in the sequence.

View Interpolation and Artificial Frame Generation

As described above, view interpolation can be used to improve the viewing experience. In particular, to avoid sudden "jumps" between stabilized frames, synthetic, intermediate views can be rendered during acquisition or generation of a surround view. Additionally, synthetic, intermediate views may also be rendered to complete stereographic pairs of frames. According to various embodiments, only a limited amount of image frames are stored for each surround view for storage efficiency. In some examples, the selection of these frames is based on the motion of the camera rather than on time. For instance, a new frame is sampled only if the camera moved sufficiently with respect to the previously sampled frame. Consequently, in order to provide a smooth viewing experience for a user interacting with a surround view, artificially rendered frames must be generated. These artificially rendered frames serve to close the gap between two sampled frames that would otherwise appear to have a "jump" between them.

Various embodiments described below include methods of viewpoint interpolation and extrapolation that can be used to generate artificially rendered frames. In various examples, interpolation between frames is performed along a path between the frames. In some instances, this path can follow a non-linear trajectory. In addition, various described extrapolation methods allow the artificially rendered frame to represent a view from a location that is not on the trajectory of the recording camera or in between two sampled frames. By providing interpolation and extrapolation methods for paths between or beyond the originally provided frames, various artificially rendered views can be provided for a surround view. In some embodiments, view interpolation may be performed on the entire images within the image frames of an image sequence. In other embodiments, view interpolation may be performed only on pixels extracted from method 1100 and/or method 1200.

Various embodiments of the present disclosure relate generally to systems and processes for artificially rendering images using interpolation of tracked control points. According to particular embodiments, a set of control points is tracked between a first frame and a second frame, where the first frame includes a first image captured from a first location and the second frame includes a second image captured from a second location. An artificially rendered image corresponding to a third location is then generated by interpolating individual control points for the third location using the set of control points and interpolating pixel locations using the individual control points. The individual control points are used to transform image data.

Figure 13:
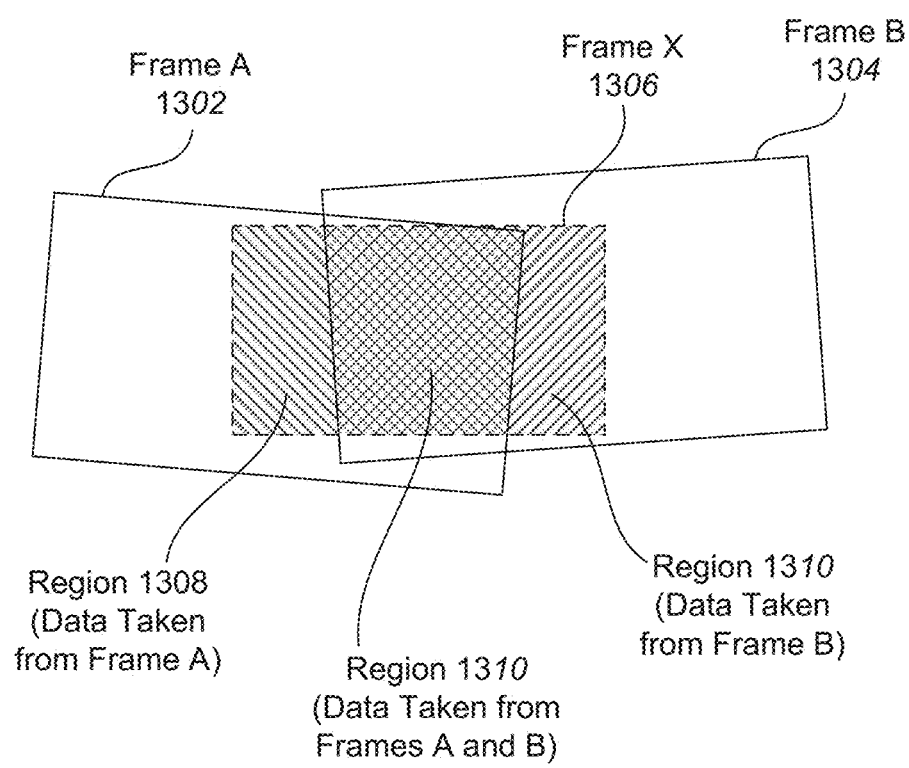
FIG. 13 illustrates an example of combining image information gathered from two frames to artificially render an image for another frame using weighted image information.

In the present example, combining the image information gathered from both Frames A and B, as described in FIG. 4, can be done in various ways. The following FIGS. 13-21 provide various methods and/or examples of view interpolation as previously described with reference to various enhancement algorithms, such as at enhancement algorithms block 116 and/or at AR/VR content generation block 122. With reference to FIG. 13, shown is one example of a way to combine image information gathered from both Frames A and B to artificially render an image in Frame X using weighted image information. Such combination of image information may be performed by a view interpolation algorithm as previously described with reference to FIG. 1. As shown, image information is taken from Frame A 1302 and Frame B 1304 to generate an image in Frame X 1306. Image information in Region 1308 of Frame X 1306 is taken from Frame A 1302. Image information in Region 1310 of Frame X 1306 is taken from Frame B 1304. Image information in Region 1310 of Frame X 1306 includes information from both Frame A 1302 and Frame B 1304. In order to account for the overlap in information, the image information is weighted. Specifically, the information is combined using the image information from Frame A 1302 using 1−x and the image information from Frame B 1304 using x.

Figure 14:
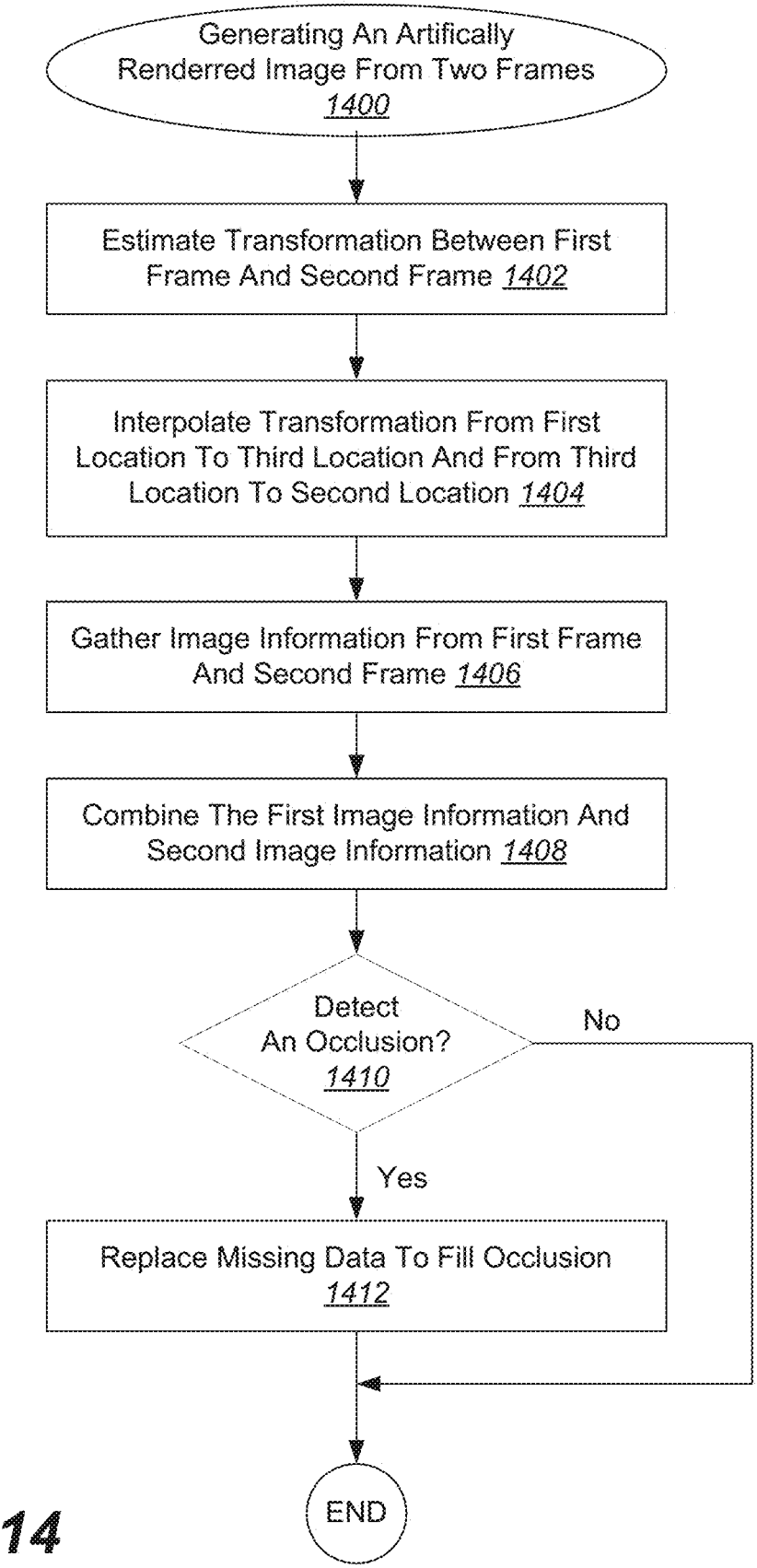
FIG. 14 illustrates an example of a process for generating an artificially rendered image from two frames.

With reference to FIG. 14, shown is an example of a process 1400 for generating an artificially rendered image from two frames. In this example, a transformation is estimated between a first frame and a second frame at 1402. The transformation is estimated using methods such as homography, affine, similarity, translation, rotation, or scale. As described above with regard to FIG. 4, the first frame includes a first image captured from a first location (Location A 422) and the second frame includes a second image captured from a second location (Location B 424). In some examples, the first image and second image are associated with the same layer. Next, an artificially rendered image is rendered corresponding to a third location. This third location is positioned on a trajectory between the first location and the second location, as shown as Location X 426 in FIG. 4.

The artificially rendered image is generated in a number of steps. First, a transformation is interpolated from the first location to the third location and from the third location to the second location at 1404. In some instances, interpolating the transformation includes parameterizing the transformation from the first location to the third location and from the third location to the second location. Furthermore, in some examples, the parameterized transformation is then linearly interpolated.

Next, image information is gathered from the first frame and the second frame at 1406 by transferring first image information from the first frame to the third frame based on the interpolated transformation and second image information from the second frame to the third frame based on the interpolated transformation. Finally, the first image information and the second image information are combined to yield the artificially rendered image. In some examples, combining the first image information and the second image information includes weighting the first image information from the first frame and weighting the second image information from the second frame.

According to various embodiments, the process can end with combining the first image information and second image information at 1408. However, according to the present example, the process shown continues with determining whether an occlusion is present in the artificially rendered image at 1410. Such an occlusion is created by a change in layer placement between the first frame and second frame. Specifically, the first image and second image may include foregrounds and backgrounds that include one or more layers, each layer corresponding to a region of image pixels that share a similar motion, as described in more detail below with regard to FIG. 15. These layers can move relative to each other. In some cases, the layers may move in a manner causing an occlusion in a combined image. If an occlusion is detected, then the missing data is replaced to fill the first occlusion at 1412. In some instances, the missing data is obtained by interpolation or extrapolation. In other instances, the missing data is obtained from the first frame or the second frame. In yet other instances, the missing data is obtained from another frame (separate from the first and second frame) that includes image information corresponding to the missing data. In another example, the missing data is obtained by extrapolating from surrounding image data. This surrounding image data includes information from frames located near the first location and second location.

With reference to FIG. 15, shown is an example of combining image information gathered from both Frames A and B to artificially render an image in Frame X by using multiple layers of an image. The present example uses the method described above with regard to FIG. 14, where the first frame and second frame are made up of two or more layers. In particular, the first frame, which includes a view at Time A 1502, includes a background layer 1506 and foreground layer 1504. The second frame, which includes a view at Time B 1508, includes a background layer 1512 and foreground layer 1510. In some examples, foreground and/or background can include one or more layer. In the present example, a layer is a region of image pixels that share a similar motion, based on factors such as depth and or speed of the corresponding real world object.

In the present example, viewpoint-interpolation can be used to generate an artificially rendered image as described above with regard to FIG. 14. In addition, because different motions of the layers can create occlusions and/or regions with missing data, the process can also include methods for filling the regions corresponding to any detected occlusions. Whether data is occluded or missing is based on the ordering of layers. Although the layers are expected to stay in the same order, they can switch order if the objects change their depth location within the scene. For instance, occlusions are created if a first layer moves in front of a second layer, where the first layer is closer to the camera than second layer. In the case that the first layer is non-see-through, image information from the first layer is taken wherever the first and second layer overlap. In the case that the first layer is partially see-through, image information is taken from both layers according to the opacity of the first layer. This process can also be extended to more than two layers.

As described above with regard to FIG. 14, missing information can be obtained in various ways, including interpolation or extrapolation. For instance, missing data can be taken from only one of the frames, depending on which frame includes a view of the missing data. In another example, the missing data can be taken from other frames where this region is visible. For instance, in a surround view that includes various frames and viewpoints, other frames can be used to fill in this missing data. In another example, the missing data can be extrapolated from surrounding image data, to create artificial image data that estimates what the missing data would look like. In yet another example, viewpoint-extrapolation using multiple layers can be applied outside of the trajectory between the two frames, by moving the different layers in perpendicular motion to the trajectory motion, as shown in more detail with regard to FIG. 17. According to various examples, the transform between the two frames can be an image transformation or a 3D transformation. An image transformation can use methods such as homography, affine, similarity, translation, rotation, scale. For a 3D transformation, layers are moved with respect to their depth and the 3D transformation, according to various embodiments.

Figure 16A:
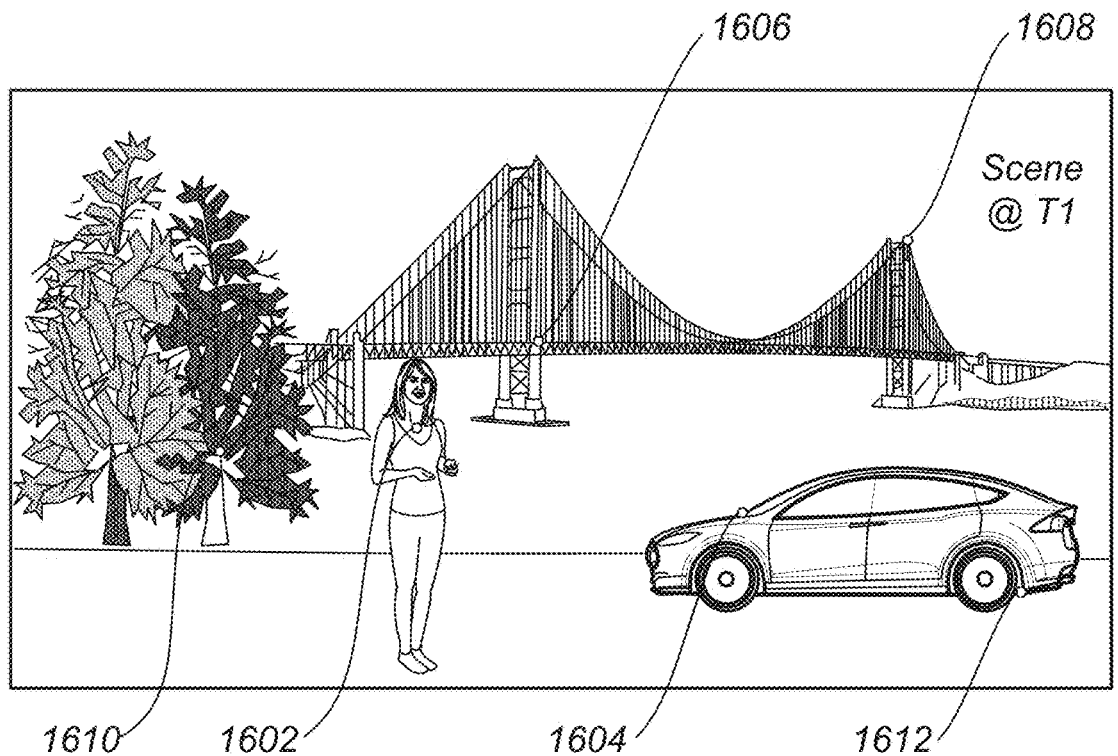
FIGS. 16A-16B illustrate an example of an image transformation between two frames using tracked control points between the two frames.
Figure 16B:
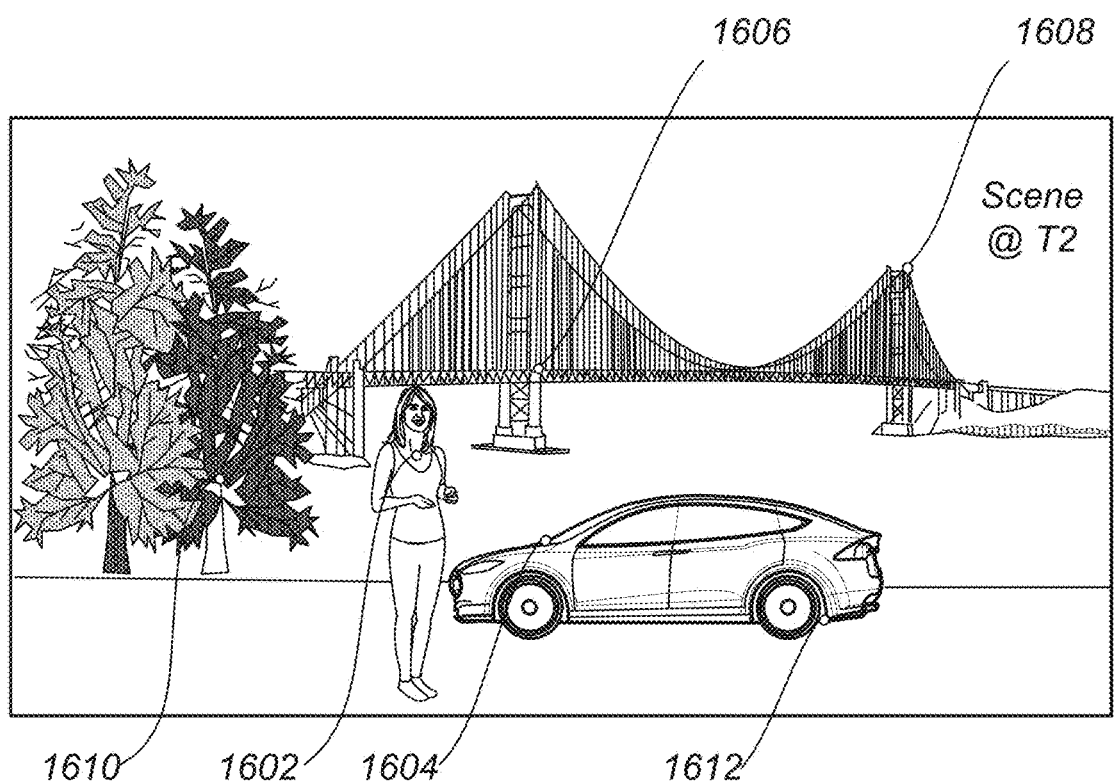

With reference to FIGS. 16A-16B, shown is an example of an image transformation between two frames using tracked control points between the two frames. In particular, FIG. 16A shows a first frame of a scene at a first time T1 and FIG. 16B shows a second frame of the scene at a second time T2. A set of control points 1602, 1604, 1606, 1608, 1610, and 1612 are tracked between the two frames, such that their locations are known in both frames. An intermediate frame X at x \in [0, 1] between these two frames can be generated by interpolating the location of all control points individually for x and then computing the image data for frame X by interpolating all pixel locations using those control points. In some examples, the set of control points are located within a single layer that includes particular objects viewable in the first frame and second frame. In this case, generating an artificially rendered image may include interpolating image data for multiple layers and combining these layers. In other example, each pixel in the first frame corresponds to a control point in the set of control points. Accordingly, each pixel is tracked and interpolated in that instance.

In the present embodiment, an artificially rendered image is generated as intermediate frame X by tracking a set of control points between the first frame and the second frame, and interpolating individual control points for the third location X using the set of control points and interpolating pixel locations using the individual control points. As shown, the first frame includes a first image captured from a first location and the second frame includes a second image captured from a second location. In one example, interpolating the pixel locations includes interpolation using barycentric coordinates based on three or more control points. In another example, interpolating the pixel locations includes interpolation using splines. In yet another example, interpolating the pixel locations includes interpolation using finite elements. In yet another example, interpolating the pixel locations includes using motion of the nearest control point. In some examples, interpolating pixel locations using the individual control points includes using dense optical flow. In other examples, interpolating pixel locations using the individual control points includes using depth data.

Figure 17:
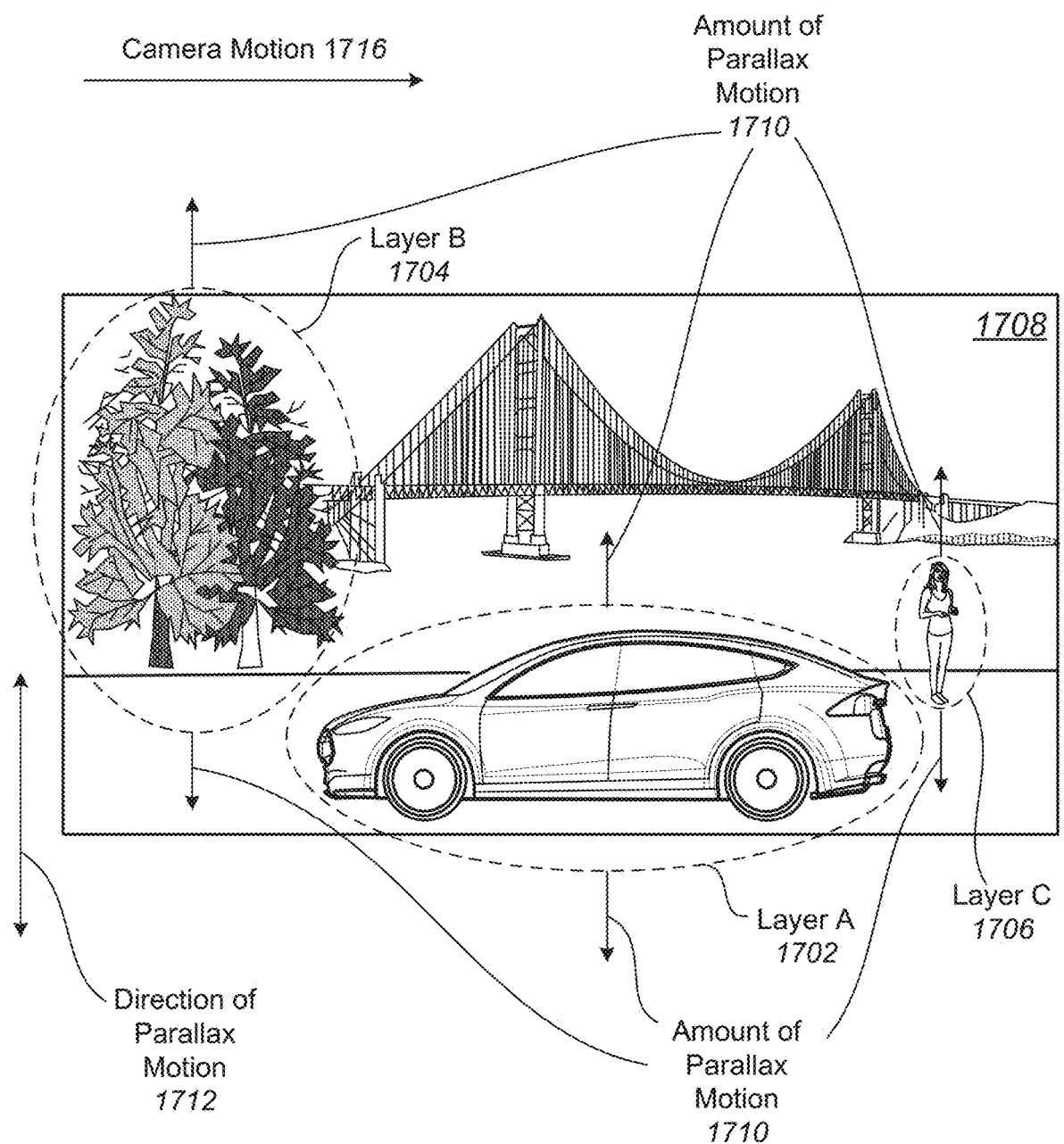
FIG. 17 illustrates an example of viewpoint extrapolation outside of the trajectory between two frames using multiple layers and the parallax effect.

With reference to FIG. 17, shown is an example of viewpoint extrapolation outside of the trajectory between two frames using multiple layers and the parallax effect. Using multiple layers, viewpoint-extrapolation outside of a trajectory between two frames can be achieved by moving the different layers in perpendicular motion to the trajectory motion. As shown, a scene 1708 includes multiple layers, such as Layer A 1702, Layer B 1704, and Layer C 1706. Although not shown, two frames capturing images of the scene 1708 can be obtained by moving a camera along camera motion 1716. Comparing the two images will show parallax motion in the direction 1712. As shown in the figure, the amount of parallax motion 1710 of each of the layers can indicate movement or differences between the frames. Although not indicated in the figure, the different layers 1702, 1704, and 1706 can each have different amounts of parallax motion.

In the present embodiment an artificially rendered image is generated using this parallax effect. In particular, a set of control points (not shown) is moved perpendicular to a trajectory between a first frame and a second frame. In this example, the first frame includes a first image captured from a first location and the second frame includes a second image captured from a second location and each control point is moved based on an associated depth of the control point. Specifically, control points located at a further depth are moved less than control points at a closer depth in some examples. Additionally, in some applications, each pixel in the first image corresponds to a control point in the set of control points. Furthermore, in addition to having a concrete depth associated with a point, it is also possible to infer the depth from the amount of frame-to-frame motion of the control points.

Next, an artificially rendered image corresponding to a third location outside of the trajectory is generated by extrapolating individual control points using the set of control points for the third location and extrapolating pixel locations using the individual control points. In some examples, extrapolating the pixel locations includes extrapolation using barycentric coordinates based on three or more control points. In other examples, extrapolating the pixel locations includes extrapolation using splines. In yet other examples, extrapolating the pixel locations includes extrapolation using finite elements. In other instances, extrapolating the pixel locations includes using motion of a nearest control point. In yet other instances, extrapolating pixel locations using the individual control points includes using dense optical flow.

Figure 18:
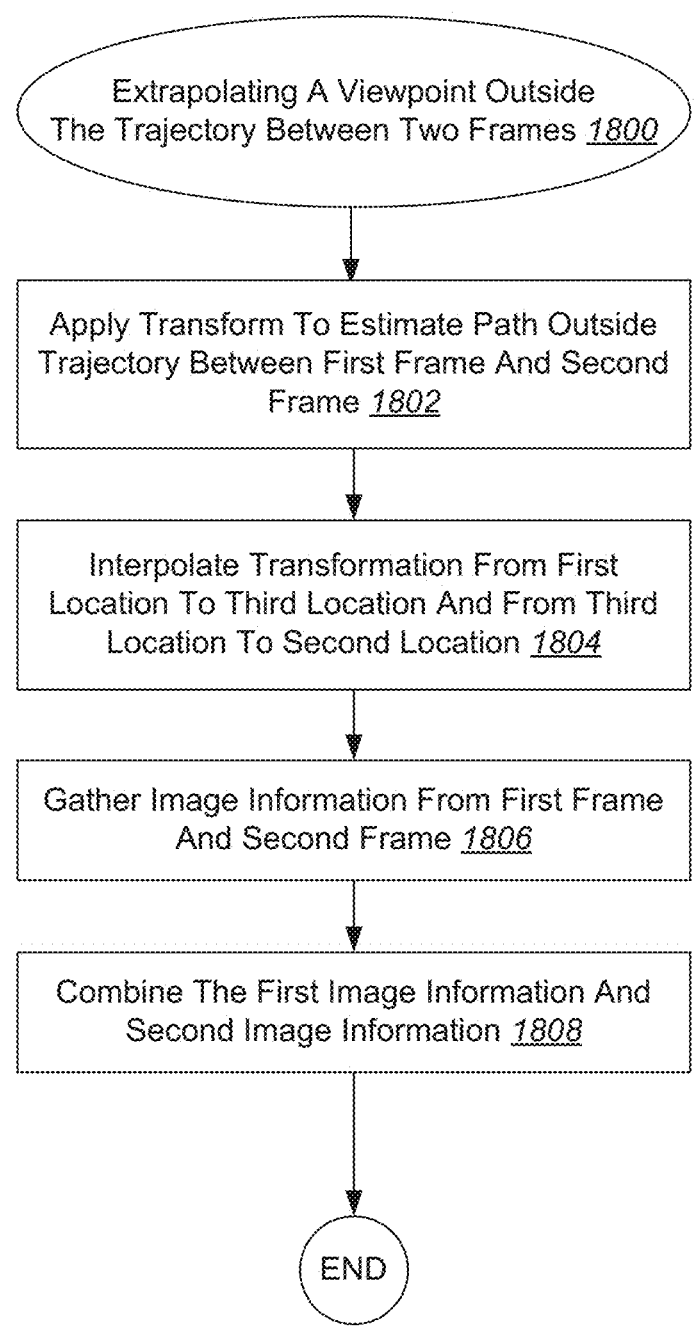
FIG. 18 illustrates an example of a process for extrapolating a viewpoint outside the trajectory between two frames.

With reference to FIG. 18, shown is an example of a process for extrapolating a viewpoint outside the trajectory between two frames. This process can be viewed as an extension to the process described with regard to FIG. 14, where viewpoints for locations outside of the trajectory between Frame A and Frame B are extrapolated by applying a transform which warps the image according the curvature and direction of the estimated path.

In the present embodiment, a transform is applied to estimate a path outside the trajectory between a first frame and a second frame at 1802. The first frame includes a first image captured from a first location and the second frame includes a second image captured from a second location. In some examples, the first image and second image are associated with the same layer. Furthermore, this process can be applied to various layers and the resulting images representing the layers can be combined to generate a complete image. Next, an artificially rendered image corresponding to a third location positioned on the path is generated. The artificially rendered image is generated by first interpolating a transformation from the first location to the third location and from the third location to the second location at 1804. Image information is then gathered from the first frame and the second frame at 1806 by transferring first image information from the first frame to the third frame based on the interpolated transformation and second image information from the second frame to the third frame based on the interpolated transformation. Finally, the first image information and the second image information is combined at 1808.

According to present embodiment, the transform can implement various features. For instance, the transform can implement features such as homography, spherical projection, and/or cylindrical projection. These features can be used alone or in conjunction with one another in applying the transform. Additional features not mentioned can also be implemented within the scope of this disclosure.

The present embodiment describes one method of extrapolating a viewpoint outside the trajectory between two frames. However, additional methods for extrapolating such viewpoints can also be implemented in other embodiments. For instance, as described above with regard to FIG. 17, another way to extrapolate viewpoints for locations outside of the trajectory between two frames can include moving the layers and/or control points perpendicular to the trajectory direction based on their depth. Specifically, layers/control points at greater depth are moved less than layers/control points at lesser depth. Depending on the characteristics of the frames, different methods can be chosen to provide an appropriate result.

Figure 19:
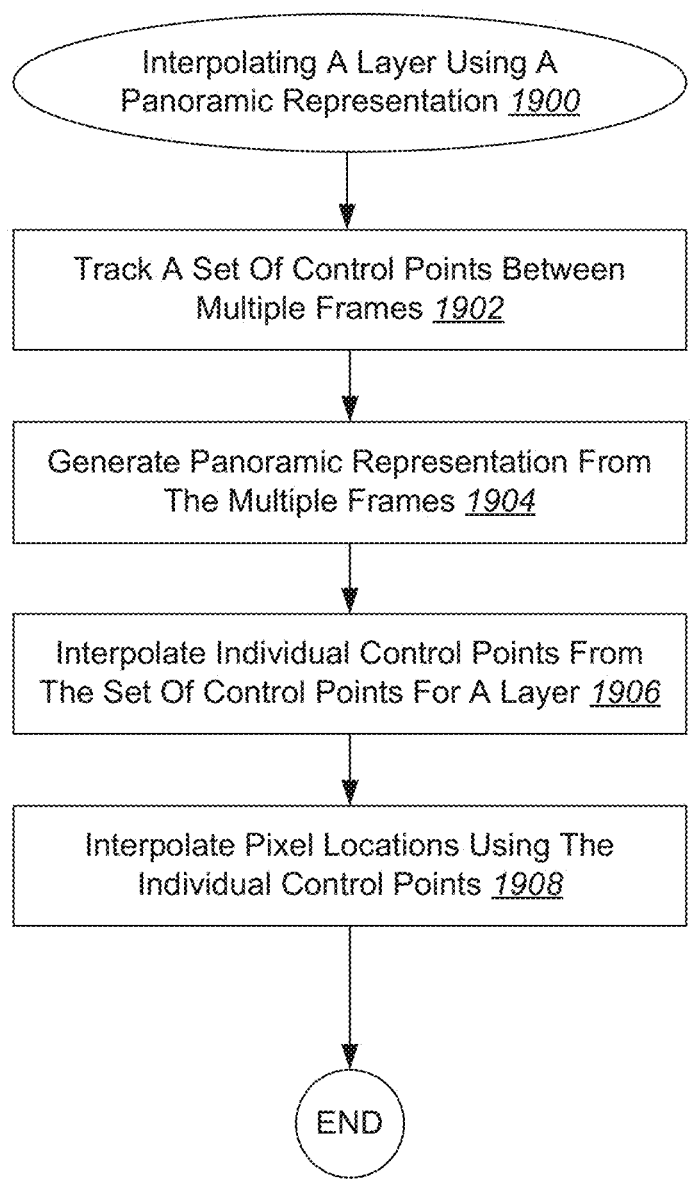
FIG. 19 illustrates an example of a process for interpolating a layer using a panoramic representation.

With reference to FIG. 19, shown is an example of a process for interpolating a layer using a panoramic representation. In this example, the span of a layer is not restricted to two frames but is constructed from multiple frames. Specifically, a panorama is created from the corresponding background regions and combined into a panoramic representation. This panorama representation is then used to interpolate the corresponding layer. Although this process is described in terms of a background layer, this process can also be extended to other types of layers. For instance, the process can be applied to layers that include objects, such as context layers.

In the present embodiment, a set of control points is tracked between multiple frames associated with the same layer at 1902. In some examples, each pixel corresponds to a control point in the set of control points. In these cases, each pixel is then interpolated based on the set of control points for the artificially rendered image. Next, a panoramic representation is generated from the multiple frames at 1904. Individual control points are then interpolated from the set of control points at 1906 for a desired frame or layer. Pixel locations are then interpolated for this frame or layer using the individual control points at 1908. From this interpolation, the artificially rendered image/layer is generated.

According to various embodiments, interpolation can be implemented using a variety of methods. For instance, interpolating the pixel locations can include interpolation using barycentric coordinates based on three or more control points. In some examples, interpolating the pixel locations includes interpolation using splines. In other examples, interpolating the pixel locations includes interpolation using finite elements. In yet other examples, interpolating the pixel locations includes using motion of a nearest control point. In addition, interpolating pixel locations using the individual control points includes using dense optical flow in some applications. Although particular examples of interpolation methods are described, any combination of these or other methods can be used.

Figure 20:
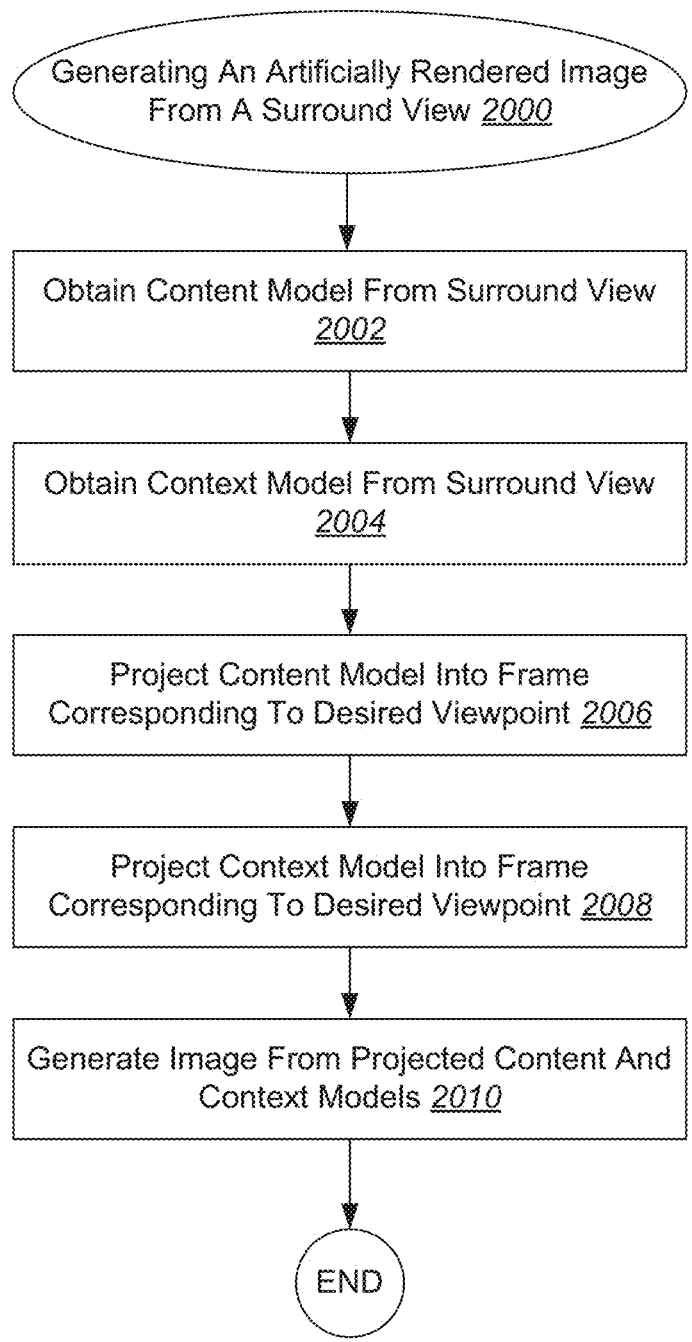
FIG. 20 illustrates an example of a process for generating an artificially rendered image from a surround view.

With reference to FIG. 20, shown is an example of a process for generating an artificially rendered image from a surround view. As described previously, a surround view is a multi-view interactive digital media representation. In some examples, the surround view is generated from multiple images having location information, and at least a portion of overlapping subject matter. Furthermore, according to various embodiments, the surround view is generated by interpolating between the multiple images and/or extrapolating data from the multiple images. In the present example, a surround view can be decomposed into one or more background panoramic representations and, in some examples, one or more foreground 3D models. An image at a specific viewpoint is then rendered by projecting the 3D model(s) and the panoramic representation(s) into a frame according to the current viewpoint and the depth and orientation of the 3D model(s).

In the present embodiment, a content model is obtained from a surround view at 2002. This content model is a foreground three-dimensional model including at least one object. In some examples, obtaining the content model from the surround view includes extracting the content model from the surround view. At 2004, a context model is obtained from the surround view. This context model is a background panoramic representation including scenery surrounding any objects in the content model. In some examples, obtaining the context model from the surround view includes extracting the context model from the surround view. Next, the content model is projected into a frame corresponding to a desired viewpoint at 2006. The context model is also projected into the frame corresponding to the desired viewpoint at 2008. According to various embodiments, the content model and context model are projected according to the depth and orientation of the content model. The artificially rendered image at the desired viewpoint is generated from a combination of the projected content and context at 2010.

Various examples of viewpoint interpolation and extrapolation are described in the present disclosure. According to various embodiments, one or a combination of methods can be used to generate a single artificially rendered image. For instance, one layer can be handled using the method described with regard to FIG. 14, another layer can be handled using the method described with regard to FIGS. 16A-16B, and a background layer can be handled using the method described with regard to FIG. 19. Any combination of methods can be used within the scope of this disclosure. Additionally, any one method can be used alone to generate an artificially rendered image.

Figure 21:
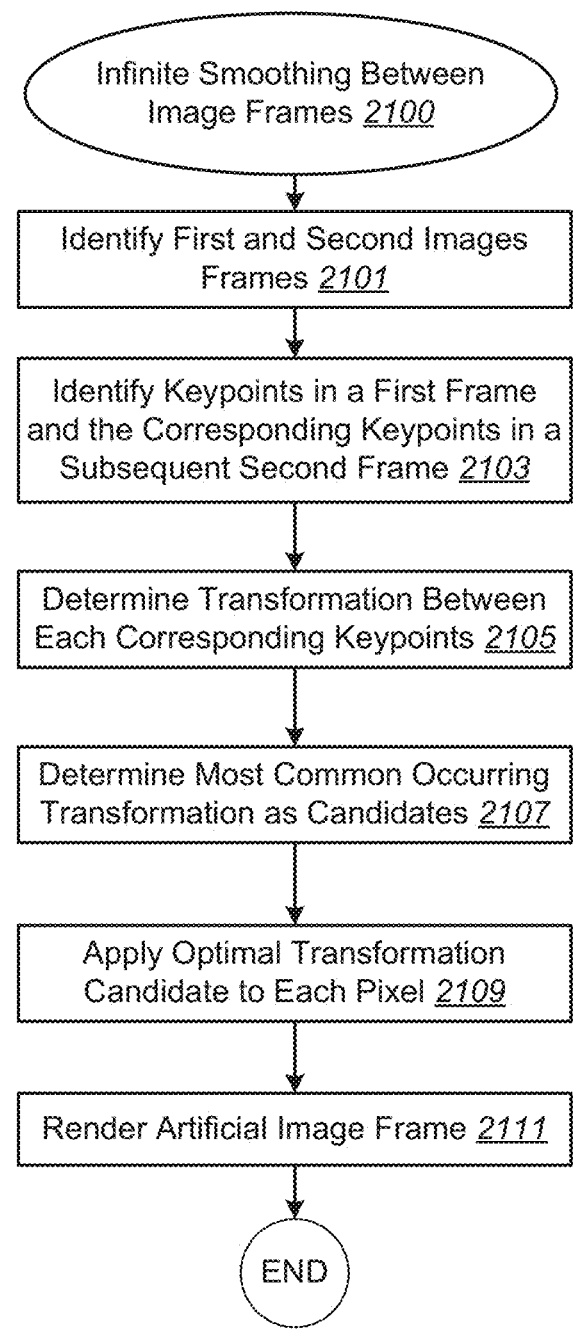
FIG. 21 illustrates an example of a method for infinite smoothing between image frames, in accordance with one or more embodiments.

With reference to FIG. 21, shown is an example of a method 2100 for infinite smoothing between image frames, in accordance with one or more embodiments. In various embodiments, method 2100 may be implemented as one or more various steps in method 1400, such as estimating transformation at step 1402 and/or interpolating the transformation at step 1404.

At step 2101, first and second image frames are identified. In some embodiments, the first and second image frames may be part of a sequence of images captured as described with reference to FIGS. 1-8. In various embodiments, the image frames may be consecutively captured images in time and/or space. In some embodiments, the first and second image frames may be adjacent image frames, such as frame N and frame N+1. The method 2100 described herein may be implemented to render any number of frames between N and N+1 based on the position of the user and/or viewing device.

A RANSAC (random sample consensus) algorithm may be implemented to determine the possible transformation candidates between the two image frames. As described herein, transformation candidates may be identified from keypoints tracked from a first frame to a second frame. Various transformations may be calculated from various different parameters gathered from various combinations of keypoints. At step 2103, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Förstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2105, a transformation is determined for each corresponding keypoint in each image frame. In some embodiments, a set of two keypoint correspondences are used to determine a transformation, such as described in step 2405 with reference to FIG. 24. Various parameters may be used to calculate the transformation between corresponding keyframes by a predetermined algorithm. In one example embodiment, similarity 2D parameters, including x,y translation, a 2D rotation, and a 2D scale, may be used to determine the translation. Other parameters that may be used include 2D translation (x and y translation), 2D Euclidean parameters (2D rotation and x,y translation), affine, homography, etc. The RANSAC algorithm may repeatedly select corresponding keyframes between image frames to determine the transformation. In some embodiments, corresponding keyframes may be selected randomly. In other embodiments, corresponding keyframes may be selected by location.

Once all transformations have been calculated for each keyframe correspondence, the most common occurring transformations are determined as candidates at step 2107. According to various embodiments, keypoints may be grouped based on the associated transformation calculated at step 2105. In some embodiments, each transformation determined at step 2105 is applied to all keypoints in an image, and the number of inlier keypoints for which the transformation is successful is determined, such as described in step 2411 with reference to FIG. 24. In other words, keypoints that experience the same transformation between the first and second image frames are grouped together as inlier keypoints. In some embodiments, a predetermined number of transformations with the most associated inlier keypoints are selected to be transformation candidates. In some embodiments, the image intensity difference between a transformed image and the second image may also be calculated for each transformation determined at step 2105 and applied to the keypoints, such as described in steps 2415 and 2419 with reference to FIG. 24. In some embodiments, image intensity difference is only calculated if a transformation results in a larger number of inlier keypoints than a previous determined transformation as described in step 2413. In various embodiments, the transformations are ranked based on the corresponding number of resulting inlier keypoints and/or image intensity difference.

In various embodiments, a predetermined number of highest ranking transformations are selected to be transformation candidates. In some embodiments, the remaining transformations determined at step 2105 are discarded. Any number of transformation candidates may be selected. However, in some embodiments, the number of transformations selected as transformation candidates is a function of processing power. In some embodiments, processing time may increase linearly with increased number of candidates. In an example embodiment, eight possible transformation candidates with the most associated keypoints are selected. In some embodiments, steps 2103, 2105, and 2107 are run offline. In some embodiments, steps 2103, 2105, and 2107 are run in real-time, as image frames are captured.

At step 2109, the optimal transformation candidate is applied to each pixel. Each pixel in an image may experience a different transformation between frames. In some embodiments, each of the transformation candidates is applied to each pixel. The transformation candidate that results in the least difference between frames may be selected. In some embodiments, each of the transformation candidates is applied to a group, or "community," of pixels. For example, a community of pixels may comprise a 7×7 (−3, +3) group of pixels. Once an optimal transformation is applied to each pixel, an artificial image may be rendered at step 2111. In various embodiments, steps 2109 and 2111 may be performed during runtime when the user is viewing the sequence of images. In such embodiments, the transformation may be a function of frame number of the frame between N and N+1. The number of frames between N and N+1 may be determined based on various considerations, such as the speed of movement and/or the distance between frames N and N+1. Because method 2100 may generate any number of frames between frames N and N+1, the user may perceive a smooth transition as the user view different viewpoints of the three-dimensional model of an object of interest, as an image frame may be rendered for virtually any viewpoint position the user is requesting to view. Furthermore, because the artificial image frames may be rendered based on the calculated transformation parameters, storage of such artificial image frames is not required. This enhances the functioning of image processing computer systems by reducing storage requirements.

Method 2100 may then be implemented for the transition between each image frame in the sequence. Various embodiments of method 2100 may provide advantages over existing methods of rendering artificial images, such as alpha blending. Especially in the case of concave surround views, existing methods result in artifacts or ghosting effect from improperly aligned image frames. This occurs because unlike convex surround views, concave and/or flat surround views do not experience a single transformation for all pixels and/or keypoints. Method 2100 provides a process for determining the optimal transformation out of multiple transformation candidates to apply to a pixel. Additionally, method 2100 may generate image frames that are seen, as well as portions of image frames that are unseen. Thus, motion between two discretized image frames may be generated by selecting the frame that includes the least amount of conflict.

Generation of Stereoscopic Image Pairs

Figure 22:
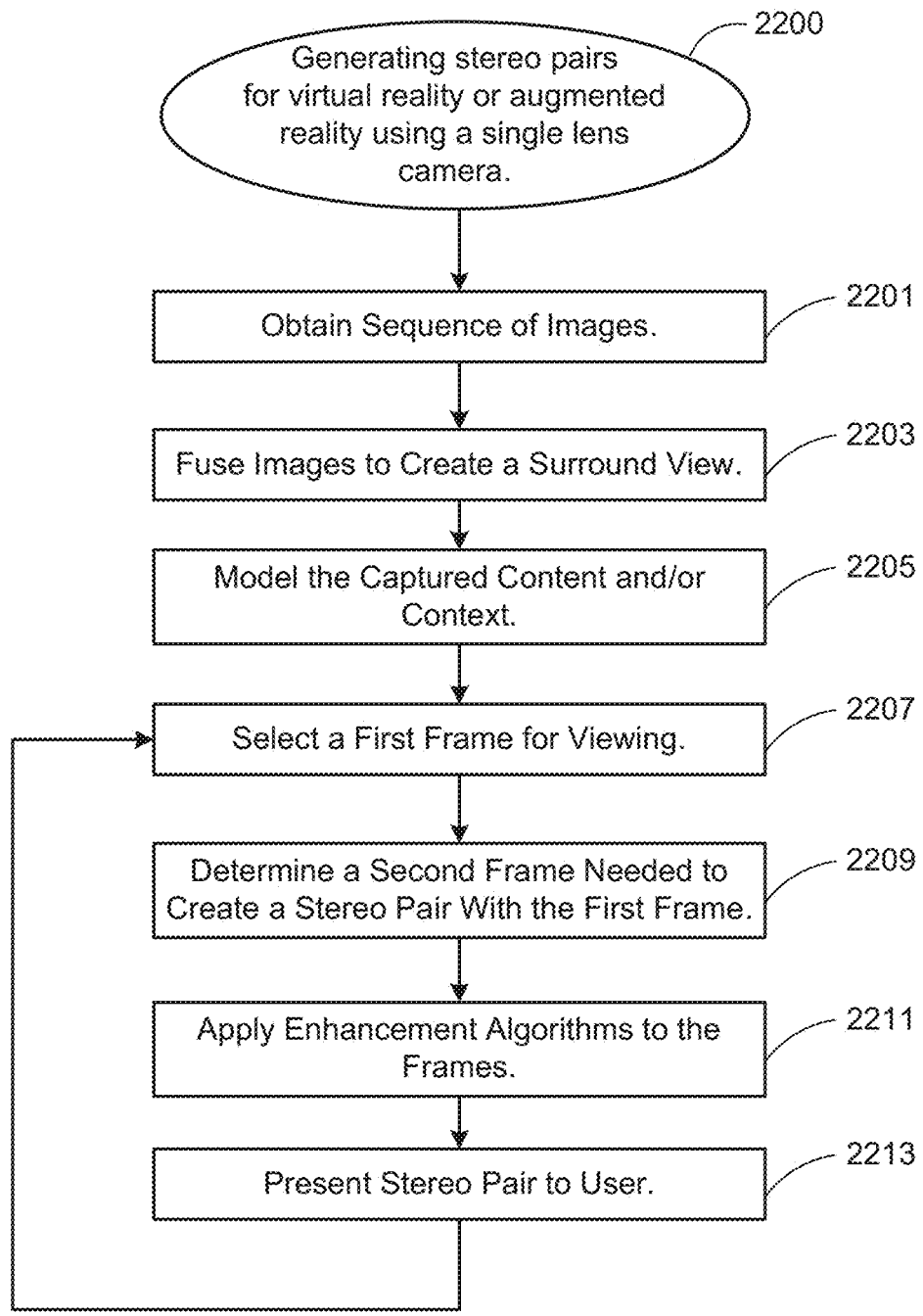
FIG. 22 illustrates an example method for generating stereo pairs for virtual reality or augmented reality using a single lens camera, in accordance with one or more embodiments.

With reference to FIG. 22, shown is an example method 2200 for generating stereo pairs for virtual reality or augmented reality using a single lens camera, in accordance with one or more embodiments. At step 2201, a sequence of images is obtained. In some embodiments, the sequence of images may be multiple snapshots and/or video captured by a camera as previously described with reference to FIGS. 1-8. In some embodiments, the camera may comprise a single lens for capturing sequential images one at a time. In some embodiments, the captured image may include 2D images, such as 2D images 104. In some embodiments, other data may also be obtained from the camera and/or user, including location information, such as location information 106, as well as depth information.

At step 2203, the sequence of images is fused to create a surround view. For example, the images and other data captured in step 2201 may be fused together at a sensor fusion block, such as sensor fusion block 110 as previously described with reference to FIG. 1. At step 2205, the captured content and/or context is modeled. As previously described, the data that has been fused together in step 2203 may then be used for content modeling and/or context modeling, as discussed with reference to content modeling 112 and context modeling 114, respectively, in FIG. 1. As such, a three-dimensional surround view of an object and/or the context may be provided and accessed by a user. As previously described with reference to block 116 in FIG. 1, various enhancement algorithms may be employed to enhance the user experience. For instance, automatic frame selection, stabilization, view interpolation, image rotation, infinite smoothing, filters, and/or compression can be used during capture of surround view data. In some examples, these enhancement algorithms can be applied to image data after acquisition of the data. In other examples, these enhancement algorithms can be applied to image data during capture of surround view data. In some embodiments, the enhancement algorithms may be applied during a subsequent step, such as at step 2211, described below.

At step 2207, a first frame is selected for viewing. In some embodiments, a first frame may be selected by receiving a request from a user to view an object of interest in a surround view, such as in step 1002, described above. As previously described, the request may also be a generic request to view a surround view without a particular object of interest. In some embodiments, a particular first frame may be specifically selected by the user. In some embodiments, the first frame may be designated for viewing by either the right eye or the left eye. In the present example, the first frame selected at step 2207 is designated for viewing by the left eye.

At step 2209, a second frame needed to create a stereo pair with the first frame is determined. The second frame may be designated for viewing by the other eye, not designated to the first frame. Thus, in the present example, the second frame determined at step 2208 is designated for viewing by the right eye. In various embodiments, the second frame may be selected based on a desired angle of vergence at the object of interest and/or focal point. Vergence refers to the simultaneous movement of both eyes in opposite directions to obtain or maintain single binocular vision. When a creature with binocular vision looks at an object, the eyes must rotate around a vertical axis so that the projection of the image is in the center of the retina in both eyes. To look at an object closer by, the eyes rotate towards each other (convergence), while for an object farther away they rotate away from each other (divergence). Exaggerated convergence is called cross eyed viewing (focusing on the nose for example). When looking into the distance, the eyes diverge until parallel, effectively fixating the same point at infinity (or very far away). As used herein, the angle of vergence refers to the angle between the lines of sight of each frame to the object of interest and/or desired focal point. In some embodiments, a degree of vergence may be between 5 degrees to 10 degrees. In some embodiments, a desired degree of vergence of more than 10 degrees may cause a user to see different objects and/or experience disjointed views (i.e., double vision or diplopia).

In some embodiments, the second frame may additionally be selected based on gathered location and/or IMU information. For example, if the object of interest and/or focal point is closer, a larger degree of vergence may be desired to convey an appropriate level of depth. Conversely, if the object of interest and/or focal point is further away, a smaller degree of vergence may be desired.

In some embodiments, the degree of vergence may then be used to determine a spatial baseline. The spatial baseline refers to the distance between the left eye and the right eye, and consequently, the distance between the first frame and the second frame. The average distance between the left eye and right eye of a human is about 10 cm to 15 cm. However, in some embodiments, a wider spatial baseline may be allowed in order to enhance the experience effect of depth. For example, a desired spatial baseline may be 30 cm.

Once the distance of the spatial baseline has been determined, a second frame located at that distance away from the first frame may be selected to be used as the stereo pair of the first frame. In some embodiments, the second frame located at the determined distance may be an actual frame captured by the camera at step 2201. In some embodiments, the second frame located at the determined distance may be an artificial frame generated by interpolation, or other enhancement algorithms, in creating the surround view. In other embodiments, an artificial second frame may be generated by various enhancement algorithms described below with reference to step 2209.

At step 2211, enhancement algorithms are applied to the frames. In some embodiments, enhancement algorithms may only be applied to the second frame. In some embodiments, step 2211 may alternatively, or additionally, occur after step 2205 and before selecting the first frame for viewing at step 2207. In various embodiments, such algorithms may include: automatic frame selection, stabilization, view interpolation, filters, and/or compression. In some embodiments, the enhancement algorithms may include image rotation. In order for the user to perceive depth, the view of each frame must be angled toward the object of interest such that the line of sight to the object of interest is perpendicular to the image frame. In some embodiments, certain portions of the image of a frame may be rotated more or less than other portions of that image. For example, portions identified as context and/or background with a focal point at infinity may be rotated less than a nearby object of interest in the foreground identified as the content.

In some embodiments, image rotation may include using IMU and image data to identify regions that belong to the foreground and regions that belong to the background. For example, rotation information from the IMU data informs how a keypoint at infinity should move. This then can be used to identify foreground regions where a keypoint's movement violates the optical flow for infinity. In some embodiments, the foreground may correspond to the content or an object of interest, and the background may correspond to the context, as described with reference to FIG. 5. In some embodiments, the keypoints may be used to determine optimal transformation for one or more images in a stereo pair. In some embodiments, the keypoints are used to determine focal length and rotation parameters for the optimal transformation.

A Harris corner detector algorithm may be implemented to detect salient features to designate as keypoints in each frame, such as areas of large contrast, areas with minimum ambiguity in different dimensions, and/or areas with high cornerness. In some embodiments, only keypoints corresponding to the object of interest and/or content are designated. For example, when performing image rotation for a concave surround view, only keypoints corresponding to the object of interest and/or content will be designated and used. However, where image rotation is used for a convex surround view, keypoints corresponding to both the background and the foreground may be designated and used. Then, a Kanade-Lucas-Tomasi (KLT) feature tracker may be used to track keypoints between two image frames. In some embodiments, one or more keypoints tracked by the KLT feature tracker for image rotation may be the same keypoints used by other enhancement algorithms, such as infinite smoothing and/or view interpolation, as further described herein.

Two keypoints in a first frame and corresponding keypoints in a second frame may be selected at random to determine the rotation transformation. Based on the two keypoint correspondences, the focal length and rotation are solved to calculate the transformation. In various embodiments, only keypoints corresponding to the foreground regions are used to solve for focal length and rotation. In some embodiments, finding the optimal rotation transformation may further include minimizing the image intensity difference between the foreground regions of the two image frames. This two-dimensional 3×3 image transformation can be mapped from the combination of an actual 3D camera rotation and the focal length. The new pre-rotated image sequence is then produced given the solved transformation. An example of optimizing the two-dimensional image transformation is further described with reference to FIG. 24.

Figure 24:
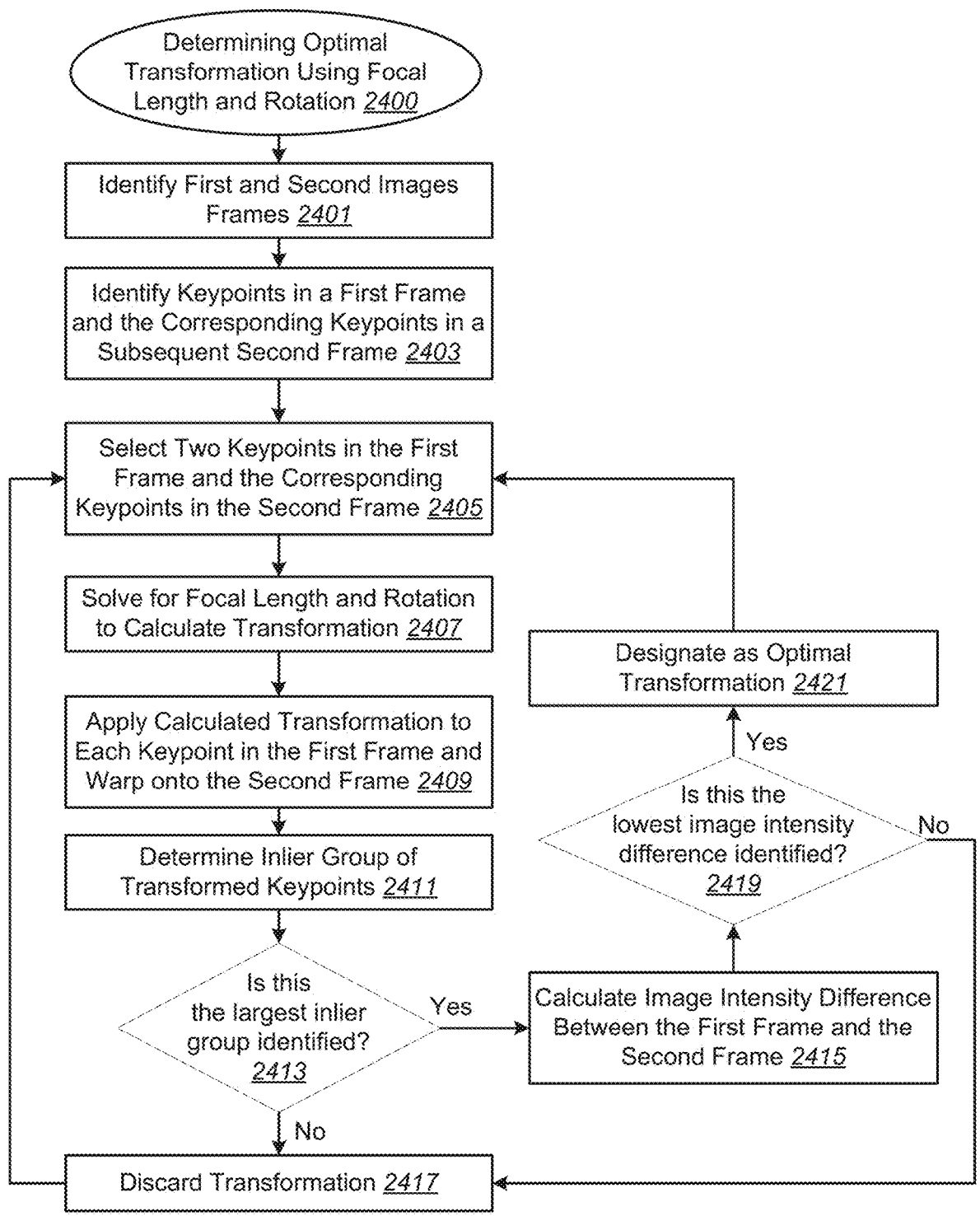
FIG. 24 illustrates an example method for determining the optimal transformation using focal length and rotation as parameters, in accordance with one or more embodiments.

In some embodiments, a frame that is located at a particular point along the camera translation, which needed to create a stereo pair, may not exist. An artificially frame may be rendered to serve as the frame required to complete the stereo pair. Accordingly, by generating these artificially rendered frames, smooth navigation within the surround view becomes possible. In some embodiments, frames that have been rotated based on methods described with respect to step 2211 and FIG. 24 are already stabilized and correctly focused onto the object of interest. Thus, image frames interpolated based on these rotated frames may not require additional image rotation applied.

At step 2213, the stereo pair is presented to the user. In some embodiments, a first frame in the stereo pair is designated to be viewed by the user's left eye, while the second frame is designated to be viewed by the user's right eye. In some embodiments, the first and second frames are presented to the respective eye each frame is designated for, such that only the left eye views the first frame while only the right eye views the second frame. For example, the frames may be presented to the user in a viewing device, such as a virtual reality headset, further described with reference to FIGS. 25A and 25B. This effectively applies a 3×3 image warp to the left eye and right eye images. By viewing each frame in the stereo pair with separate eyes in this way, these two-dimensional images are combined in the user's brain to give the perception of 3D depth.

The method may then return to step 2207 to select another frame for viewing. As previously described above, a subsequent frame may be selected by the user. In other embodiments, a subsequent frame may be selected based on a received user action to view the object of interest from a second viewpoint, as described with reference to step 1008 in FIG. 10. For example, this user action can include moving (e.g. tilting, translating, rotating, etc.) an input device, swiping the screen, etc., depending on the application. For instance, the user action can correspond to motion associated with a locally concave surround view, a locally convex surround view, or a locally flat surround view, etc. Additionally, the user action may include movement of the user and/or a viewing device in three-dimensional space. For example, if the user moves the viewing device to another location in three-dimensional space, an appropriate frame corresponding to the view of the object of interest, content, and/or context from that camera location in three dimensional space. As previously described, intermediate images can be rendered between image frames in a surround view. Such intermediate images correspond to viewpoints located between the viewpoints of the existing image frames. In some embodiments, stereo pairs may be generated for each of these intermediate images and presented to the user by method 2200.

Thus, method 2200 may be used to generate stereoscopic pairs of images for a monocular image sequence captured by a single lens camera. Unlike existing methods in which stereoscopic pairs are created by simultaneously capturing two images at a predetermined distance apart along a camera translation, method 2200, and other processes described herein, can create stereoscopic pairs with only a sequence of single images captured along a camera translation. Thus, fewer images, and corresponding image data is required, resulting in less data storage. Moreover, the information required for selection of stereoscopic pairs and image rotation for method 2200 do not need to be stored and may be determined in real-time. Additionally, parameters are not set for stereoscopic pairs of images, unlike in existing methods. For example, a wider or shorter distance may be selected between each image frame in a stereoscopic pair in order to increase or decrease the depth perception, respectively. Furthermore, one or more various objects within an image sequence may be determined to be an object of interest and different rotation. Images may be rotated differently depending on which object or objects are determined to be the object of interest. Moreover, various portions within an image may be rotated differently based on the determined object of interest. In other words, different rotation transformations may be determined for different portions of an image.

By generating and presenting stereo pairs corresponding to sequence of image frames in a surround view, method 2200 may be used to provide depth to the surround view. In various instances, this allows the user to perceive an object of interest as a three-dimensional model without actually rendering and/or storing an actual three-dimensional model. In other words, there is no polygon generation or texture mapping over a three-dimensional mesh and/or polygon model, as in existing methods. However, the user still perceives the content and/or context as an actual three-dimensional model with depth from multiple viewpoint angles. The three-dimensional effect provided by the surround view is generated simply through stitching of actual two-dimensional images and/or portions thereof, and generation of stereo pairs corresponding to the two-dimensional images.

Figure 23:
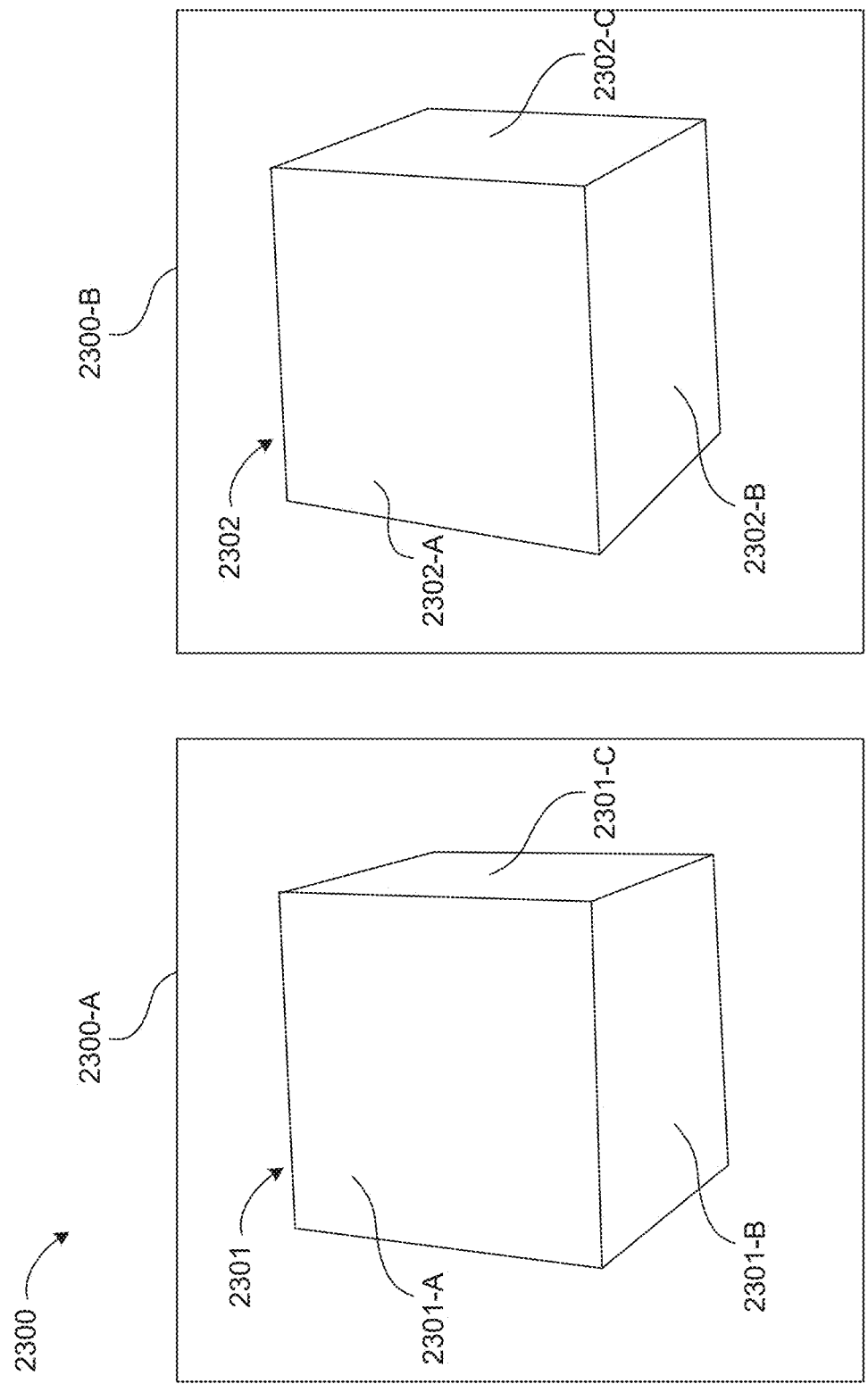
FIG. 23 illustrates an example of a stereo pair for virtual reality or augmented reality, in accordance with one or more embodiments.

With reference to FIG. 23, an example of a stereo pair 2300 for virtual reality or augmented reality is illustrated, in accordance with one or more embodiments. Stereo pair 2300 includes a first frame 2300-A and a second frame 2300-B, which include an image of a cube 2301. Frames 2300-A and 2300-B correspond to images captures along a camera translation 1210. Frames 2300-A and 2300-B may include overlapping subject matter, as shown by shaded portion 1212. The arc path of camera translation 1210 may or may not be uniform around cube 2301. Frame 2300-A is a frame that may be designated for viewing by a user's left eye. Accordingly, frame 2300-A may be displayed on a screen in a virtual reality headset corresponding to the left eye view. Frame 2300-B is a frame that may be designated for viewing by a user's right eye. Accordingly, frame 2300-B may be displayed on a screen in a virtual reality headset corresponding to the right eye view.

As can be seen, cube 2301 includes sides 2301-A, 2301-B, and 2301-C that are visible within the images of frames 2300-A and 2300-B. According to various embodiments, frames 2300-A and 2300-B may include slightly different views of cube 2301 corresponding to their respective positions on a spatial baseline. As previously described, frame 2300-A may be selected, as in step 1207, based on receiving a request from a user to view an object of interest in a surround view. Frame 2300-A may be selected as a starting position for viewing cube 2301. In other embodiments, frame 2300-A may be selected based on user input selecting a starting position for viewing cube 2301. Frame 2300-A is then designated for left eye viewing. In some embodiments, frame 2300-A may be artificially rendered by view interpolation using existing images captured. The image of frame 2300-A may include a line of sight 2306-A to a focal point 2305 that is perpendicular to the plane of frame 2300-A. In some embodiments, image rotation may be implemented to correct the image of frame 2300-A, such as at step 2211, such that the line of sight 2306-A to focal point 2305 is perpendicular to the plane of frame 2300-A.

The second frame 2300-B is then determined, as in step 2209. As previously described, frame 2300-B may be selected based on a desired angle of vergence 2307 between the line of sight 2306-A for frame 2300-A and the line of sight 2306-B to focal point 2305 for frame 2300-B. Frame 2300-B may additionally, and/or alternatively, be selected based on a determined spatial baseline. In some embodiments, the determination of frame 2300-B may utilize IMU and other location information gathered. In some embodiments, frame 2300-B may be artificially rendered by view interpolation using existing images captured. In some embodiments, image rotation may be implemented to correct the image of frame 2300-B, such as at step 2211, such that the line of sight 2306-B to focal point 2305 is perpendicular to the plane of frame 2300-B. As depicted in FIG. 23, the images within each frame contain slightly offset views of cube 2301. For example, a greater area of side 2301-C is visible in frame 2300-B as compared to within frame 2300-A.

In other embodiments, the first frame selected may be frame 2300-B and frame 2300-A may be determined to be included within stereo pair 2300 based on the angle of vergence, IMU data, and/or other location information, as previously described.

With reference to FIG. 24, shown is an example method 2400 for determining the optimal transformation using focal length and rotation as parameters, in accordance with one or more embodiments. In some embodiments, method 2400 is implemented to calculate the transformations to rotate frames in a sequence of images, such as during image rotation, as previously mentioned at step 2241. In some embodiments, method 2400 may be implemented as image stabilization to stabilize captured image frames in the image sequence corresponding to a surround view. In some embodiments, method 2400 may be implemented at step 2241 and/or before selecting a first frame for viewing at step 2207

At step 2401, first and second image frames are identified. In some embodiments, the first and second image frames may be part of a sequence of images captured at step 2201. In various embodiments, the image frames may be consecutively captured images in time and/or space. In some embodiments, the first and second image frames may be adjacent image frames, such as frame N and frame N+1. In other embodiments, image frames identified at step 2401 may not be adjacent frames, but may be frames separated by one or more other frames, such as frame N and frame N+x. In some embodiments, one or more of the identified image frames are artificially interpolated image frames.

A RANSAC (random sample consensus) algorithm may be implemented to determine the optimal transformation between the two image frames. As described herein, focal length and rotation may be identified from keypoints tracked from a first frame to a second frame. Various transformations may be calculated from these parameters gathered from various combinations of keypoints and applied to the first frame and/or the second frame. The number of inlier keypoints and/or image intensity difference between the two frames is determined after a transformation has been applied. The RANSAC algorithm may test a predetermined number of calculated transformations as such, to determine an optimal transformation resulting in the largest number of inlier keypoints and/or a minimal image intensity difference.

At step 2403, keypoints in the first frame and corresponding keypoints in the second frame are identified. In some embodiments, the first frame includes an image that was captured before the image in the second frame. In other embodiments, the first frame may include an image captured after the image in the second frame. In various embodiments, keypoints may be identified using a Harris-style corner detector algorithm or other keypoint detection method. In other embodiments, various other corner detection algorithms may be implemented, such as a Moravec corner detection algorithm, a Förstner corner detector, etc. Such corner detector algorithm may be implemented to detect salient features to designate as keypoints in each frame, such as areas of large contrast, areas with minimum ambiguity in different dimensions, and/or areas with high cornerness. A predetermined number keypoints with the highest Harris score may then be selected. For example, 1,000 keypoints may be identified and selected on the first frame. The corresponding 1,000 keypoints on the second frame can then be identified using a Kanade-Lucas-Tomasi (KLT) feature tracker to track keypoints between the two image frames.

At step 2405, two keypoints in the first frame and the corresponding keypoints in the second frame are selected. In some embodiments, the two keypoints in the first frame may be selected randomly by the RANSAC algorithm. The two corresponding keypoints in the second frame may be identified by the KLT feature tracker. In some embodiments, two keypoints may be randomly selected in the second frame and the corresponding keypoints in the first frame are identified. Each pair of corresponding keypoints may be referred to herein as a correspondence. For example, keypoint A on frame N and keypoint A' on frame N+1 correspond to each other via KLT feature tracking and may comprise a pair (A, A'). A second correspondence (B, B') may be selected at step 2405 which comprises keypoint B on frame N and keypoint B' on frame N+1.

Based on the two point correspondences, the focal length and rotation are solved to calculate the transformation at step 2407. In other words, a transformation, T, between the first frame and second frame may be calculated from the two corresponding pairs of keypoints using a predetermined algorithm. For example, a mathematical model may be used, such as that provided in M. Brown, R. Hartley, and D. Nister. Minimal solutions for panoramic stitching. In Proceedings of the International Conference on Computer Vision and Pattern Recognition (CVPR07), Minneapolis, June 2007. In order to calculate a transformation based on rotation and focal length, four parameters are required: three for rotation and one for focal length. Each correspondence of a keypoint between frames provides two constraints. Thus, four constraints can be provided by the two correspondences for each selected keypoints between frames. The derived close-form solution is the calculated transformation based on the two selected keypoints.

At step 2409, the calculated transformation T1 is applied to each keypoint in the first frame which is warped onto the second frame. In other words, the all keypoints in the first frame are transformed to the second image via applying the calculated transformation. The transformation is reversible and in some embodiments, the keypoints in the second frame may be transformed onto the first frame after the calculated transformation is applied to keypoints in the second frame.

At step 2411, an inlier group of transformed keypoints is determined. In some embodiments, a transformed keypoint in the first frame is considered an inlier if the transformation T1 correctly transforms the keypoint to match the corresponding keypoint in the second frame. In some embodiments, this can be determined by computing the L2 distance between a transformed keypoint and its corresponding keypoint on the second image. For example, a transformed keypoint on a first frame N may be denoted as $K\hat{}$ and its corresponding keypoint on the second frame N+1 may be denoted as K'. The L2 distance is computed as $\|A\hat{}-A'\|$, which corresponds to the distance between two 2D points. If the distance between any keypoint correspondence is within a predetermined threshold distance in any direction, then the correspondence will be determined to be an inlier. In other words, if the difference between any keypoint correspondence is greater than the predetermined threshold distance, then the keypoint will be determined to be an outlier.

For example, the threshold distance may be threshold pixel distance, which is the L2 distance between two keypoints in a correspondence. Thus, if the distance between a keypoint $K\hat{}$ and its corresponding keypoint K' is more than 2 pixels, then that keypoint correspondence will be determined to be an outlier based on the transformation applied at step 2409. In various embodiments, the threshold pixel distance may be a function of image resolution and can scale linearly. For example, method 2400 may be processing images at a 320×180 pixels resolution and use a threshold pixel distance of 2 pixels. However, if method 2400 is used to process images at a 1080p (1920×1080 pixels) resolution, then a threshold pixel distance of 6-8 pixels may be used. In some embodiments, a different threshold pixel distance may be chosen for a given image resolution. In some embodiments, the threshold pixel distance may be empirically determined based on experimental results of accuracy.

After all keypoint correspondences have been measured as such, it is determined whether the calculated transformation T1 resulted in the largest inlier group identified, at step 2413. If the transformation T1 calculated applied at step 2409 does not result in the largest group of inlier keypoints, the calculated transformation T1 is discarded at step 2417. In other words, if a larger inlier group was identified based on a previous transformation, T0, calculated at step 2407 and applied at step 2409, then the current calculated transformation T1 is discarded. If the transformation T1 calculated at step 2407 is the first calculated transformation within the RANSAC algorithm, then it necessarily results in the largest group of inlier keypoints and the transformation data will be stored for comparison with subsequently calculated transformations.

If the calculated transformation T1 applied at step 2409 does result in the largest group of inlier keypoints, the image intensity difference between the first frame and the second frame is calculated at step 2415. In some embodiments, the calculated transformation T1 may be applied to every pixel in the first frame to warp the first frame onto the second frame, and an image intensity difference is calculated between the transformed first frame and the second frame. For example, an error or difference for each color channel is calculated between each corresponding pixel in the two frames. Then an average error of the RGB value of all color channels is derived for each pixel. Next, the average error for all pixels within the first and second frames is calculated. In some embodiments, the image intensity difference between two frames will be between 0 and 255. A lower image intensity difference value corresponds to a closer image match between frames, and consequently a more accurate transformation.

There may be instances where a larger inlier group is determined at step 2413, but a higher image intensity difference value is calculated at step 2415. In this instance, the transformation resulting in the higher image intensity difference value will be discarded. Alternatively, the transformation resulting in the larger inlier group may be stored in some embodiments. Such instances are more likely to occur in instances where stabilization of foreground is desired in image frames that include large textured background regions. Accordingly, the RANSAC algorithm may result in calculated transformations that include large inlier keypoint sets that correspond to the large background, instead of the foreground. This may result in higher intensity error in the foreground region. To compensate for this in some embodiments, the RANSAC algorithm may measure focal length and rotation using only keypoints located in the foreground of an image. A background keypoint removal may be performed on the image frames within a sequence of images before the RANSAC algorithm is implemented. Keypoints corresponding to the background of an image may be identified based on IMU data to calculate how such keypoints with focal points at infinity should move between frames. Once identified, such background keypoints are removed, such that the RANSAC algorithm calculated transformations at step 2407 using only keypoints corresponding to the foreground. This may reduce undesired transformations resulting in larger inlier groups (aligning the background), but higher image intensity difference values (from unaligned foreground). Such background keypoint removal may also be used with concave surround views, such as the surround view depicted in FIG. 7B. In convex panoramic surround views, calculating transformations from keypoints corresponding to the background and the foreground may be desired.

It is then determined whether the calculated image intensity difference is the lowest image intensity difference identified at 2419. If a lower image intensity difference was determined from a previous transformation, such as T0, calculated at step 2407, then the current transformation T1 is discarded at 2417, and another two keypoint correspondences may be randomly selected at step 2405. If however, the image intensity difference for the present transformation T1 is determined to be the lowest out of all previously determined image intensity differences for prior transformations, then the current transformation is designated as the optimal transformation for the first and second frames at step 2421.

In some embodiments, step 2415 is only implemented if a larger inlier group is determined at 2413. The transformation calculated at step 2407 in a first iteration of the RANSAC algorithm would necessarily result in the largest inlier group. In other embodiments, step 2415 may be implemented if the inlier group determined at 2413 is at least equal to the largest inlier group resulting from a previous transformation. In rare instances, a subsequent transformation calculated at step 2407 may result in the same inlier group size, as well as the same image intensity difference. In such instance, the transformation calculated first may be kept while the second transformation is discarded at step 2417. In other embodiments, the subsequent transformation is kept while the previous transformation discarded.

The method 2400 may then return to step 2405 to select another two correspondence of keypoint pairs. Such keypoint correspondences may include another randomly selected pair of keypoints in the first frame. In some instances, randomly selected keypoint correspondences may be correspondences that were previously selected at step 2405. For example, correspondence (A, A') and a third corresponding keypoint pair (C, C') may be selected in the second iteration of the RANSAC algorithm. In even rarer occasions, the same exact keypoint pairs may be selected in subsequent iterations of the RANSAC algorithm. For example, a subsequent iteration of the RANSAC algorithm may again select correspondences (A, A') and (B, B'). In this case, the resulting inlier group size and calculated image intensity difference would be identical to the previously calculated transformation based on the previous iteration. In this instance, the first transformation will be kept and the subsequent iteration involving the same calculated transformation will be discarded. However, the probability of such occurrence may be very unlikely depending on the number of keypoints identified on an image frame, for example, 1,000 keypoints. Thus, the chance occurrence of this instance can simply be ignored.

The RANSAC algorithm of method 2400 may continue for any number of predetermined cycles. For example, the RANSAC algorithm may perform steps 2405 through 2417 one hundred times for two image frames. However, the RANSAC algorithm may be performed any number of cycles as desired. The result of method 2400 is an optimal transformation between the first frame and the second frame, which results in the largest amount of inlier keypoints and the lowest image intensity difference when the transformation is applied to the first frame and warped onto the second frame, or vice versa.

According to various embodiments, the image warp may be constructed from the transformation corresponding to the optimal focal length and rotation. In some embodiments, the image warp is constructed as $KRK^{-1}$, where K is an intrinsic parameter given the optimal focal length, and R is a 3×3 rotation matrix. K is a 3×3 focal length matrix, and $K^{-1}$ is the inverse matrix of K. R may be a special orthogonal group 3, or SO(3), matrix. Applying this 3×3 3D transformation to the second image in the stereo pair will ensure that the second image frame is always perpendicular to the line of sight to the object of interest and/or foreground. In some embodiments, method 2400 may be implemented to determine the optimal transformation between each frame in the image sequence, which can be used to compose a trajectory for the image sequence of the surround view created at step 2203 of method 2200. In some embodiments, method 2400 may be implemented to stabilize the captured images of the image sequence of the surround vie created at step 2203. In such embodiments, subsequent rotation may not be required for image frames in a stereo pair.

As described, using focal length and camera rotation as stabilization parameters has a clear physical mean. In other words, given the captured image sequence, each image represents a three-dimensional camera location of a camera in a three-dimensional world, the rotation is modeled as how to rotate and zoom these set of cameras in three-dimensional space in order to produce a spatially correct rotation. Because, the image warp is mapped from physically meaningful parameters (focal length and camera rotation), the warped image will follow optical rules of physics, and the rotated image will be optically correct and free from unsound distortion. This effectively applies a 3×3 image warp to the left eye and right eye images.

AR/VR Content Generation

Figure 25A:
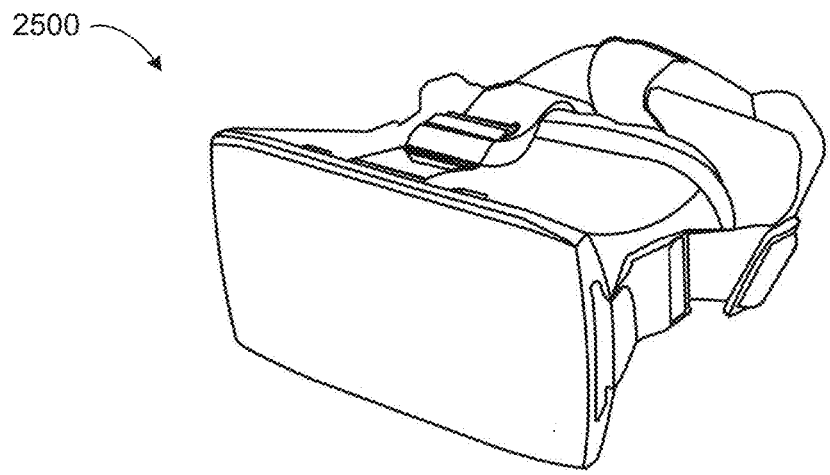
FIGS. 25A and 25B illustrate an example, of a AR/VR headset for displaying AR/VR content, in accordance with one or more embodiments.
Figure 25B:
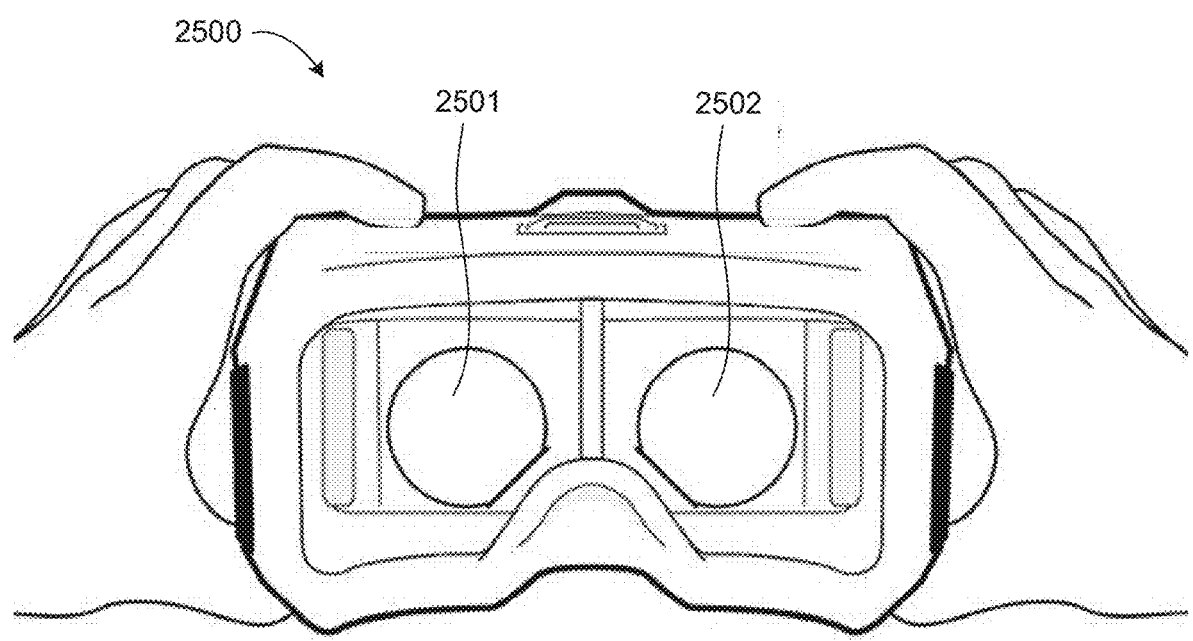

FIGS. 25A and 25B illustrate an example, of an AR/VR headset 2500 for displaying AR/VR content, in accordance with one or more embodiments. Headset 2500 may be a display module configured to be worn on a user's head over the eyes. In various embodiments, headset 2500 comprises a stereoscopic head-mounted display which provides separate images for each eye. Such separate images may be stereoscopic pairs of image frames, such as stereoscopic pair 2300, generated by method 2200. Each image in the stereoscopic pair may be projected to the user at one of screens 2501 or 2502. As depicted in FIG. 25B screen 2501 projects an image to the user's left eye, while screen 2502 projects in image to the user's right eye.

Further embodiments of headset 2500 may include stereo sound and/or head motion tracking, which may utilize gyroscopes, accelerometers, structured light systems, etc. In such embodiments, as the user moves, such as by turning her head or by walking around, various images, generated by the various methods described herein, may be presented to the user, which correspond to different viewpoints depending on the user's movement and/or position. In some embodiments, headset 2500 may further comprise eye tracking sensors and/or gaming controllers.

Figure 26A:
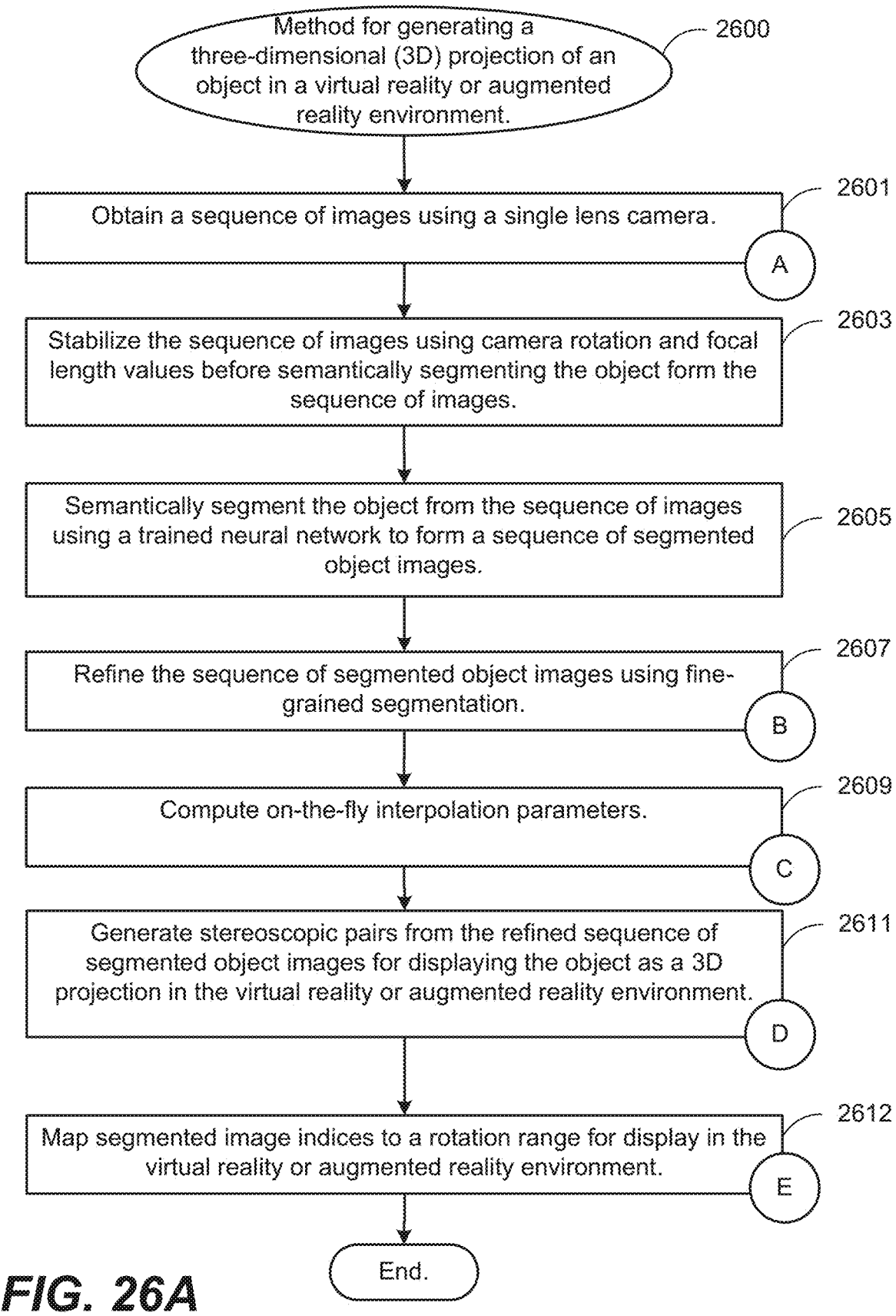
FIGS. 26A-26C illustrate an example of a method for generating a three-dimensional (3D) projection of an object in a virtual reality or augmented reality environment, in accordance with one or more embodiments.
Figure 26B:
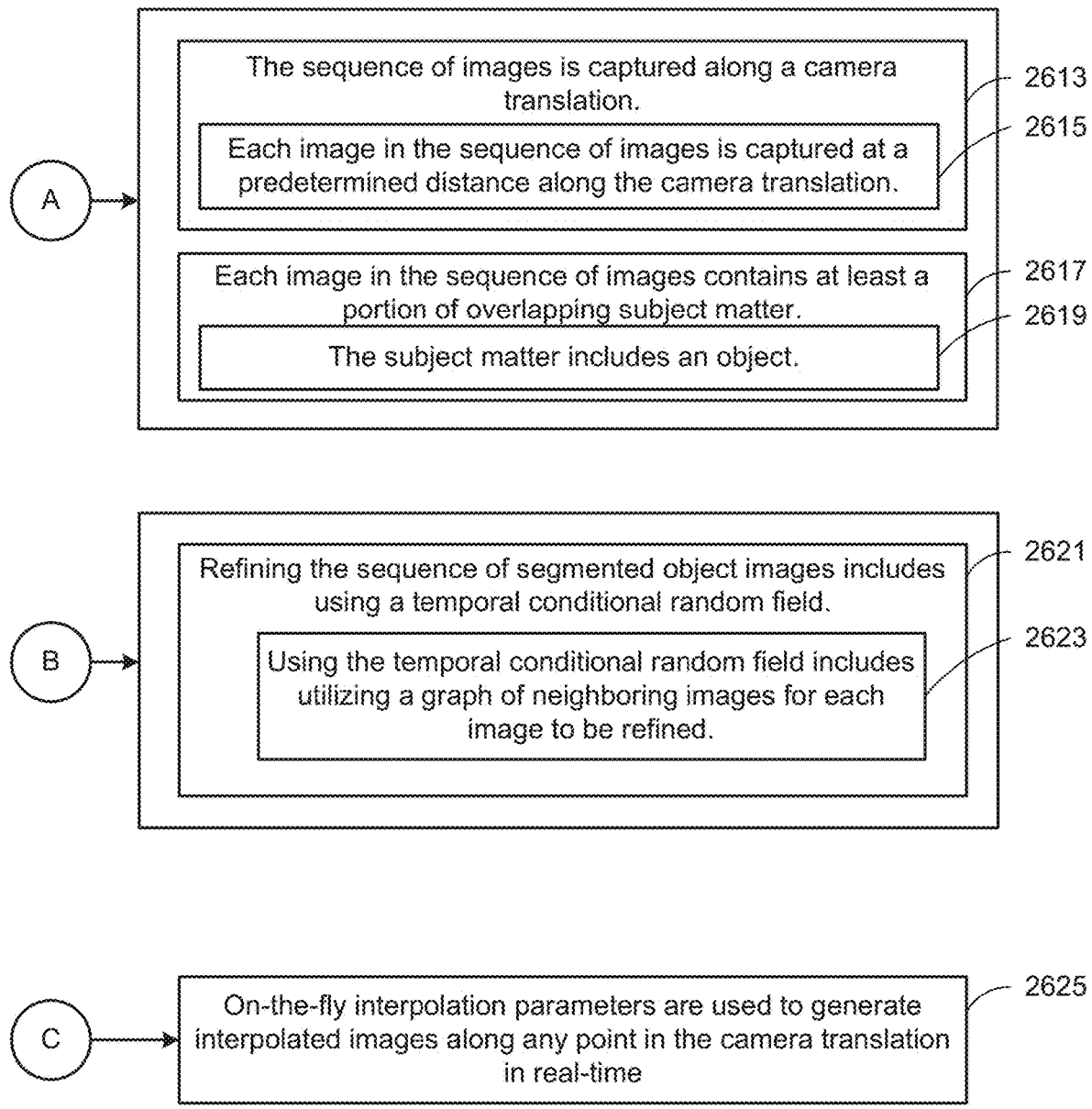
Figure 26C:
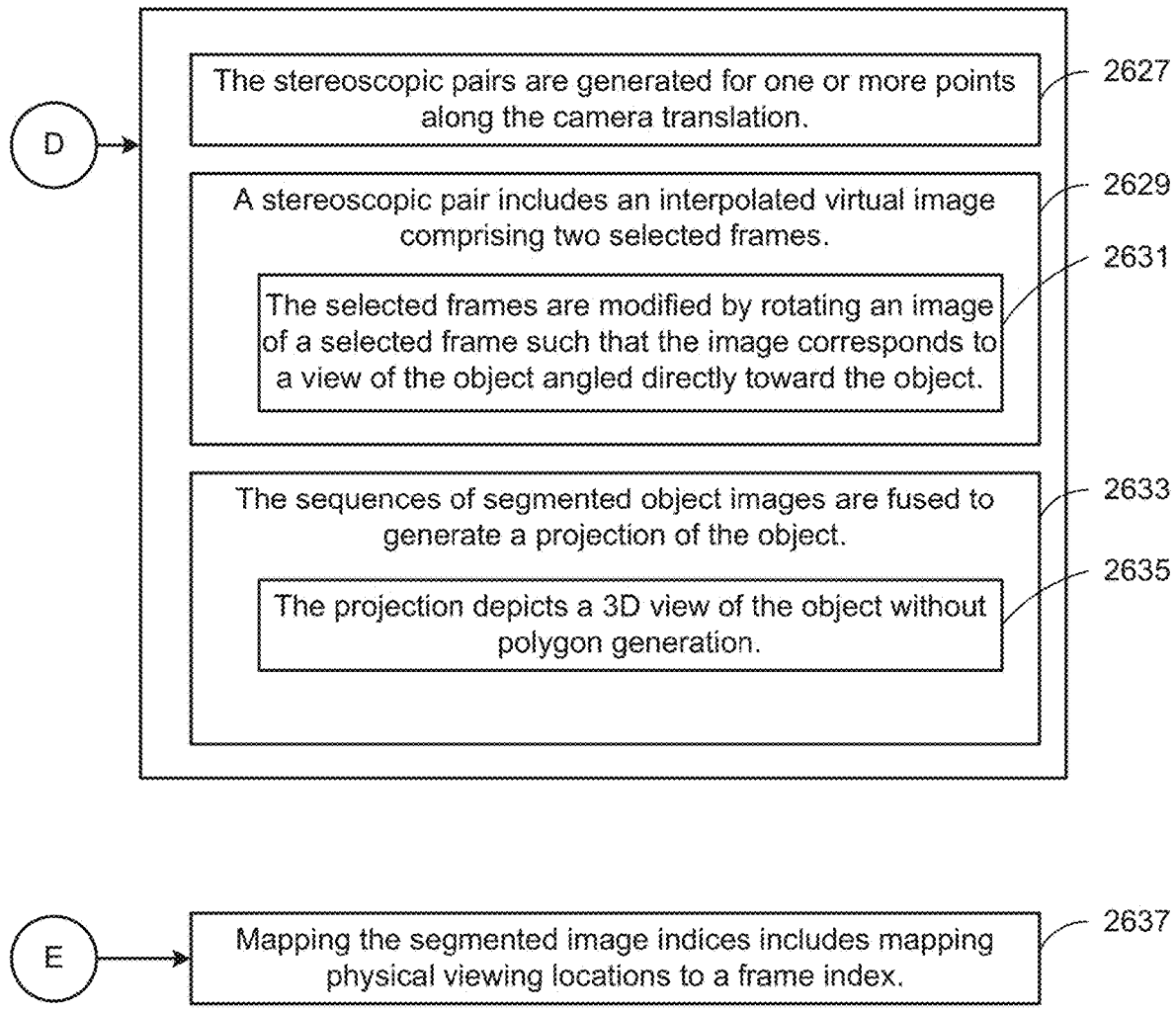

FIGS. 26A-26C illustrate an example of a method 2600 for generating a three-dimensional (3D) projection of an object 2619 in a virtual reality or augmented reality environment, in accordance with one or more embodiments. In particular embodiments, the 3D projection may be displayed in an augmented reality (AR) environment, in which elements of a live direct or indirect view of a physical, real-world environment are augmented (or supplemented) by computer-generated sensory input such as sound, video, graphics, or GPS data, including the 3D projection of the object 2619. At operation 2601, a sequence of images 2613 is obtained using a single lens camera. The sequence of images 2613 is captured along a camera translation 2615. In some embodiments, each image in the sequence of images 2613 is captured at a predetermined distance along the camera translation 2615. In some embodiments, each image in the sequence of images 2613 contains at least a portion of overlapping subject matter 2617. The subject matter 2617 may include an object 2619.

At operation 2603, the sequence of images 2613 may be stabilized using camera rotation and focal length values before semantically segmenting the object 2619 from the sequence of images 2613, as previously described with reference to FIG. 24. In other embodiments, other parameters may be used to stabilize the sequence of images 2613, including 2D translation (x,y translation), 2D Euclidean (2D rotation and x,y translation), similarity 2D (2D rotation, 2D scale, and x,y translation), affine, homography, etc. According to various embodiments, such stabilization may be implemented for frame selection of various keyframes in the sequence of images 2613, as described with reference to FIGS. 1 and 2.

At operation 2605, the object 2619 is semantically segmented from the sequences of images 2613 using a trained neural network to form a sequence of segmented object images, such as described with reference to FIGS. 2 and 11. At operation 2607, the sequence of segmented object images is refined using fine-grained segmentation, such as described with reference to FIGS. 2 and 12. In some embodiments refining the sequence of segmented object images includes using a temporal conditional random field 2621. Using the temporal conditional random field 2621 may include utilizing a graph 2623 of neighboring images for each image to be refined.

At operation 2609, on-the-fly interpolation parameters 2625 are computed. In some embodiments, on-the-fly interpolation parameters 2625 are used to generate interpolated images along any point in the camera translation in real-time. Various methods and processes previously described with reference to FIGS. 13-21 may be implemented to compute on-the-fly interpolation parameters 2625.

At operation 2611, stereoscopic pairs 2627 are generated from the refined sequence of segmented object images for displaying the object as a 3D projection in the virtual reality or augmented reality environment. In some embodiments, the stereoscopic pairs 2627 are generated for one or more points along the camera translation 2615. A stereoscopic pair 2627 may include an interpolated virtual image 2629 comprising two selected frames. Such interpolated virtual image may be rendered based on the on-the-fly interpolation parameters 2625 computed at operation 2609. The selected frames may be modified (2631) by rotating an image of a selected frame such that the image corresponds to a view of the object 2619 angled directly toward the object. In some embodiments, this stabilization may be performed by the method 2400 described with reference to FIG. 24. As previously described, such rotation may cause the line of sight to the object 2619 to be perpendicular to the plane of the selected frame.

In various embodiments, the segmented object images are fused (2635) to generate a projection of the object 2619. The projection may depict a 3D view of the object 2619 without polygon generation. At operation 2612, segmented image indices 2637 are mapped to a rotation range for display in the virtual reality or augmented reality environment. In some embodiments, mapping the segmented image indices 2637 may include mapping physical viewing locations to a frame index, as previously described with reference to FIG. 2. The fused object images may be displayed as a surround view to a user at a viewing device, such as headset 2500, where each image in the stereoscopic pair 2627 is displayed at one screen corresponding to one of the eyes of the user. As the user moves the viewing device, different views of object 2619 corresponding to the mapped viewing location.

As such, the user may perceive a three-dimensional view of the object 2619 without rendering and/or storing an actual three-dimensional model by the system. As previously described, there may be no polygon generation or texture mapping over a three-dimensional mesh and/or polygon model. However, the user still perceives the object 2619 and/or other context as an actual three-dimensional model. The three-dimensional effect provided by the surround view is generated simply through stitching of actual two-dimensional images and/or portions thereof.

The methods presented in this disclosure are highly efficient and can be run on a mobile platform in real-time. The various methods require only very small amounts of additional data and are therefore extremely well-suited for data that needs to be sent over a wireless network (e.g. LTE). In addition, the methods are sufficiently regularized to handle problematic cases without creating jarring artifacts. Accordingly, the methods described herein are suitable for generating artificially rendered images on mobile devices, etc.

Figure 27:
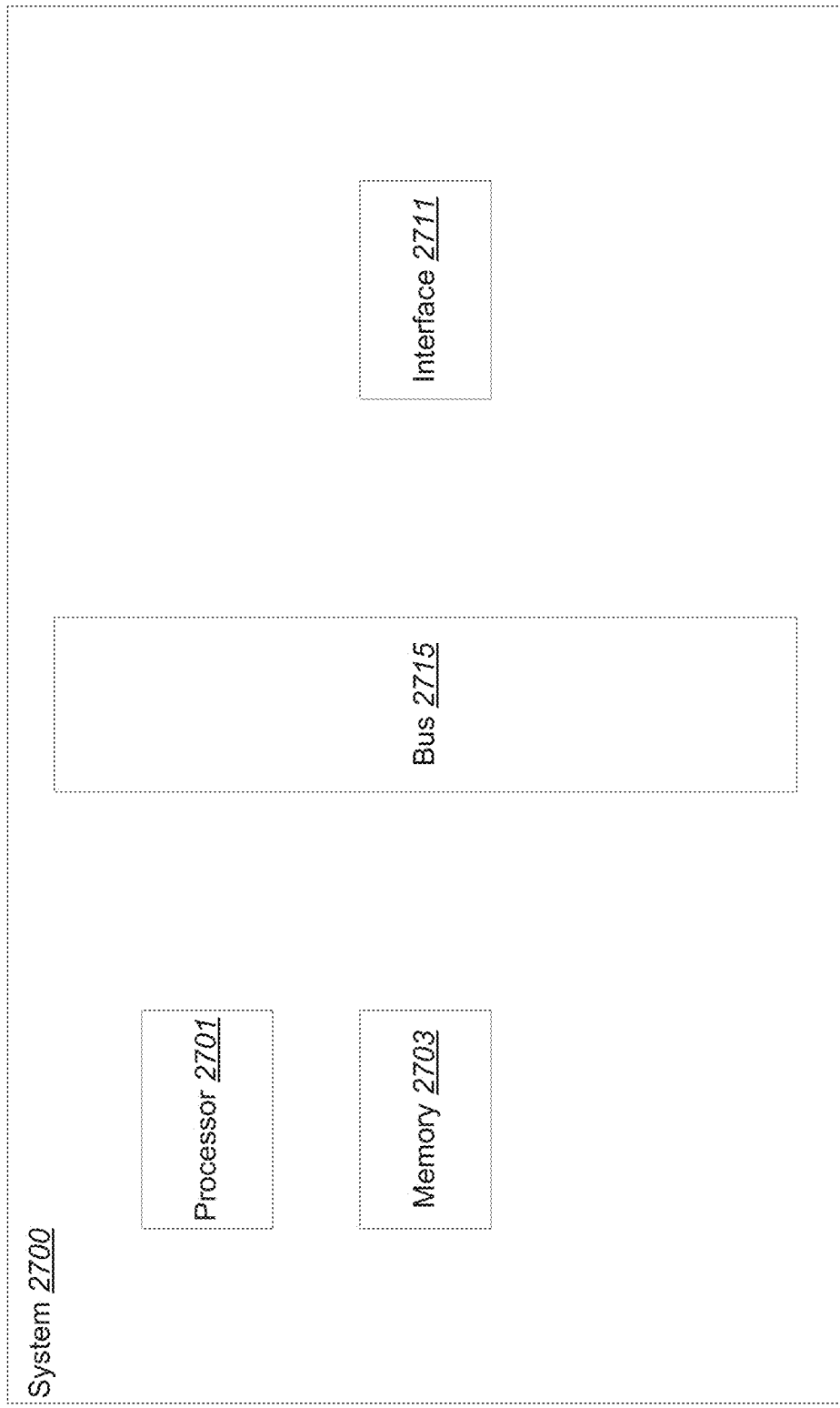
FIG. 27 illustrates a particular example of a computer system that can be used with various embodiments of the present disclosure.

Various computing devices can implement the methods described. For instance, a mobile device, computer system, etc. can be used to generate artificially rendered images. With reference to FIG. 27, shown is a particular example of a computer system that can be used to implement particular examples of the present disclosure. For instance, the computer system 2700 can be used to provide surround views according to various embodiments described above. According to particular example embodiments, a system 2700 suitable for implementing particular embodiments of the present disclosure includes a processor 2701, a memory 2703, an interface 2711, and a bus 2715 (e.g., a PCI bus). The interface 2711 may include separate input and output interfaces, or may be a unified interface supporting both operations. When acting under the control of appropriate software or firmware, the processor 2701 is responsible for such tasks such as optimization. Various specially configured devices can also be used in place of a processor 2701 or in addition to processor 2701. The complete implementation can also be done in custom hardware. The interface 2711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2700 uses memory 2703 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method for generating a three-dimensional (3D) projection of an object in a virtual reality or augmented reality environment, the method including:
   obtaining a sequence of images using a single lens camera, the sequence of images being captured along a camera translation, wherein each image in the sequence of images contains at least a portion of overlapping subject matter, the subject matter including the object;
   semantically segmenting the object from the sequence of images using a trained neural network to form a sequence of segmented object images, wherein the trained neural network is configured to aggregate a plurality of feature maps from different layers of the trained neural network in order to allow usage of both finer scale and coarser scale details to produce probability maps corresponding to the sequence of segmented object images, wherein the trained neural network is trained to label every pixel in each image in the sequence of images with a particular category label;
   refining the sequence of segmented object images using fine-grained segmentation, wherein refining the sequence of segmented object images includes passing each probability map onto a temporal dense conditional random field (CRF) smoothing system to produce a binary mask for every segmented object image, wherein the binary masks are temporally consistent and sharply aligned at boundaries to each other;
   computing on-the-fly interpolation parameters;

generating stereoscopic pairs from the refined sequence of segmented object images for displaying the object as a 3D projection in the virtual reality or augmented reality environment, the stereoscopic pairs being generated for one or more points along the camera translation; and mapping segmented image indices to a rotation range for display in the virtual reality or augmented reality environment.

2. The method of claim 1, wherein each image in the sequence of images is captured at a predetermined distance along the camera translation.

3. The method of claim 1, further comprising stabilizing the sequence of images using camera rotation and focal length values before semantically segmenting the object from the sequence of images.

4. The method of claim 1, wherein on-the-fly interpolation parameters are used to generate interpolated images along any point in the camera translation in real-time.

5. The method of claim 1, wherein a stereoscopic pair includes an interpolated virtual image comprising two selected frames.

6. The method of claim 5, wherein the selected frames are modified by rotating an image of a selected frame such that the image corresponds to a view of the object angled directly toward the object.

7. The method of claim 1, wherein the sequence of segmented object images are fused to generate a projection of the object, the projection depicting a 3D view of the object without polygon generation.

8. The method of claim 1, wherein using the dense temporal conditional random field includes utilizing a graph of neighboring images for each image to be refined.

9. The method of claim 1, wherein mapping segmented image indices includes mapping physical viewing locations to a frame index.

10. A system for generating a three-dimensional (3D) projection of an object in a virtual reality or augmented reality environment, the system comprising:
a single lens camera for obtaining a sequence of images, the sequence of images being captured along a camera translation, wherein each image in the sequence of images contains at least a portion of overlapping subject matter, the subject matter including the object;
a display module;
a processor, and
memory storing one or more programs configured for execution by the processor, the one or more programs comprising instructions for:
semantically segmenting the object from the sequence of images using a trained neural network to form a sequence of segmented object images, wherein the trained neural network is configured to aggregate a plurality of feature maps from different layers of the trained neural network in order to allow usage of both finer scale and coarser scale details to produce probability maps corresponding to the sequence of segmented object images, wherein the trained neural network is trained to label every pixel in each image in the sequence of images with a particular category label;
refining the sequence of segmented object images using fine-grained segmentation, wherein refining the sequence of segmented object images includes passing each probability map onto a temporal dense conditional random field (CRF) smoothing system to produce a binary mask for every segmented object image, wherein the binary masks are temporally consistent and sharply aligned at boundaries to each other;
computing on-the-fly interpolation parameters;
generating stereoscopic pairs from the refined sequence of segmented object images for displaying the object as a 3D projection in the virtual reality or augmented reality environment, the stereoscopic pairs being generated for one or more points along the camera translation; and
mapping segmented image indices to a rotation range for display in the virtual reality or augmented reality environment.

11. The system of claim 10, wherein each image in the sequence of images is captured at a predetermined distance along the camera translation.

12. The system of claim 10, further comprising stabilizing the sequence of images using camera rotation and focal length values before semantically segmenting the object from the sequence of images.

13. The system of claim 10, wherein on-the-fly interpolation parameters are used to generate interpolated images along any point in the camera translation in real-time.

14. The system of claim 10, wherein a stereoscopic pair includes an interpolated virtual image comprising two selected frames.

15. The system of claim 14, wherein the selected frames are modified by rotating an image of a selected frame such that the image corresponds to a view of the object angled directly toward the object.

16. The system of claim 10, wherein the sequence of segmented object images are fused to generate a projection of the object, the projection depicting a 3D view of the object without polygon generation.

17. The system of claim 10, wherein using the dense temporal conditional random field includes utilizing a graph of neighboring images for each image to be refined.

18. A non-transitory computer readable medium storing one or more programs configured for execution by a computer, the one or more programs comprising instructions for:
obtaining a sequence of images using a single lens camera, the sequence of images being captured along a camera translation, wherein each image in the sequence of images contains at least a portion of overlapping subject matter, the subject matter including the object;
semantically segmenting the object from the sequence of images using a trained neural network to form a sequence of segmented object images, wherein the trained neural network is configured to aggregate a plurality of feature maps from different layers of the trained neural network in order to allow usage of both finer scale and coarser scale details to produce probability maps corresponding to the sequence of segmented object images, wherein the trained neural network is trained to label every pixel in each image in the sequence of images with a particular category label;
refining the sequence of segmented object images using fine-grained segmentation, wherein refining the sequence of segmented object images includes passing each probability map onto a temporal dense conditional random field (CRF) smoothing system to produce a binary mask for every segmented object image, wherein the binary masks are temporally consistent and sharply aligned at boundaries to each other;
computing on-the-fly interpolation parameters;
generating stereoscopic pairs from the refined sequence of segmented object images for displaying the object as a 3D projection in the virtual reality or augmented reality environment, the stereoscopic pairs being generated for one or more points along the camera translation; and
mapping segmented image indices to a rotation range for display in the virtual reality or augmented reality environment.

\* \* \* \* \*